United States Patent
Jang et al.

(10) Patent No.: US 10,686,990 B2
(45) Date of Patent: Jun. 16, 2020

(54) MOBILE TERMINAL AND METHOD OF CONTROLLING THE SAME

(71) Applicant: LG ELECTRONICS INC., Seoul (KR)

(72) Inventors: Hyungtae Jang, Seoul (KR); Songyi Baek, Seoul (KR); Jeyeol Lee, Seoul (KR); Jaeho Choi, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/883,342

(22) Filed: Jan. 30, 2018

(65) Prior Publication Data

US 2018/0241948 A1 Aug. 23, 2018

(30) Foreign Application Priority Data

Feb. 17, 2017 (KR) .......................... 10-2017-0021673

(51) Int. Cl.
*H04N 5/222* (2006.01)
*H04N 5/232* (2006.01)
*G06F 3/0481* (2013.01)
*G06F 3/0488* (2013.01)

(52) U.S. Cl.
CPC ..... *H04N 5/23293* (2013.01); *G06F 3/04817* (2013.01); *G06F 3/04886* (2013.01); *H04N 5/23216* (2013.01); *H04N 5/23219* (2013.01); *H04N 5/23245* (2013.01); *G06F 2203/04803* (2013.01)

(58) Field of Classification Search
CPC ......... H04N 5/23293; H04N 5/232933; H04N 5/232935; H04N 5/23216; H04N 5/23222; H04N 5/23296
See application file for complete search history.

(56) References Cited

U.S. PATENT DOCUMENTS

| | | | |
|---|---|---|---|
| 9,479,693 B2 * | 10/2016 | Kang ................. | H04N 5/23222 |
| 9,591,224 B2 * | 3/2017 | Jung ................. | H04N 5/23293 |
| 2010/0302409 A1 | 12/2010 | Matas et al. | |
| 2012/0117473 A1 * | 5/2012 | Han ..................... | G11B 27/034 |
| | | | 715/723 |
| 2014/0071323 A1 | 3/2014 | Yi et al. | |
| 2014/0079371 A1 * | 3/2014 | Tang ................. | H04N 21/8586 |
| | | | 386/240 |
| 2014/0146212 A1 | 5/2014 | Jung et al. | |
| 2015/0201130 A1 * | 7/2015 | Cho ................... | H04N 5/23293 |
| | | | 348/333.05 |

(Continued)

*Primary Examiner* — Kelly L Jerabek
(74) *Attorney, Agent, or Firm* — Birch, Stewart, Kolasch & Birch, LLP

(57) ABSTRACT

The present invention relates to a mobile terminal and a method of controlling the same. More specifically, the present invention provides a mobile terminal including: a sensing unit; a camera; a display; and a controller, wherein the controller is configured: to execute a camera application; to executed a grid mode in the camera application, the grid mode being a mode of displaying a preview image region and a grid region including at least one cell on the display; to display a first preview image being photographed through the camera in the preview image region; and to capture the first preview image and display the captured first preview image on a first cell of the grid region.

21 Claims, 43 Drawing Sheets

(56) References Cited

U.S. PATENT DOCUMENTS

| | | |
|---|---|---|
| 2015/0234565 A1 | 8/2015 | Yang et al. |
| 2016/0012851 A1* | 1/2016 | Iida .................. H04N 5/91 |
| | | 715/719 |
| 2016/0216871 A1 | 7/2016 | Stamatiou |
| 2016/0381299 A1* | 12/2016 | Miller ................ G06Q 50/01 |
| | | 386/228 |
| 2017/0034444 A1 | 2/2017 | Song et al. |

* cited by examiner

FIG. 27
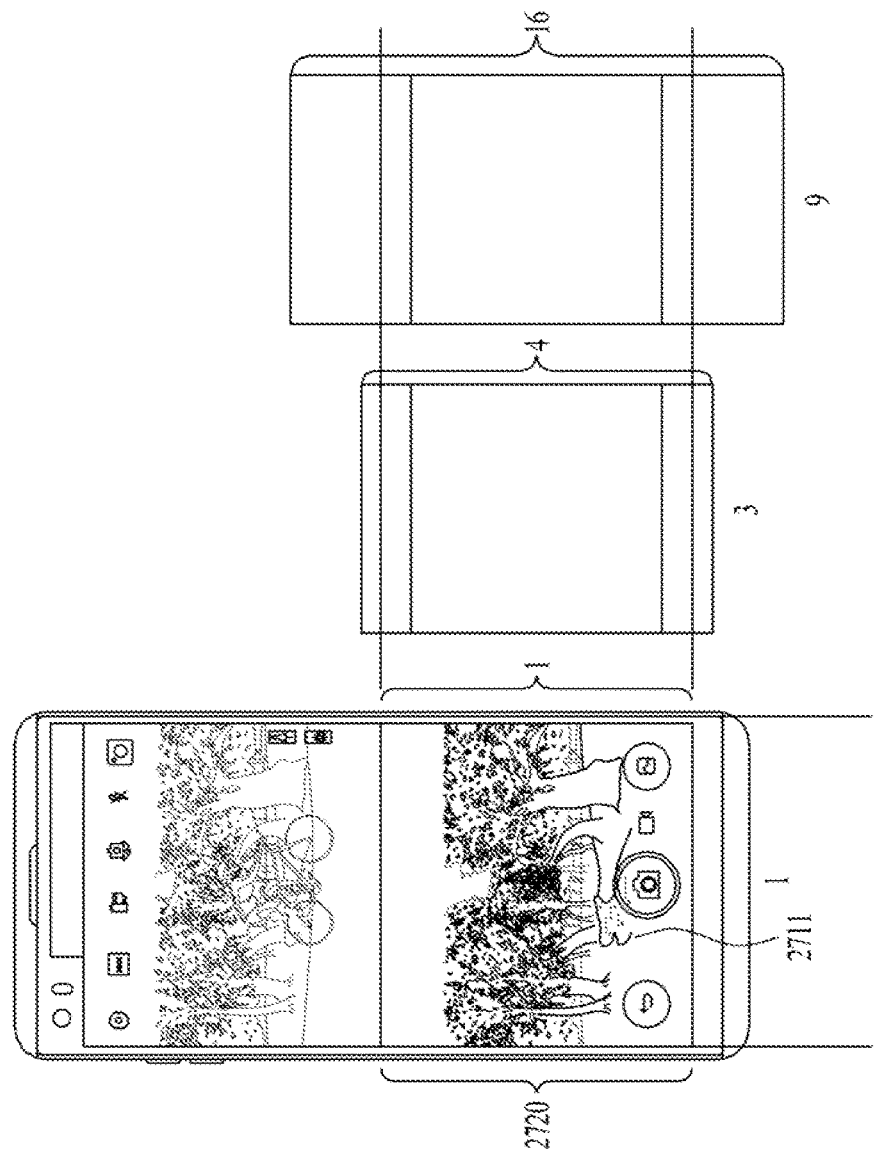
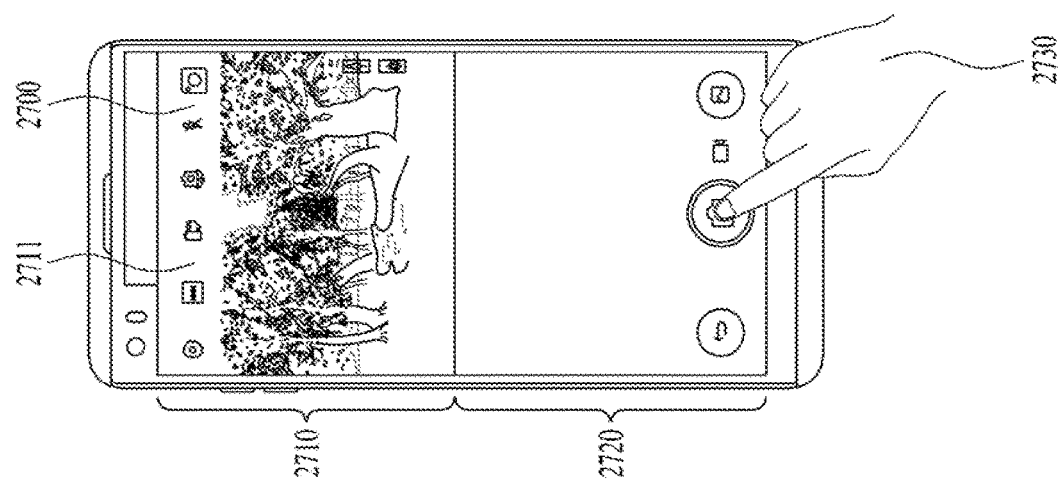

MOBILE TERMINAL AND METHOD OF CONTROLLING THE SAME

This application claims the benefit of Korean Patent Application No. 10-2017-0021673, filed on Feb. 17, 2017, which is hereby incorporated by reference as if fully set forth herein.

BACKGROUND OF THE INVENTION

Field of the Invention

The present invention relates to a mobile terminal and a method of controlling the same. More specifically, the present invention relates to a mobile terminal which executes a grid mode of displaying a preview image region and a grid region having at least one cell in a camera application, and a method of controlling the same.

Discussion of the Related Art

Mobile terminals can be divided into a mobile/portable terminal and a stationary terminal according to mobility. Mobile terminals can be subdivided into a handheld terminal and a vehicle mounted terminal according to portability thereof.

Functions of a mobile terminal are diversified. For example, there are functions of data and voice communication, capturing images and video using a camera, recording voice, playing music files through a speaker system, and outputting images or video through a display. Some terminals additionally have an electronic game play function or execute a multimedia player function. In particular, recent mobile terminals can receive multicast signals providing visual content such as broadcast, video and TV programs.

With the diversification of functions, terminals are implemented in the form of a multimedia player having complex functions such as capturing images or video, playback of music or video files, gaming and broadcast reception.

To support and enhance such functions of terminals, improvement of structural and/or software parts of terminals may be considered.

Recently, images are captured using a camera included in a mobile terminal. However, mobile terminals provide only a function of applying a filter to images or zooming in or zooming out images during capture and a function of editing captured images.

Accordingly, users require functions of checking preview images and automatically arranging images during capture of images or video.

SUMMARY OF THE INVENTION

An object of the present invention is to solve the aforementioned problems and other problems.

Another object of the present invention is to provide a mobile terminal which executes a grid mode of displaying a preview image region in which a preview image being captured using a camera is displayed and a grid region having at least one cell in a camera application, and a method of controlling the same.

According to one aspect of the present invention to accomplish the aforementioned or other objects a mobile terminal includes: a sensing unit; a camera; a display; and a controller, wherein the controller is configured: to execute a camera application; to executed a grid mode in the camera application, the grid mode being a mode of displaying a preview image region and a grid region including at least one cell on the display; to display a first preview image being photographed through the camera in the preview image region; and to capture the first preview image and display the captured first preview image on a first cell of the grid region.

According to one aspect of the present invention, the controller may change the size of the first cell on the basis of a preset event in a case in which the preset event is generated when the first preview image is captured and change a layout of the first cell and remaining neighboring cells on the basis of the first cell changed in size.

According to one aspect of the present invention, the preset event may include preset voice recognition or recognition of a preset object.

According to one aspect of the present invention, when the preset event is an event of recognizing an object included in the first preview image, the controller may change the size of the first cell on the basis of at least one of the size, proportion and type of the recognized object.

According to one aspect of the present invention, when the controller detects rotation of the mobile terminal while the first preview image is displayed in the preview image region, the controller may control the grid region not to automatically rotate.

According to one aspect of the present invention, the controller may identify the first cell upon sensing a first input signal for selecting the first cell, capture a second preview image being photographed through the camera upon recognizing the first cell, and switch the first preview image displayed on the first cell to the second preview image.

According to one aspect of the present invention, the controller may sense a second input signal for controlling the first preview image upon identifying the first cell and change at least one of the size and position of the first preview image according to the second input signal.

According to one aspect of the present invention, when images are displayed on all cells included in the grid region, the controller may display an icon for saving or sharing a grid image and deactivate the preview image region.

According to one aspect of the present invention, the controller may store the grid image and an image displayed on a second cell upon sensing a third input signal for selecting the second cell from among the cells included in the grid region.

According to one aspect of the present invention, the controller may suspend display of the icon and activate the preview image region upon sensing a fourth input signal for selecting the first cell when the icon is displayed.

According to one aspect of the present invention, when the controller captures a third preview image being photographed through the camera while images are displayed on all cells included in the grid region, the controller may determine image quality of a preview image included in the grid region and change a preview image having lowest image quality to the third preview image.

According to one aspect of the present invention, the grid region may include cells arranged in m rows and m columns, m being a natural number, wherein the controller modifies the grid region such that the grid region includes n rows and n columns, n being a natural number different from m, upon sensing a fifth input signal of touching the grid region in a preset manner.

According to one aspect of the present invention, the controller may extract information from at least one previously captured preview image when the grid region includes an empty cell, and display common information on the empty cell on the basis of the extracted information.

According to one aspect of the present invention, when the extracted information is focused objects, the controller may display an image in which only the focused objects are combined on the empty cell.

According to one aspect of the present invention, the controller may display a recommended image list on the basis of the common information upon sensing a sixth input signal for selecting the common information and display a first recommended image on the empty cell upon sensing a seventh input signal for selecting the first recommended image.

According to one aspect of the present invention, the controller may display a sharing target list including at least one sharing target upon sensing an eighth input signal for sharing the grid image when the grid region includes an empty cell, and determine the common information on the basis of the sharing target.

According to one aspect of the present invention, when a grid image is saved while the grid region includes an empty cell, the controller may maintain the empty cell of the grid image in a state in which the empty cell is able to be photographed, capture a fourth preview image being photographed through the camera upon sensing a ninth input signal for re-photographing the empty cell, and display the fourth preview image on the empty cell.

According to one aspect of the present invention, the controller may record a video from a first time when the first preview image is captured to a second time and save the recorded moving images on a third cell.

According to one aspect of the present invention, the controller may extract at least one frame of the video when the grid region includes an empty cell and display an image on the empty cell on the basis of the extracted frame.

According to one aspect of the present invention, there is provided a method of controlling a mobile terminal, comprising: executing a camera application; executing a grid mode in the camera application, the grid mode being a mode of displaying a preview image region and a grid region including at least one cell on a display; displaying a first preview image being photographed through a camera in the preview image region; and capturing the first preview image and displaying the captured first preview image on a first cell of the grid region.

The mobile terminal and the method of controlling the same according to the present invention have the following advantages.

According to at least one embodiment of the present invention, the mobile terminal can capture a preview image and immediately automatically arrange the preview image in a grid region when the preview image which is being captured is displayed in a preview image region.

In addition, according to at least one embodiment of the present invention, when the grid region includes an empty cell, the mobile terminal can display an image on the empty cell on the basis of a captured image to automatically complete a grid image.

The additional scope of applicability of the present invention will become clear from the following detailed description. However, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Thus, specific embodiments such as preferred embodiments of the present invention are exemplary only and not to be construed as limiting the invention.

BRIEF DESCRIPTION OF THE DRAWINGS

FIG. 27 is a diagram for describing an embodiment of capturing images in various proportions in the mobile terminal according to an embodiment of the present invention.

DETAILED DESCRIPTION OF THE INVENTION

Figure 1A:
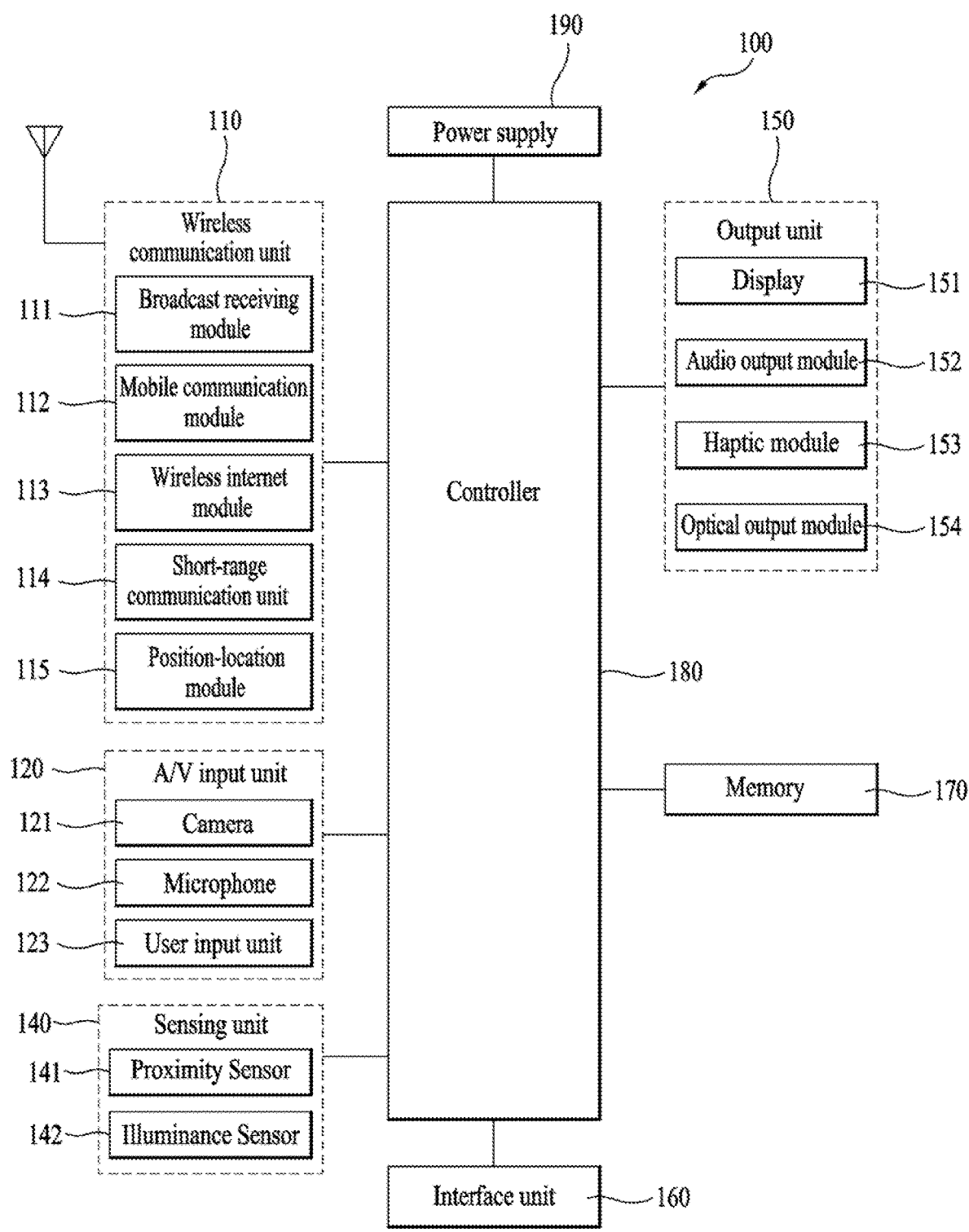
FIG. 1a is a block diagram for describing a mobile terminal related to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc. may be used herein to describe various elements, these elements should not be limited by these terms. These terms are generally only used to distinguish one element from another.

It will be understood that when an element is referred to as being "connected to" another element, the element can be connected with the other element or intervening elements may also be present. In contrast, when an element is referred to as being "directly connected to" another element, there are no intervening elements present.

A singular representation may include a plural representation unless it represents a definitely different meaning from the context Terms such as "includes" and "has" as used herein and should be understood that they are intended to indicate the existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigation systems, personal computers (PCs), slate PCs, tablets, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TVs, desktop computers, digital signage and the like.

Figure 1B:
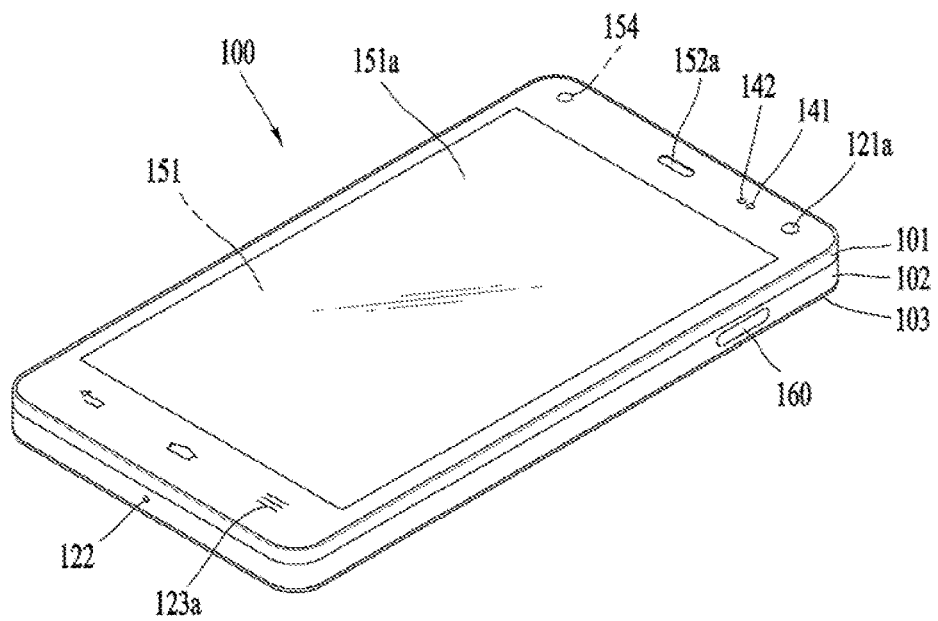
FIGS. 1b and 1c are conceptual diagrams of an example of the mobile terminal related to the present invention, viewed in different directions.
Figure 1C:
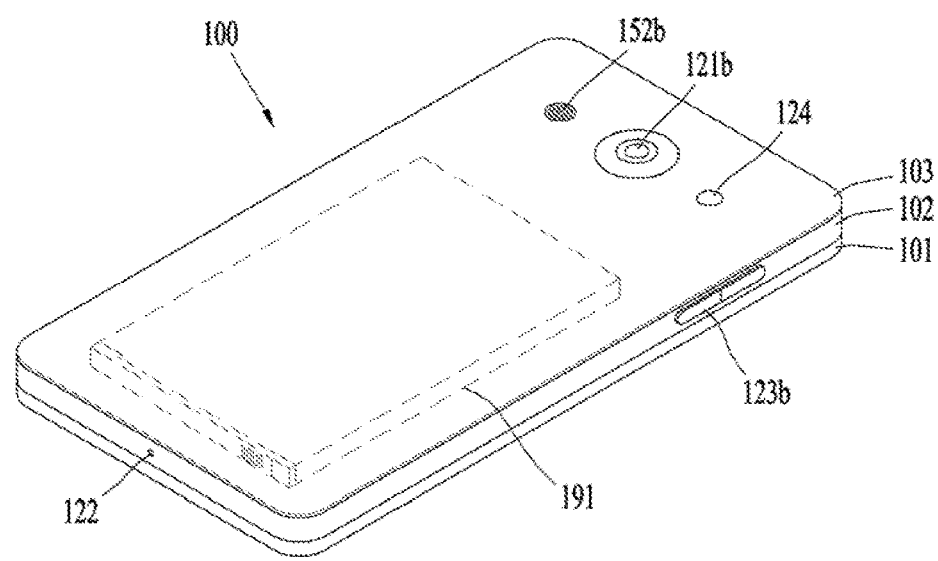

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
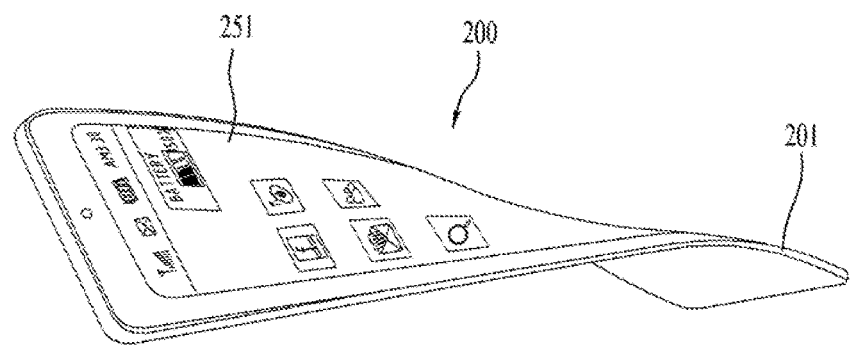
FIG. 2 is a conceptual diagram for describing another example of a flexible mobile terminal according to the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1a-1c.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
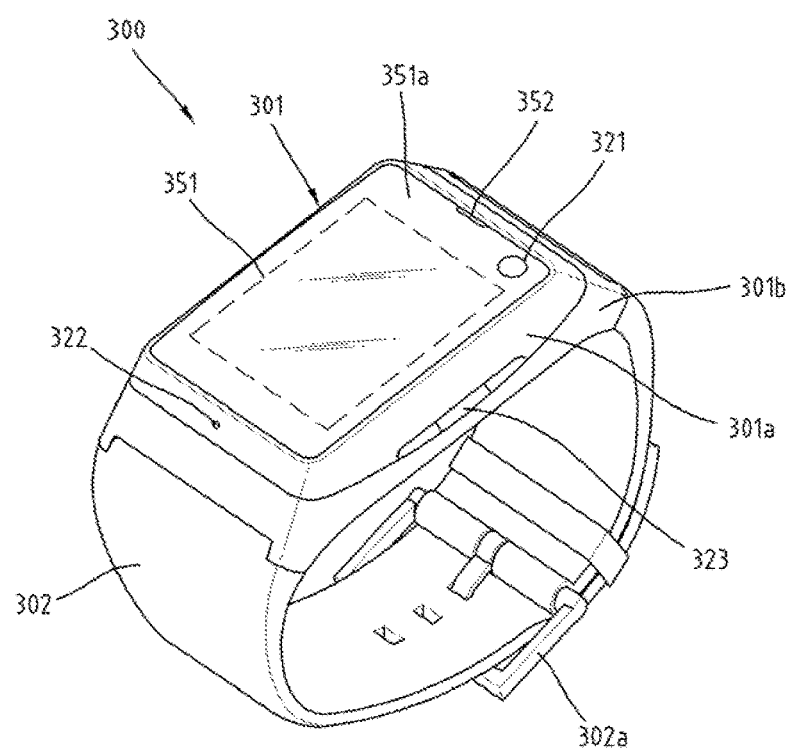
FIG. 3 is a perspective diagram illustrating an example of a watch type mobile terminal related to an embodiment of the present invention.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1a-1c.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

A description will be given of embodiments related to a control method which can be implemented in the aforementioned electronic devices with reference to the attached drawings. Those skilled in the art will appreciate that the present invention may be carried out in other specific ways than those set forth herein without departing from the spirit and essential characteristics of the present invention.

A mobile terminal described below with reference to FIGS. 4 to 42 may be implemented as one of the mobile terminals 100, 200 and 300 shown in FIGS. 1 to 3.

Hereinafter, embodiments of the present invention will be described with reference to FIGS. 4 to 43. In description and understanding of embodiments of the present invention, above description related to FIGS. 1 to 3 may be referred to.

Figure 4:
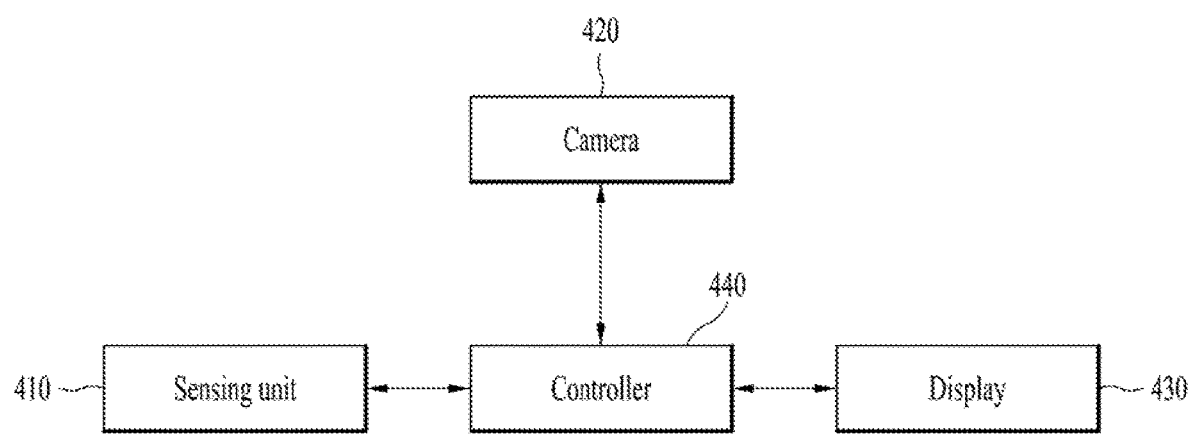
FIG. 4 is a block diagram describing component modules of a mobile terminal according to an embodiment of the present invention.

FIG. 4 is a block diagram illustrating component modules of a mobile terminal according to an embodiment of the present invention.

Referring to FIG. 4, the mobile terminal according to an embodiment of the present invention may include a sensing unit 410, a camera 420, a display 430 and a controller 440.

The sensing unit 410 may sense various inputs applied to the mobile terminal by a user and an environment of the mobile terminal and deliver a sensing result to the controller 440 such that the controller 440 can perform an operation corresponding to the sensing result. In the present invention, the sensing unit 410 may be implemented as a touchscreen by being included in the display 430. In the present invention, the sensing unit 410 may be implemented as the sensing unit 140 shown in FIG. 1a.

In an embodiment of the present invention, the sensing unit 410 may sense a touch input signal from a user. Here, the sensing unit 410 may sense a point at which the touch input signal is detected and a touch area together. Further, the sensing unit 410 may sense a multi-touch input signal. More specifically, the sensing unit 410 may simultaneously sense touch input signals applied to two or more points within a predetermined period of time.

Furthermore, the sensing unit 410 may sense a preset event in the mobile terminal. For example, the sensing unit 410 can recognize preset voice. In addition, the sensing unit 410 may sense movement of the mobile terminal. For example, the sensing unit 410 can sense horizontal rotation or vertical rotation of the mobile terminal.

The camera 420 may process video frames such as a still image or a moving image acquired through an image sensor. The processed video frames may be displayed on the display 430 or stored in the memory 170. In an embodiment of the present invention, the camera 420 may focus on an object included in a still image or a moving image.

The display 430 may display visual information. Here, the visual information may include text, an indicator, an icon, content, an application, an image, video, etc. In addition, the display 430 may display the visual information on a screen on the basis of a control command of the controller 440. Further, the display 430 according to the present invention may be implemented as the display 151 shown in FIG. 1a or the display 351 shown in FIG. 3a.

In an embodiment of the present invention, the display 430 may display a camera application which is being executed. In addition, the display 430 may separately display a preview region and a grid region in the camera application.

The controller 440 may process data, control the aforementioned units of the mobile terminal and control data transmission/reception between units. In the present invention, the controller 440 may be implemented as the controller 180 shown in FIG. 1a.

In an embodiment of the present invention, operations performed by the mobile terminal may be controlled by the controller 440. However, such operations will be described as being performed/controlled by the mobile terminal in the following description and drawings.

Figure 5:
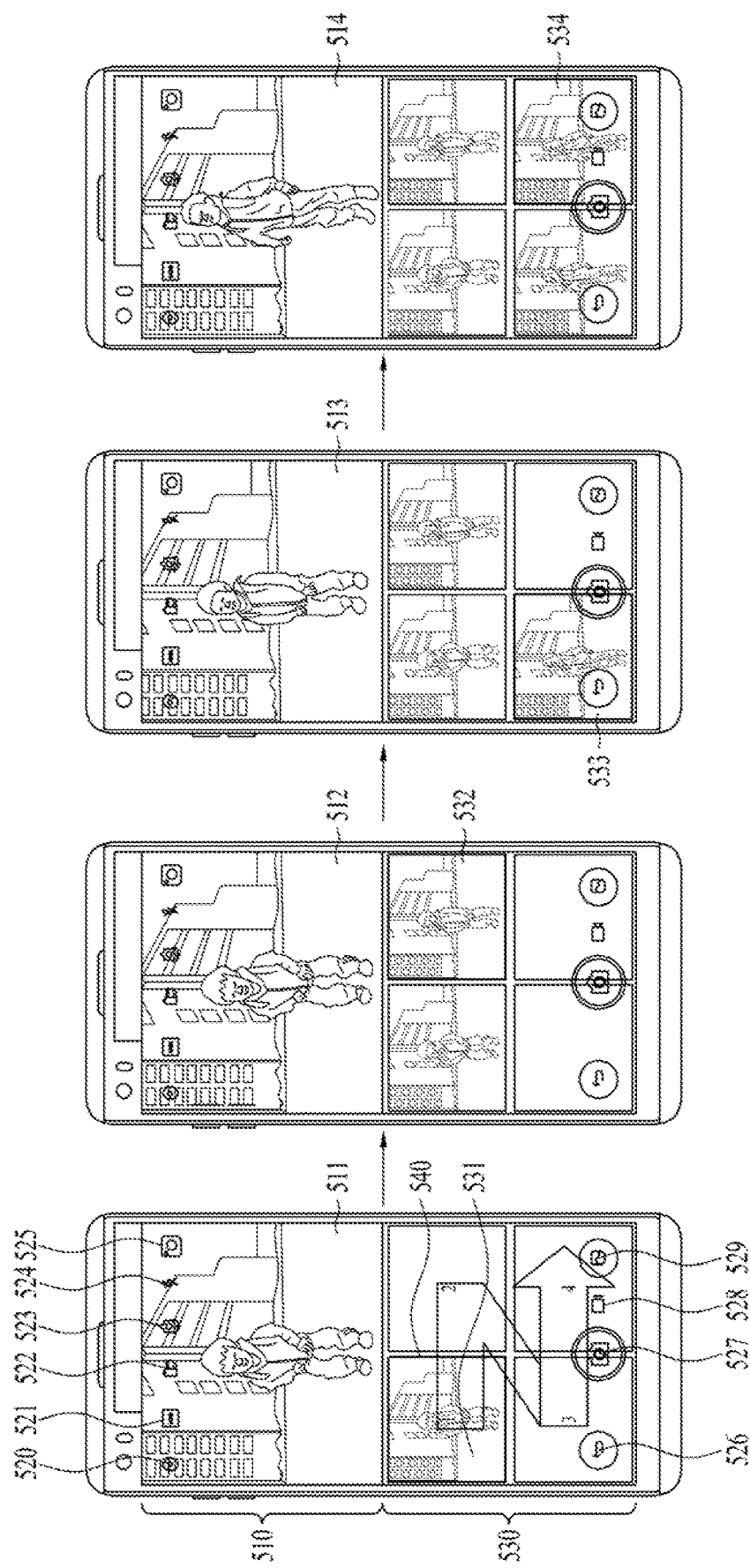
FIG. 5 is a diagram for describing an embodiment of executing a grid mode to capture a preview image in the mobile terminal according to an embodiment of the present invention.

FIG. 5 is a diagram for describing an embodiment of executing a grid mode to capture a preview image in the mobile terminal according to an embodiment of the present invention. Redundant description in FIG. 4 and the embodiment of FIG. 5 will be omitted below for convenience.

In an embodiment of the present invention, the mobile terminal can execute the camera application. Accordingly, the mobile terminal can display the camera application on the display. Here, the camera application can display a first preview image 511 which is being captured using a camera and various icons for controlling the first preview image 511.

Referring to the first drawing of FIG. 5, the mobile terminal may display a setting icon 520, a mode change icon 521, a filter change icon 522, a front/rear camera switching icon 523, a flash control icon 524, a view mode change icon 525, a back icon 526, a capture icon 527, a record icon 528 and a gallery thumbnail icon 529 through the camera application.

More specifically, the setting icon 520 may correspond to an icon for changing settings of the camera application. The mode change icon 521 may correspond to an icon for changing a photographing mode provided by the camera application. The filter change icon 522 may correspond to an icon for changing a photographing filter provided by the camera application. The front/rear camera switching icon 523 may correspond to an icon for changing a currently used camera. The flash control icon 524 may correspond to an icon for controlling automatic on/off of a flash when an image is captured. The view mode change icon 525 may correspond to an icon for changing a view mode of the camera application. For example, view modes of the camera application may include a simple mode, a normal mode and an expert mode.

The aforementioned icon list may be changed according to application and is not necessarily displayed.

In an embodiment of the present invention, the mobile terminal may execute the grid mode in a camera application. Here, the mobile terminal may execute the grid mode according to an input signal for selecting the mode change icon 521. Here, the grid mode may correspond to a mode of displaying a preview image region 510 and a grid region 30 having at least one cell. A cell of a grid may correspond to a virtual indication line in the form of a cell for displaying an image or video in the grid region 530.

More specifically, the mobile terminal may divide the screen of the display into the preview image region 510 and the grid region 530, display the first preview image 511 which is being captured through the camera in the preview image region 510 and display at least one cell in the grid region 530 in the grid mode.

FIG. 5 exemplifies an embodiment in which the grid region 530 includes 4 cells arranged in 2 columns and 2 rows. That is, the number of cells included in the grid region 530 can be set in various manners. However, a case in which the grid region 530 includes 4 cells arranged in 2 columns and 2 rows will be exemplified in the following embodiments illustrated in FIGS. 5 to 21 for convenience of description.

In an embodiment of the present invention, the mobile terminal may sense a first input signal (not shown) for selecting the capture icon 527 while the first preview image 511 is displayed in the preview image region 510. Here, the first input signal corresponds to various input signals for capturing the first preview image 511. For example, the user can directly touch the capture icon 527 and input a signal for selecting the capture icon 527 to the mobile terminal through preset voice recognition.

In an embodiment of the present invention, the mobile terminal may display the first preview image 511 on a first cell 531 upon sensing the first input signal. Here, the mobile terminal may display the first cell 531 on which the first preview image 511 is displayed in a manner of distinguishing the first cell 531 from other cells. For example, the mobile terminal can display an indicator 540 on the first cell 531. Accordingly, the user can recognize that the first preview image 511 which is currently displayed in the preview image region 510 is displayed on the first cell 531.

Referring to the second drawing of FIG. 5, the mobile terminal may display a second preview image 512 which is being captured through the camera in the preview image region 510 while the first preview image 511 is displayed on the first cell 531.

In an embodiment of the present invention, the mobile terminal may sense a second input signal (not shown) for selecting the capture icon 527 while the second preview image 512 is displayed in the preview image region 510. The mobile terminal may display the second preview image 511 on a second cell 532 upon sensing the second input signal. Here, the mobile terminal may display the second cell 532 on which the second preview image 512 will be displayed in a manner of distinguishing the second cell 532 from other cells as in the aforementioned embodiment.

Referring to the third drawing of FIG. 5, the mobile terminal may display a third preview image 513 which is being captured through the camera in the preview image region 510 while the first preview image 511 is displayed on the first cell 531 and the second preview image 512 is displayed on the second cell 532.

In an embodiment of the present invention, the mobile terminal may sense a third input signal (not shown) for selecting the capture icon 527 while the third preview image 513 is displayed in the preview image region 510. The mobile terminal may display the third preview image 513 on a third cell 533 upon sensing the third input signal.

In this manner, the mobile terminal may display a fourth preview image 514 on a fourth cell 534. An embodiment in which preview images or videos are displayed on the first to fourth cells 531, 532, 533 and 534 included in the grid region 530 to complete a grid image will be described below with reference to FIGS. 10 and 11.

Although the second cell 532 is positioned at the right of the first cell 531, the third cell 533 is positioned beneath the first cell 531 and the fourth cell 534 is positioned in a diagonal direction with respect to the first cell 531 in FIG. 5, the positions of the cells can be changed.

Figure 6:
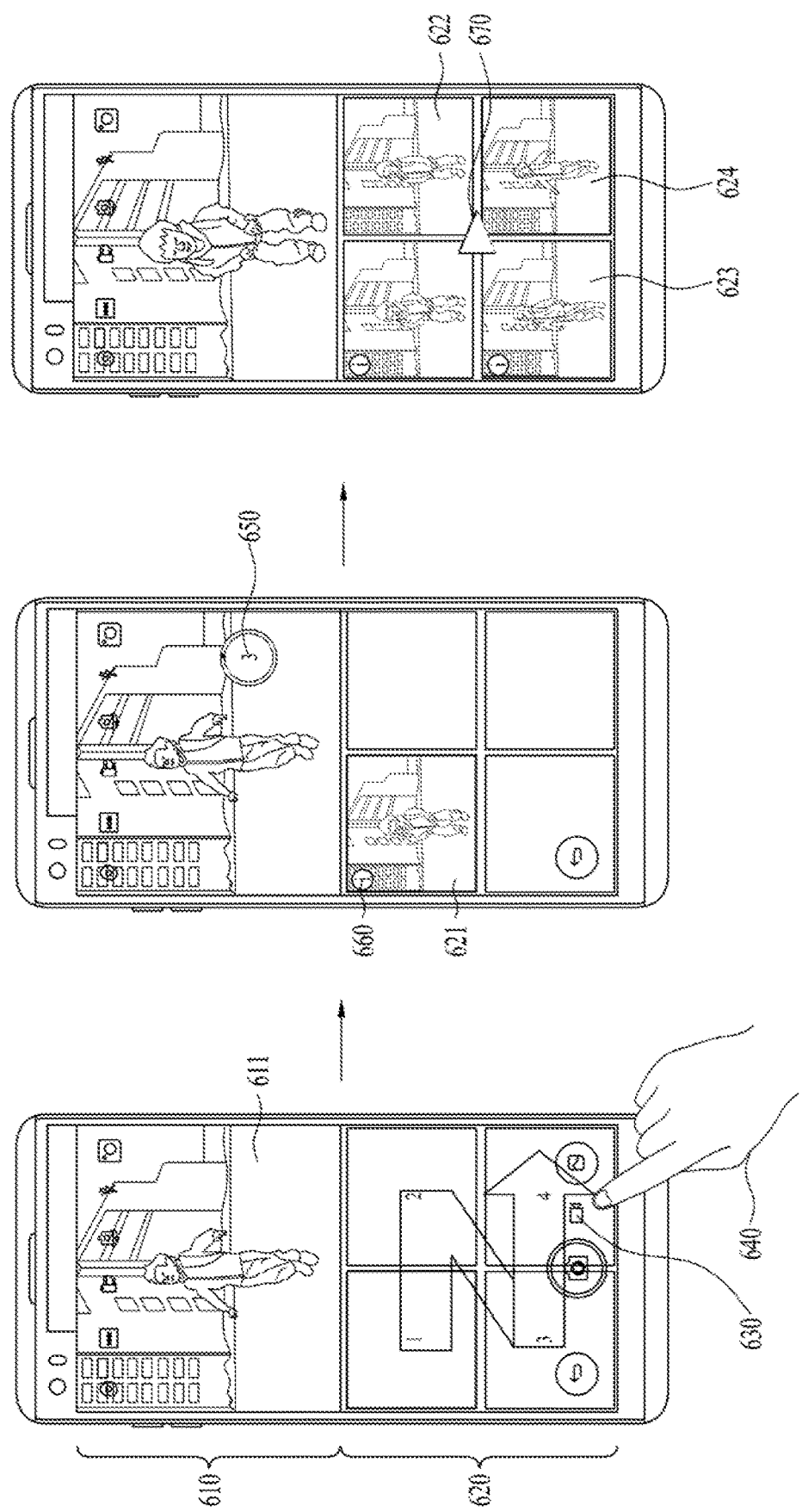
FIG. 6 is a diagram for describing an embodiment of executing the grid mode to record a video in the mobile terminal according to an embodiment of the present invention.

FIG. 6 is a diagram for describing an embodiment of executing the grid mode to record a video in the mobile terminal according to an embodiment of the present invention. Redundant description in FIGS. 4 and 5 and the embodiment of FIG. 6 will be omitted in the following.

In an embodiment of the present invention, the mobile terminal may execute the grid mode in the camera application. More specifically, in the grid mode, the display may be divided into a preview image region 610 and a grid region 620, a first preview image 611 which is being captured through the camera may be displayed in the preview image region 610 and at least one cell may be displayed in the grid region 620.

Referring to the first drawing of FIG. 6, the mobile terminal may sense a first input signal 640 for selecting a record icon 630 while the first preview image 611 is displayed in the preview image region 610. Here, the first input signal 640 corresponds to an input signals for recording the first preview image 611. For example, the user can touch the record icon 630 with preset pressure.

In an embodiment of the present invention, the mobile terminal may record the first preview image 611 for a preset period of time from the time when the first input signal 640 is sensed. For example, the mobile terminal can record the first preview image 611 for 3 seconds from when the record icon is selected.

In another embodiment of the present invention, the mobile terminal may record the first preview image 611 until a second input signal (not shown) for selecting the record icon 630 is sensed after sensing the first input signal 640.

In an embodiment of the present invention, the mobile terminal may display a recording indicator 650 for indicating that the first preview image 611 is being recorded in the preview image region 610 while the first preview image 611 is recorded. Here, the recording indicator 650 can indicate a preset time. For example, when the preset time is 3 seconds, the mobile terminal can display a remaining recording time of the first preview image 611 through the recording indicator 650.

In an embodiment of the present invention, the mobile terminal may suspend display of the capture icon, the record icon 630 and the gallery thumbnail icon while the first preview image 611 is recorded. That is, the mobile terminal may display only the back icon during recording of the first preview image 611.

Referring to the second drawing of FIG. 6, the mobile terminal may display a first thumbnail of the first preview image 611 recorded for a preset time from when the first input signal 6430 is sensed on a first cell 621. Here, the first thumbnail may correspond to a scene of recorded frames. As in the above-described embodiment, the mobile terminal may display the first cell 621 on which the first preview image 611 will be displayed in a manner of discriminating the first cell 621 from other cells.

In an embodiment of the present invention, the mobile terminal may display a video icon 660 for indicating that the first thumbnail displayed on the first cell 621 is a thumbnail corresponding to a video on the first thumbnail.

Referring to the third drawing of FIG. 6 with referent to the above-described embodiment, the mobile terminal may display the first thumbnail of the recorded first preview image 611 on the first cell 621, display a captured second preview image (not shown) on a second cell 622, display a third thumbnail of a recorded third preview image (not shown) on a third cell 623, and display a captured fourth preview image (not shown) on a fourth cell 624.

That is, the mobile terminal may capture or record preview images displayed in the preview image region 610 and display the captured or recorded preview images on the first to fourth cells 621, 622, 623 and 624.

In an embodiment of the present invention, when thumbnails corresponding to a video are displayed on the first to fourth cells 621, 622, 623 and 624 of the grid region 620, the mobile terminal may display a playback icon 670 on the grid region 620. The mobile terminal may play the video corresponding to the thumbnails included in the first to fourth cells 621, 622, 623 and 624 upon sensing an input signal (not shown) for selecting the playback icon 670.

Although embodiments based on images will be described below, a video can be applied to all embodiments.

Figure 7:
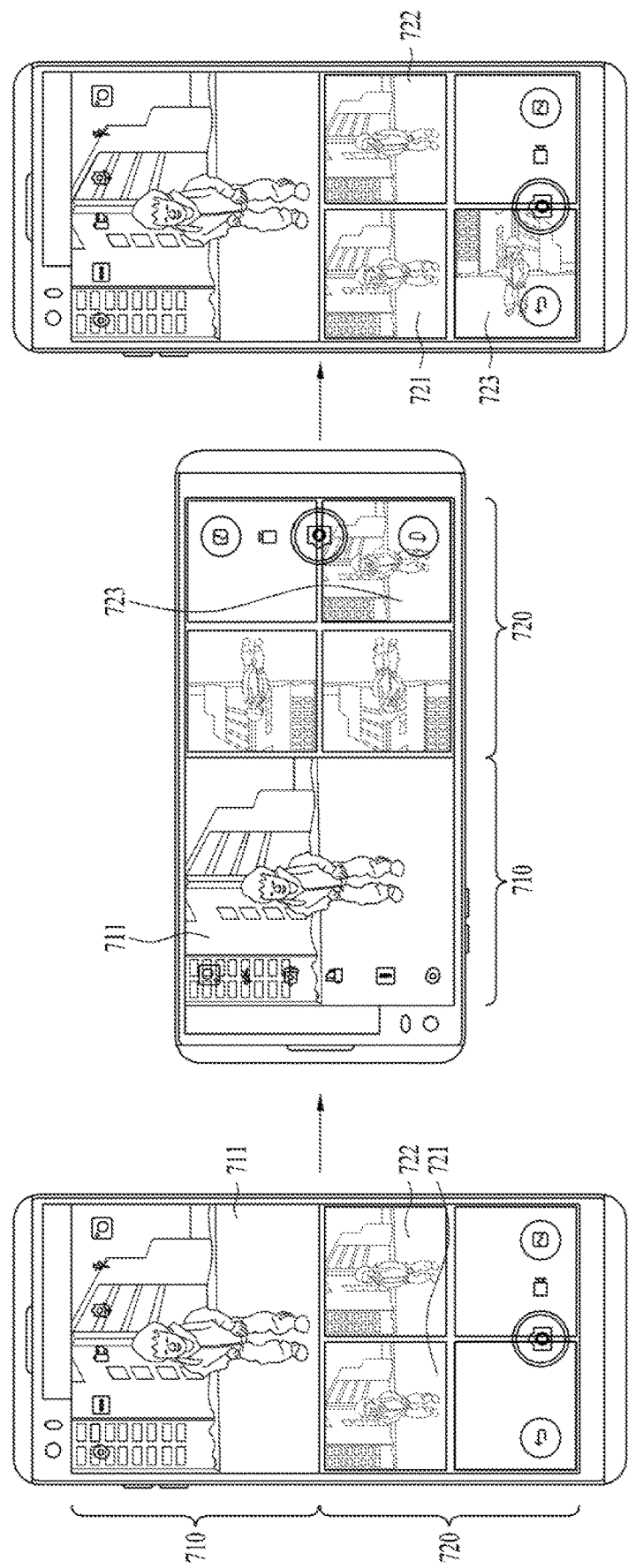
FIG. 7 is a diagram for describing an embodiment of executing the grid mode to change the orientation of the mobile terminal according to an embodiment of the present invention.

FIG. 7 is a diagram for describing an embodiment of executing the grid mode to change the orientation of the mobile terminal according to an embodiment of the present invention. Redundant description in FIGS. 4, 5 and 6 and the embodiment of FIG. 7 will be omitted below.

The first drawing of FIG. 7 corresponds to the second drawing of FIG. 5. That is, the mobile terminal may display a preview image 711 in a preview image region 710 and display a captured preview image on a first cell 721 and a second cell 722 of the grid region 720. Here, an object included in the preview image 711 may correspond to a state in which the mobile terminal is in the portrait orientation.

Referring to the second drawing of FIG. 7, the mobile terminal may control cells included in the grid region 720 not to automatically rotate when rotation of the mobile terminal is detected while the preview image 711 is displayed in the preview image region 710.

More specifically, the mobile terminal may sense rotation of the mobile terminal through a gyroscope sensor included therein. For example, the user can rotate the mobile terminal from the portrait mode to the landscape mode.

In an embodiment of the present invention, the preview image region 710 displayed through the mobile terminal displays an image displayed through the camera intact, and thus the preview image 711 displayed in the preview image region 710 can remain without rotating even when the mobile terminal rotates.

On the other hand, the mobile terminal can rotate displayed content on the basis of the direction in which the mobile terminal rotates upon sensing rotation thereof.

However, the user may intend to display a preview image in various directions in completion of the grid region 720, and thus the mobile terminal may be controlled such that the cells included in the grid region 720 do not rotate when the mobile terminal rotates in the present invention.

Accordingly, when the mobile terminal senses an input signal for capturing the preview image 711, the preview image 711 including an object in the vertical direction can be displayed on the third cell 723 intact.

That is, when the mobile terminal rotates into the landscape mode after the preview image 711 is captured, the object included in the first cell 721 and the second cell 722 and the object included in the third cell 723 can be displayed in different directions.

Figure 8:
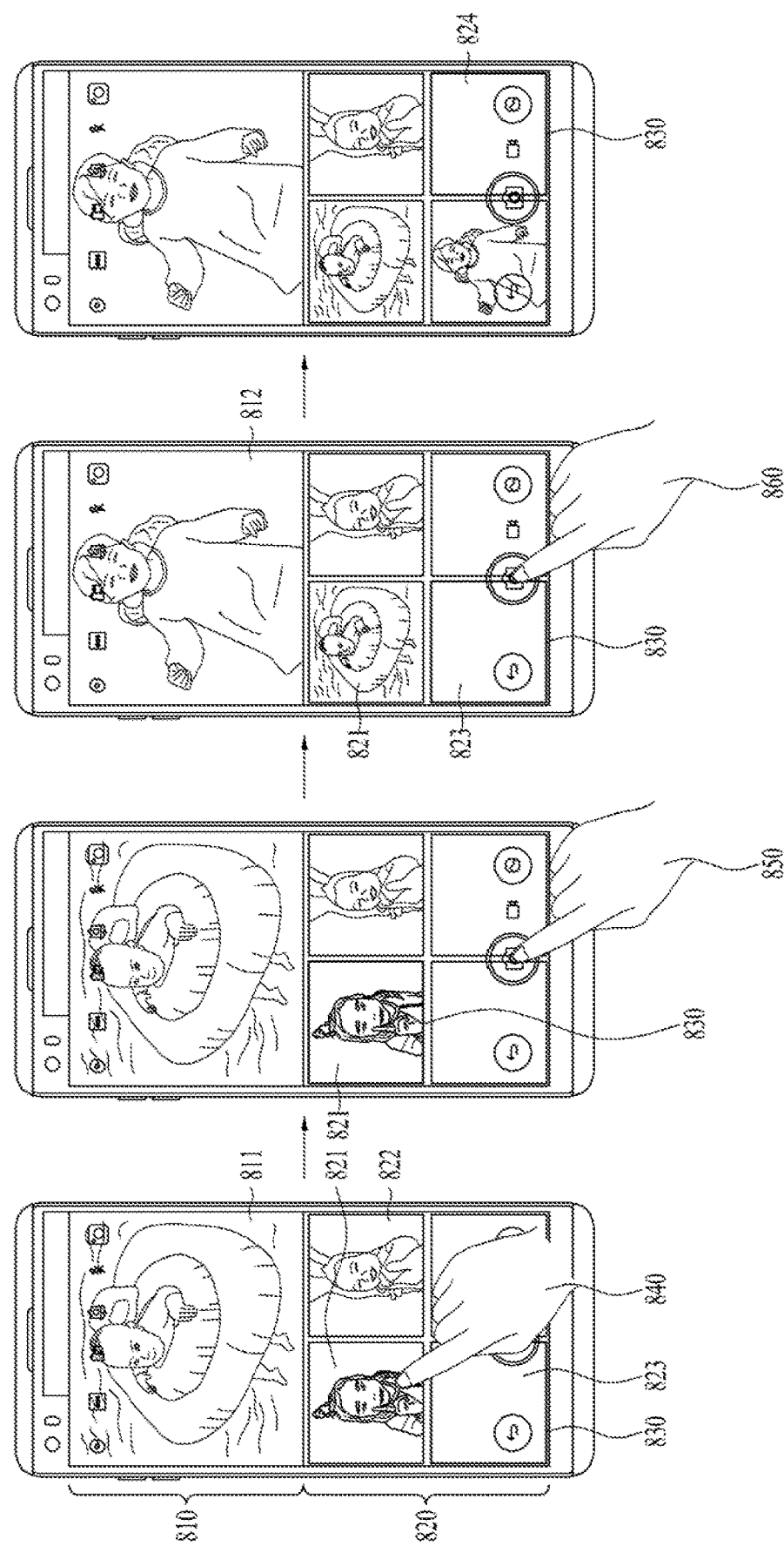
FIG. 8 is a diagram for describing an embodiment of executing the grid mode to change a captured preview image in the mobile terminal according to an embodiment of the present invention.

FIG. 8 is a diagram for describing an embodiment of executing the grid mode to change a captured preview image in the mobile terminal according to an embodiment of the present invention. Redundant description in FIGS. 4 to 7 and the embodiment of FIG. 8 will be omitted below.

The first diagram of FIG. 8 corresponds to the second drawing of FIG. 5. That is, the mobile terminal may display a first preview image 811 in a preview image region 810 and display captured preview images on a first cell 821 and a second cell 822 of a grid region 820.

Here, when the first preview image 811 is captured, the mobile terminal may display a frame indicator 830 on a third cell 823 on which the first preview image 811 will be displayed.

In an embodiment of the present invention, the mobile terminal may sense a first input signal 840 for selecting the first cell 821.

Referring to the second drawing of FIG. 8, the mobile terminal may select the first cell 821 upon sensing the first input signal 840. Here, the mobile terminal may display the first cell 821 in a manner of distinguishing the first cell 821 from other cells. More specifically, the mobile terminal may move the frame indicator 830 from the third cell 823 to the first cell 821. That is, the mobile terminal may indicate that the currently captured preview image will be displayed on the first cell 821 using the indicator.

In an embodiment of the present invention, the mobile terminal may capture the first preview image 811 which is being photographed through the camera upon recognition of the first cell 821. Here, the mobile terminal may sense a second input signal 850 for selecting the capture icon while the first preview image 811 is displayed in the preview image region 810.

Referring to the third drawing of FIG. 8, the mobile terminal may change the previously captured image displayed on the first cell 821 to the first preview image 811 upon sensing the second input signal 850 for capturing the first preview image 811. In this manner, an image displayed in the grid region 820 may be changed.

In an embodiment of the present invention, the mobile terminal may display a frame indicator 830 on the third cell 823. More specifically, captured images are displayed on the first cell 821 and the second cell 822 as in the first drawing of FIG. 8 after the image displayed on the first cell 821 is changed, the mobile terminal may display the frame indicator 830 on the third cell 823 on which the next preview image will be displayed.

In an embodiment of the present invention, the mobile terminal may display a second preview image 812 in the preview image region 810. The mobile terminal may sense a third input signal 860 for selecting the capture icon while the second preview image 812 is displayed in the preview image region 810 and the frame indicator 830 is displayed on the third cell 823 of the grid region 820.

Referring to the fourth drawing of FIG. 8, the mobile terminal may display the second preview image 812 on the third cell 823 upon sensing the third input signal 860. In addition, the mobile terminal may display the frame indicator 830 on the fourth cell 824 on which the next preview image will be displayed.

Figure 9:
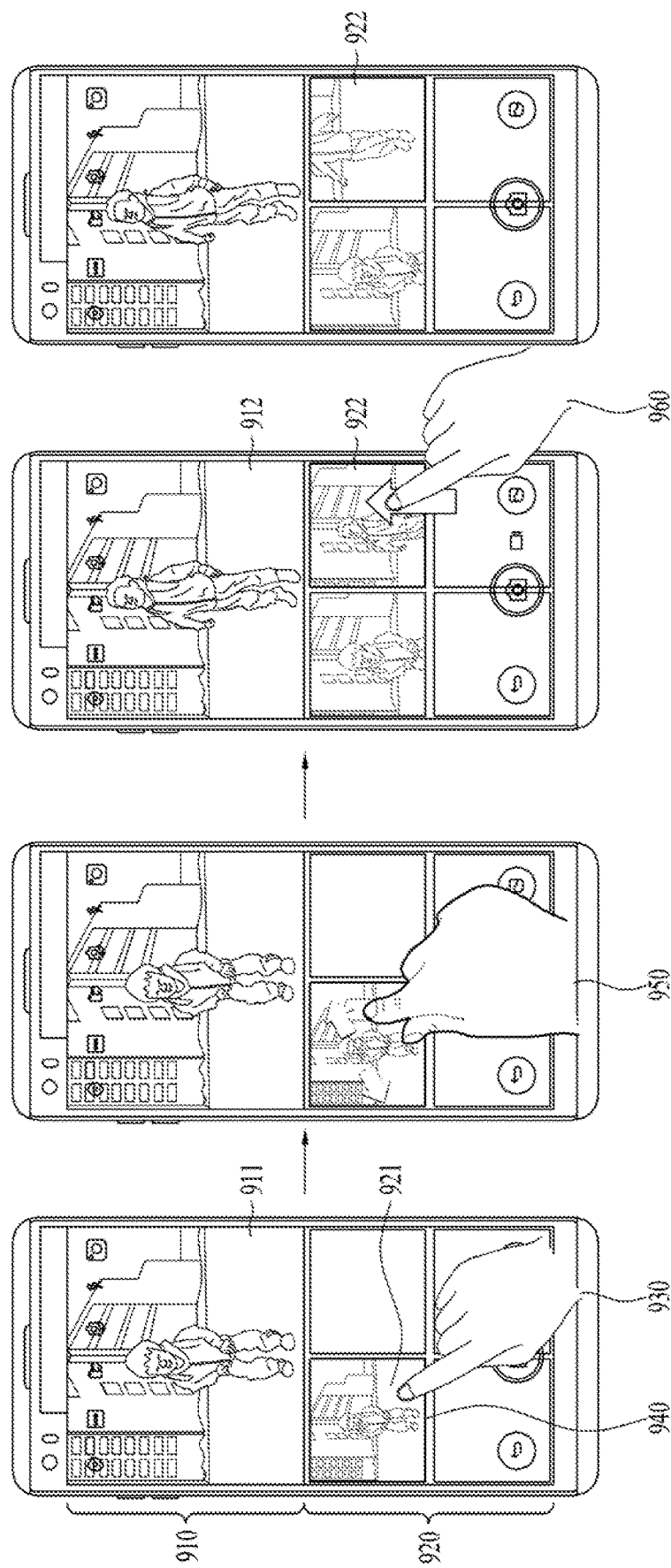
FIG. 9 is a diagram for describing an embodiment of executing the grid mode to change the size and position of a captured preview image in the mobile terminal according to an embodiment of the present invention.

FIG. 9 is a diagram for describing an embodiment of executing the grid mode to change the size and position of a captured preview image in the mobile terminal according to an embodiment of the present invention. Redundant description in FIGS. 4 to 8 and the embodiment of FIG. 9 will be omitted below.

The first diagram of FIG. 9 corresponds to the second drawing of FIG. 5. That is, the mobile terminal may display a first preview image 911 in a preview image region 910, capture the displayed preview image 911 and display the captured preview image 911 on a first cell 921 of a grid region 920.

In an embodiment of the present invention, the mobile terminal may sense a first input signal 930 for selecting the first cell 921 on which the first preview image 911 is displayed.

The mobile terminal may select the first cell 921 upon sensing the first input signal 930. For example, the mobile terminal can display a frame indicator 940 on the first cell 921.

Referring to the second drawing of FIG. 9, the mobile terminal may sense a second input signal 950 for controlling the first preview image 911 displayed on the first cell 921 upon recognition of the first cell 921. For example, the second input signal 950 may correspond to a touch input signal of touching the first preview image 911 and then pinching out the same.

The mobile terminal may change at least one of the size and position of the displayed first preview image 911 upon sensing the second input signal 950. Referring to the above-described example, the mobile terminal can increase the size of the first preview image 911 upon sensing the second input signal 950 corresponding to pinch-out touch input. In the same manner, the size of the first preview image 911 can be controlled to decrease when the second touch input 950 corresponds to pinch-in touch input.

Referring to the third drawing of FIG. 9, the mobile terminal may capture a second preview image 912 currently photographed and displayed in the preview image region 910 while the first preview image 911 displayed on the first cell 921 has been zoomed in. The mobile terminal may display the captured second preview image 912 on the second cell 922. That is, the third drawing of FIG. 9 corresponds to the second drawing of FIG. 5.

In an embodiment of the present invention, the mobile terminal may sense a third input signal (not shown) for selecting the second cell 922 on which the second preview image 912 is displayed. The mobile terminal may sense a fourth input signal 960 for controlling the second preview image 912 displayed on the second cell 922 upon recognition of the second cell 922 according to the third input signal. For example, the fourth input signal 960 may correspond to a touch input signal of touching the second preview image 912 and then dragging the same upward.

Referring to the fourth drawing of FIG. 9, the mobile terminal may change the position of the second preview image 912 displayed on the second cell 922 upon sensing the fourth input signal 960. Referring to the above-described example, the mobile terminal can move the position of the second preview image 912 upward on the second cell 922 upon sensing a touch input signal of dragging upward as the fourth input signal 960. In the same manner, the position of the second preview image 912 can be moved downward when the fourth input signal 960 corresponds to touch input of dragging downward.

Accordingly, the user can differently change the sizes and positions of images displayed on the multiple cells included in the grid region 920 such that the cells included in the grid region 920 have objects having various sizes or positions.

Figure 10:
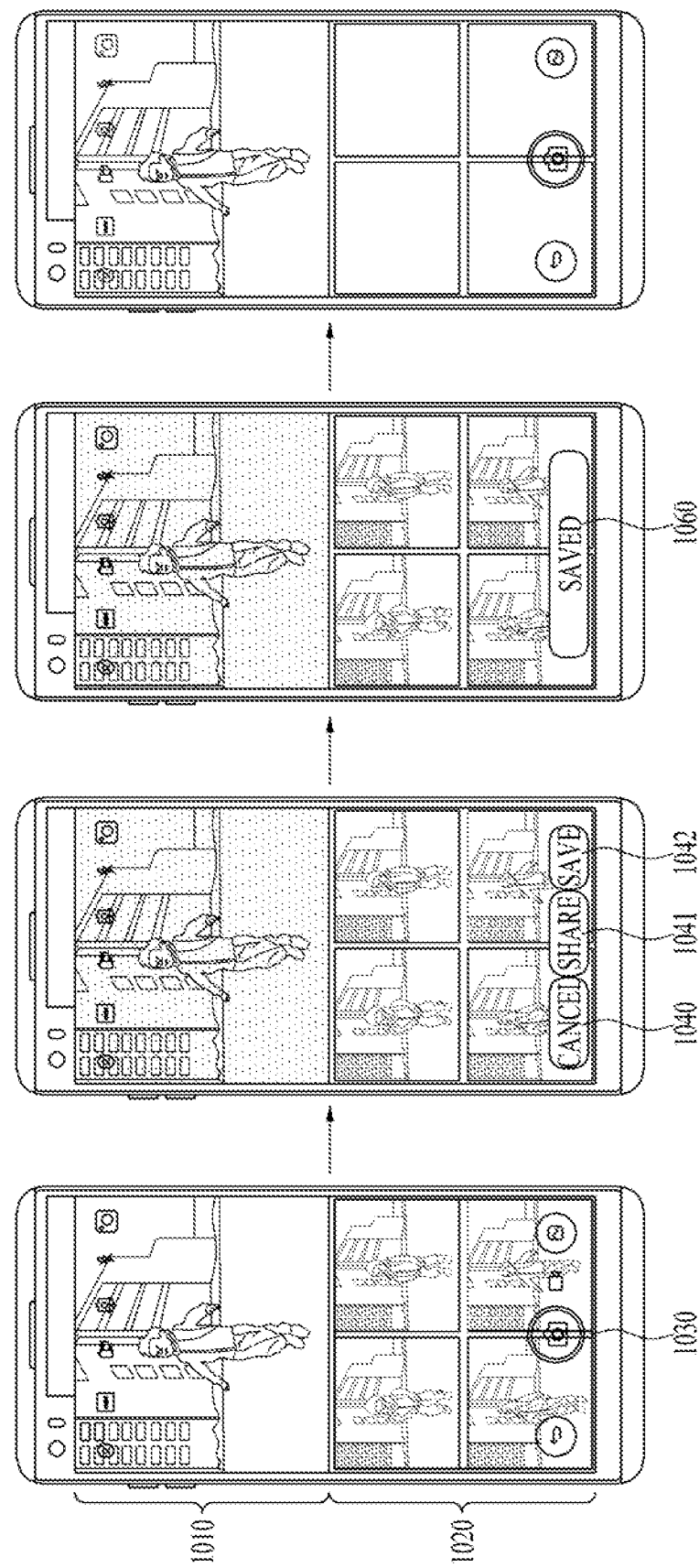
FIG. 10 is a diagram for describing an embodiment of completing a grid image in the mobile terminal according to an embodiment of the present invention.

FIG. 10 is a diagram for describing an embodiment of completing a grid image in the mobile terminal according to an embodiment of the present invention. Redundant description in FIGS. 4 to 9 and the embodiment of FIG. 10 will be omitted below.

The first drawing of FIG. 10 may correspond to the fourth drawing of FIG. 5. That is, the mobile terminal may display preview images on all of the first to fourth cells included in the grid region 1020 to complete a grid image 1030.

Referring to the second drawing of FIG. 10, the mobile terminal may display icons for controlling the completed grid image 1030 when images are displayed on all cells included in the grid region 1020.

More specifically, the mobile terminal may display a cancel icon 1040, a share icon 1041 and a save icon 1042 in the grid region 1020. Here, the mobile terminal can cancel saving or sharing of the completed grid image 1030 and return to the previous state upon selection of the cancel icon 1040. In addition, the mobile terminal can execute a function of sharing the completed grid image 1030 with another device or a server upon selection of the share icon 1041.

Further, the mobile terminal can execute a function of saving the completed grid image 1030 therein upon selection of the save icon 1042.

In an embodiment of the present invention, the mobile terminal may deactivate the preview image region 1010 when images are displayed on all of the cells included in the grid region 1020. For example, the mobile terminal can darken the preview image region 1010 in gray. In addition, the mobile terminal may sense a first input signal 1050 for selecting the save icon 1042.

Referring to the third drawing of FIG. 10, the mobile terminal may save the completed grid image 1030 upon sensing the first input signal 1050. Further, the mobile terminal may display a save complete pop-up 1060 on the display upon sensing the first input signal 1050. The user can save the completed grid image 1030 through the save complete pop-up 1060.

Referring to the fourth drawing of FIG. 10, the mobile terminal may display all cells of the grid region 1020 as empty cells when the completed grid image 1030 is saved. When the completed grid image 1030 is saved, the mobile terminal may activate the deactivated preview image region 1010. For example, the mobile terminal can output the darkened preview image region 1010 in gray as the original preview image region 1010.

That is, when the completed grid image 1030 is saved, the mobile terminal can activate the preview image region 1010 for generating the next grid image and maintain the grid region 1020 in an empty cell state.

Figure 11:
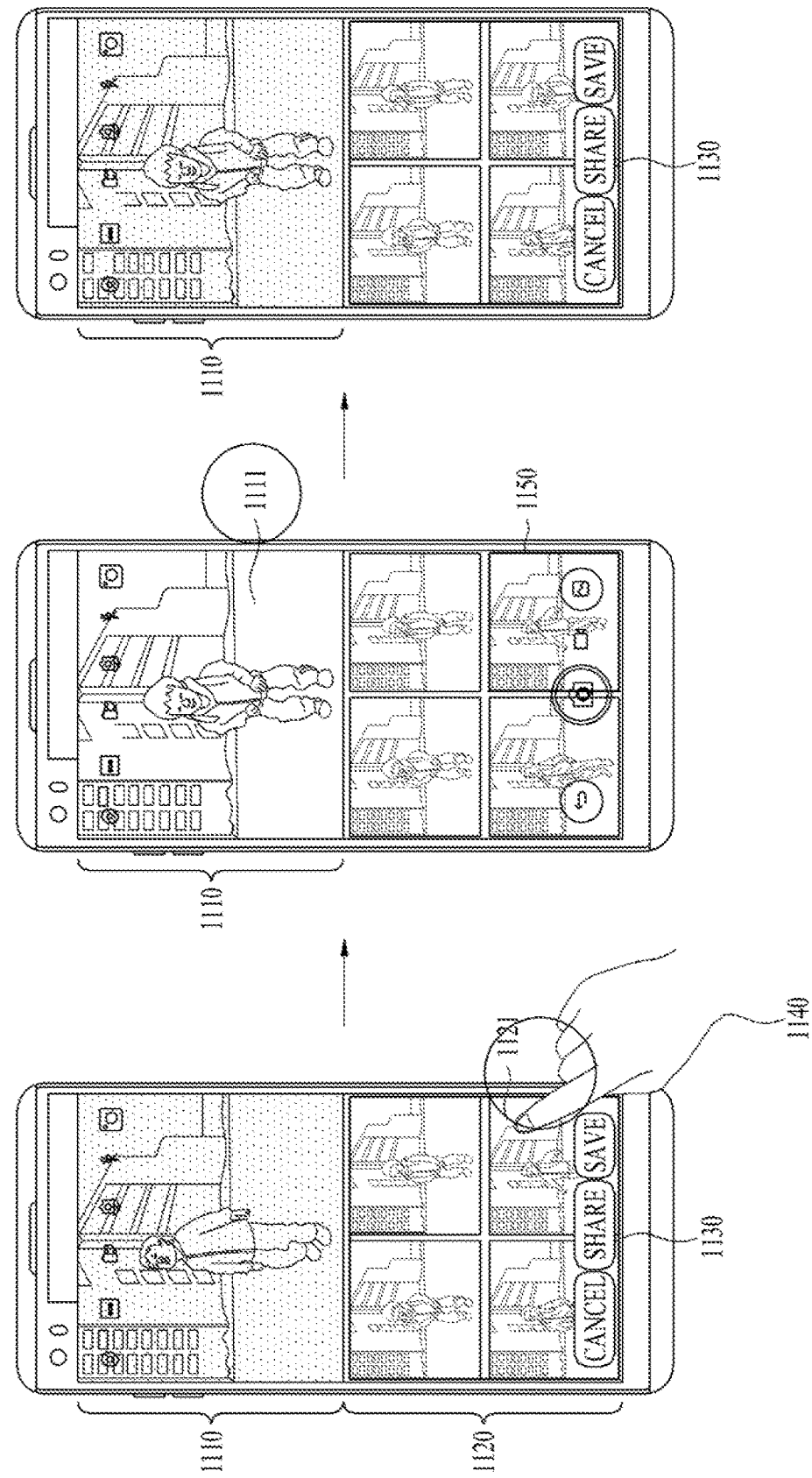
FIG. 11 is a diagram for describing another embodiment of completing a grid image in the mobile terminal according to an embodiment of the present invention.

FIG. 11 is a diagram for describing another embodiment of completing a grid image in the mobile terminal according to an embodiment of the present invention. Redundant description in FIGS. 4 to 10 and the embodiment of FIG. 11 will be omitted below.

The first drawing of FIG. 11 corresponds to the second drawing of FIG. 10. That is, the mobile terminal may display images on all cells included in a grid region 1120. That is, the first drawing of FIG. 11 may correspond to a state in which a grid image 1130 is completed.

In an embodiment of the present invention, the mobile terminal may deactivate a preview image region 1110 when the grid image 1130 is completed. Further, the mobile terminal may display icons for controlling the completed grid image 1130.

In an embodiment of the present invention, the mobile terminal may sense a first input signal 1140 for selecting a first cell 1121 while the icons are displayed.

Referring to the second drawing of FIG. 11, the mobile terminal may suspend display of the icons and activate the preview image region 1110 upon sensing the first input signal 1140. That is, the mobile terminal may edit the complete grid image 130 upon sensing the first input signal 1140.

In an embodiment of the present invention, the mobile terminal may display a frame indicator 1150 on the selected first cell 1121 upon sensing the first input signal 1140. Accordingly, the user can recognize that the currently edited cell is the first cell 1121.

Therefore, the mobile terminal may display a first preview image 111 on the first cell 1121 upon sensing a second input signal (not shown) for capturing the first preview image 111 currently displayed in the preview image region 1110.

Referring to the third drawing of FIG. 11, the mobile terminal may display icons for controlling the completed grid image 1130 and deactivate the preview image region 1110 when images are displayed on all cells included in the grid region 1120.

Accordingly, the mobile terminal may change the image displayed on the first cell 1121 and save or share the newly completed grid image 1130 according to the first input signal 1140 and the second input signal.

Figure 12:
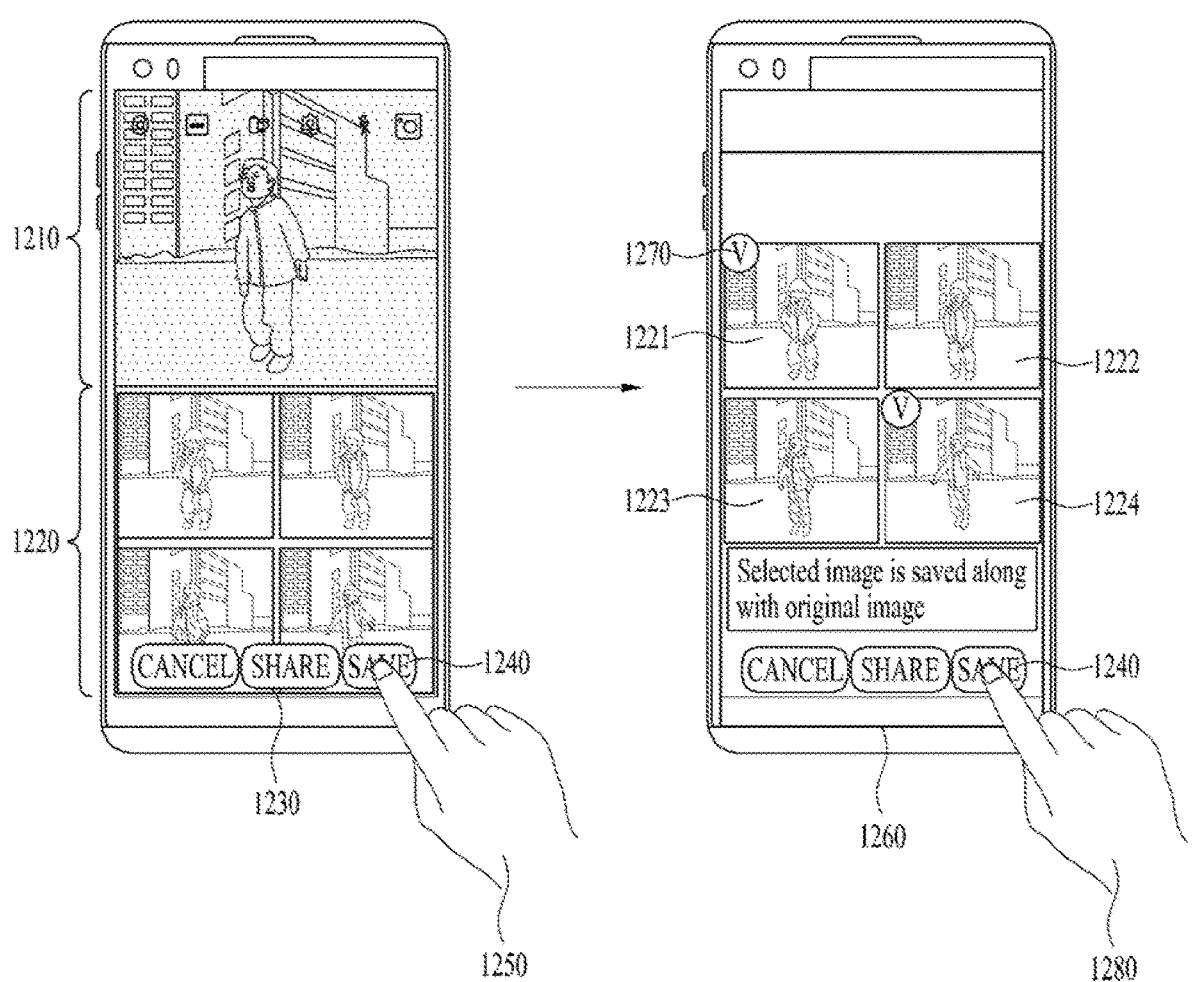
FIG. 12 is a diagram for describing an embodiment of storing a grid image in the mobile terminal according to an embodiment of the present invention.

FIG. 12 is a diagram for describing another embodiment of storing a grid image in the mobile terminal according to an embodiment of the present invention. Redundant description in FIGS. 4 to 11 and the embodiment of FIG. 12 will be omitted below.

The first drawing of FIG. 12 corresponds to the first drawing of FIG. 11. That is, the mobile terminal may deactivate a preview image region 1210 when a grid image 1230 is completed and display icons for controlling the completed grid image 1230 in a grid region 1220.

In an embodiment of the present invention, the mobile terminal may sense a first input signal 1250 for selecting a save icon 1240.

Referring to the second drawing of FIG. 12, the mobile terminal may display a to-be-saved image selection pop-up 1260 on the display upon sensing the first input signal 1250. Here, the to-be-saved image selection pop-up 1260 may be displayed on the camera application.

More specifically, in the embodiment of FIG. 12, the mobile terminal may individually save images displayed on first to fourth cells 1221, 1222, 1223 and 1224 instead of saving only the completed grid image 1230, distinguished from FIG. 10.

In an embodiment of the present invention, the mobile terminal may determine a recommended image among the images displayed on the first to fourth cells 1221, 1222, 1223 and 1224. For example, the mobile terminal can determine a stabilized image among the images displayed on the first to fourth cells 1221, 1222, 1223 and 1224 as a recommended image. Referring to the second drawing of FIG. 12, the mobile terminal can determine images displayed on the first cell 1221 and the fourth cell 1224 as recommended images.

In another embodiment of the present invention, the mobile terminal may select an image to be saved among the images displayed on the first to fourth cells 1221, 1222, 1223 and 1224. For example, the user can select some of the images displayed on the first to fourth cells 1221, 1222, 1223 and 1224.

In an embodiment of the present invention, the mobile terminal may display an identification indicator 1270 for identifying an image determined as a recommended image or selected by the user.

In an embodiment of the present invention, the mobile terminal may save an image determined as a recommended image or selected by the user along with the completed grid image 1230.

More specifically, in the mobile terminal, some of the images displayed on the first to fourth cells 1221, 1222, 1223 and 1224 may be determined as recommended images or selected by the user while the to-be-stored image selection pop-up 1260 is displayed. The mobile terminal may sense a second input signal 1280 for selecting a save icon 1240 upon automatic determination or selection of images.

The mobile terminal may save the completed grid image 1230 and the determined or selected images upon sensing a second input signal 1280. Referring to the above-described example, the mobile terminal may save the grid image 1230, the image displayed on the first cell 1221 and the image displayed on the fourth cell 1224 upon sensing the second input signal 1280. Here, the saved images displayed on the first cell 1221 and the fourth cell 1224 may correspond to the original image.

Figure 13:
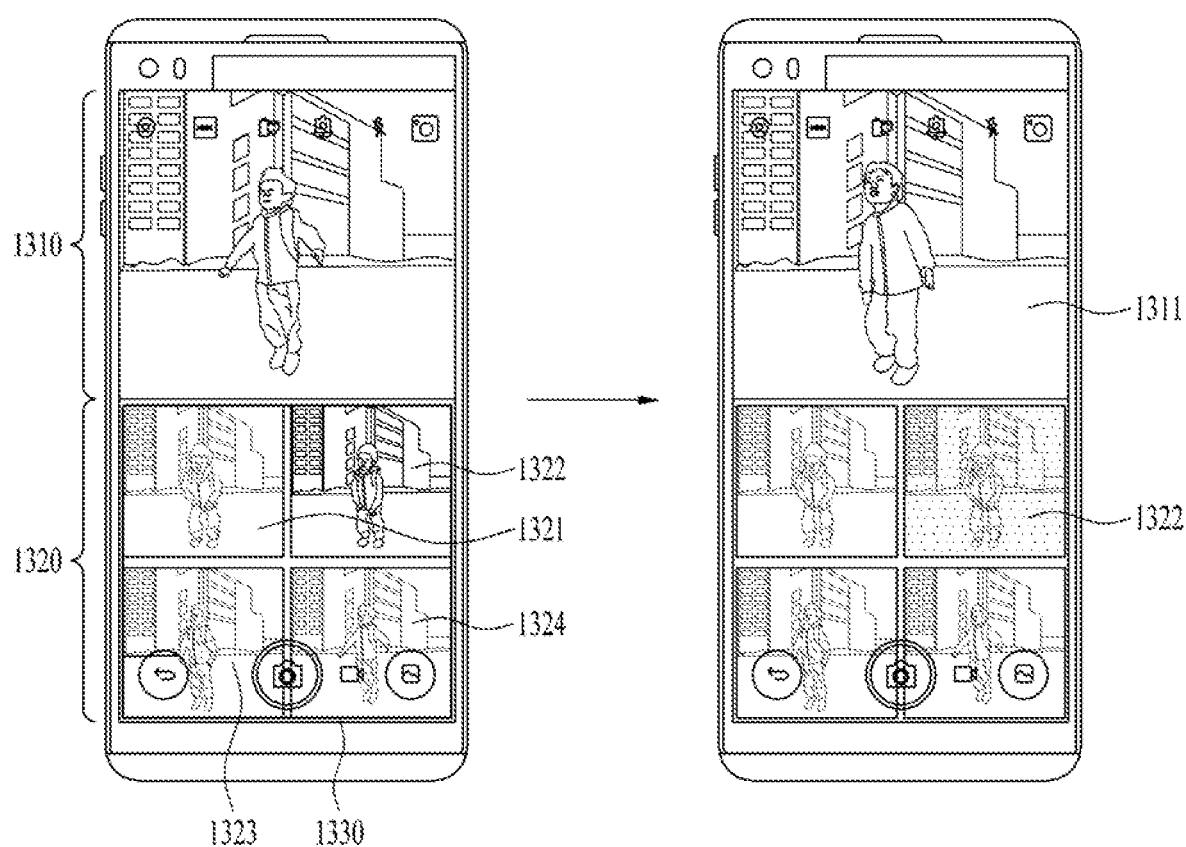
FIG. 13 is a diagram for describing an embodiment of determining a preview image displayed in a grid region in the mobile terminal according to an embodiment of the present invention.

FIG. 13 is a diagram for describing an embodiment of determining a preview image displayed in a grid region in the mobile terminal according to an embodiment of the present invention. Redundant description in FIGS. 4 to 12 and the embodiment of FIG. 13 will be omitted below.

Referring to the first drawing of FIG. 13, the mobile terminal may display preview images on all of first to fourth cells 1321, 1322, 1323 and 1324 included in a grid region 1320 to complete a grid image 1330.

In an embodiment of the present invention, the mobile terminal may maintain a preview image region 1310 in an activated state in a state in which the grid image 1330 has been completed, distinguished from the above-described embodiments. In addition, the mobile terminal may not display icons for controlling the completed grid image 1330 in a state in which the grid image 1330 has been completed.

In an embodiment of the present invention, the mobile terminal may capture a first preview image 1311 being displayed in the preview image region 1310 even when the grid image 1330 is completed.

More specifically, the mobile terminal may display icons for controlling the preview image region 1310 in the grid image region 1320 in a state in which the grid image 1330 has been completed.

In an embodiment of the present invention, the mobile terminal may sense an input signal (not shown) for selecting an icon for capturing the first preview image 1311.

Referring to the second drawing of FIG. 13, the mobile terminal may compare previously captured images displayed on the first to fourth cells 1321, 1322, 1323 and 1324 with the newly captured first preview image 1311 upon sensing the input signal for selecting the capture icon.

For example, the mobile terminal may determine the image quality of the previously captured images displayed on the first to fourth cells 1321, 1322, 1323 and 1324 and the newly captured first preview image 1311. The mobile terminal may replace a previously captured image having the lowest image quality with the first preview image 1311 upon determining the image quality of the previously captured images displayed on the first to fourth cells 1321, 1322, 1323 and 1324 and the newly captured first preview image 1311.

Referring to the second drawing of FIG. 13, the mobile terminal may determine that the previously captured image displayed on the second cell 1322 has the lowest image quality. Accordingly, the mobile terminal may display the newly captured first preview image 1311 on the second cell 1322.

That is, the user can continuously capture images even when the grid image 1330 is completed and the mobile terminal can replace a previously captured image with a newly captured image according to preset standards.

Figure 14:
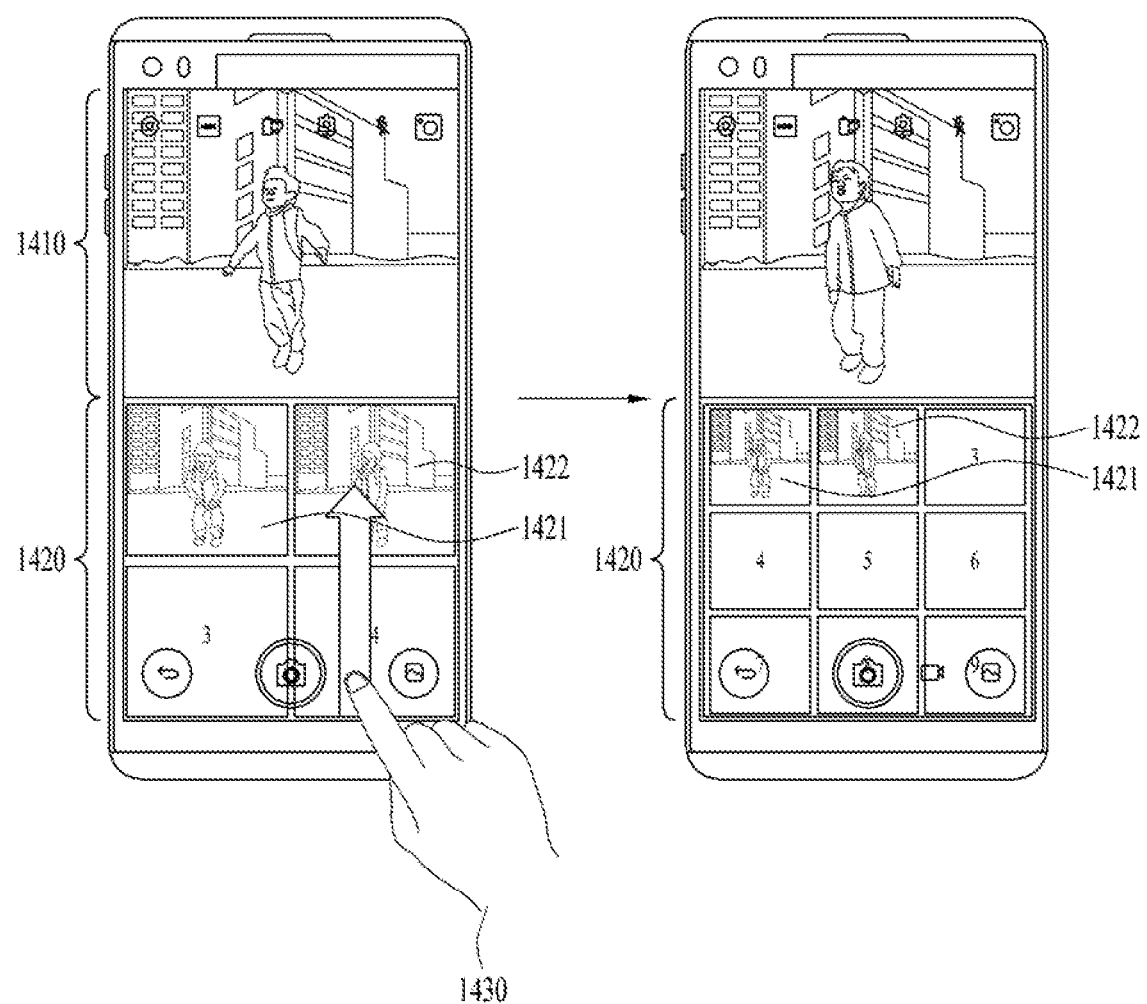
FIG. 14 is a diagram for describing an embodiment of changing a grid matrix included in a grid region in the mobile terminal according to an embodiment of the present invention.

FIG. 14 is a diagram for describing an embodiment of changing a grid matrix included in a grid region in the mobile terminal according to an embodiment of the present invention. Redundant description in FIGS. 4 to 13 and the embodiment of FIG. 14 will be omitted below.

Referring to the first drawing of FIG. 14, the mobile terminal may separately display a preview image region 1410 and a grid region 1420 on the display while the camera application is executed.

Although a case in which images are displayed on first and second cells 1421 and 1422 is exemplified in the first drawing of FIG. 14, the example described below can be performed before or after an image is displayed in the grid region 1420.

In an embodiment of the present invention, the grid region 1420 may include 4 cells arranged in 2 columns and 2 rows.

Here, the number of cells included in the grid region 1420 can be set in various manners.

The mobile terminal may sense a first input signal 1430 of touching the grid region 1420 in a preset manner. For example, the first input signal 1430 may correspond to a touch input signal of dragging a lower bezel part of the display of the mobile terminal upward.

Referring to the second drawing of FIG. 14, the mobile terminal may modify the grid region 1420 such that the grid region 1420 includes 9 cells arranged in 3 columns and 3 rows upon sensing the first input signal 1430. Here, modification of the grid region 1420 to have 9 cells arranged in 3 columns and 3 rows is exemplary and the grid region can be modified such that it includes 16 cells arranged in 4 columns and 4 rows.

In an embodiment of the present invention, the mobile terminal may change arrangement of the grid region 1420 upon sensing the first input signal 1430 while images are displayed on the first cell 1421 and the second cell 1422. Accordingly, the mobile terminal may re-display the images displayed on the first cell 1421 and the second cell 1422 in the newly arranged grid region 1420.

When the grid region 1420 includes 9 cells arranged in 3 columns and 3 rows, the mobile terminal may modify the grid region 1420 such that the grid region 1420 includes 4 cells arranged in 2 columns and 2 rows upon sensing a second input signal (not shown), which is not shown. That is, the mobile terminal may reduce the number of cells included in the grid region 1420 upon sensing the second input signal applied in a different direction from the first input signal 1430.

For example, when the grid region 1420 has 9 cells arranged in 3 columns and 3 rows, the user can apply a touch input signal of dragging the grid region 1420 downward. Accordingly, the mobile terminal can modify the grid region 1420 such that the grid region 1420 includes 4 cells arranged in 2 columns and 2 rows.

Figure 15:
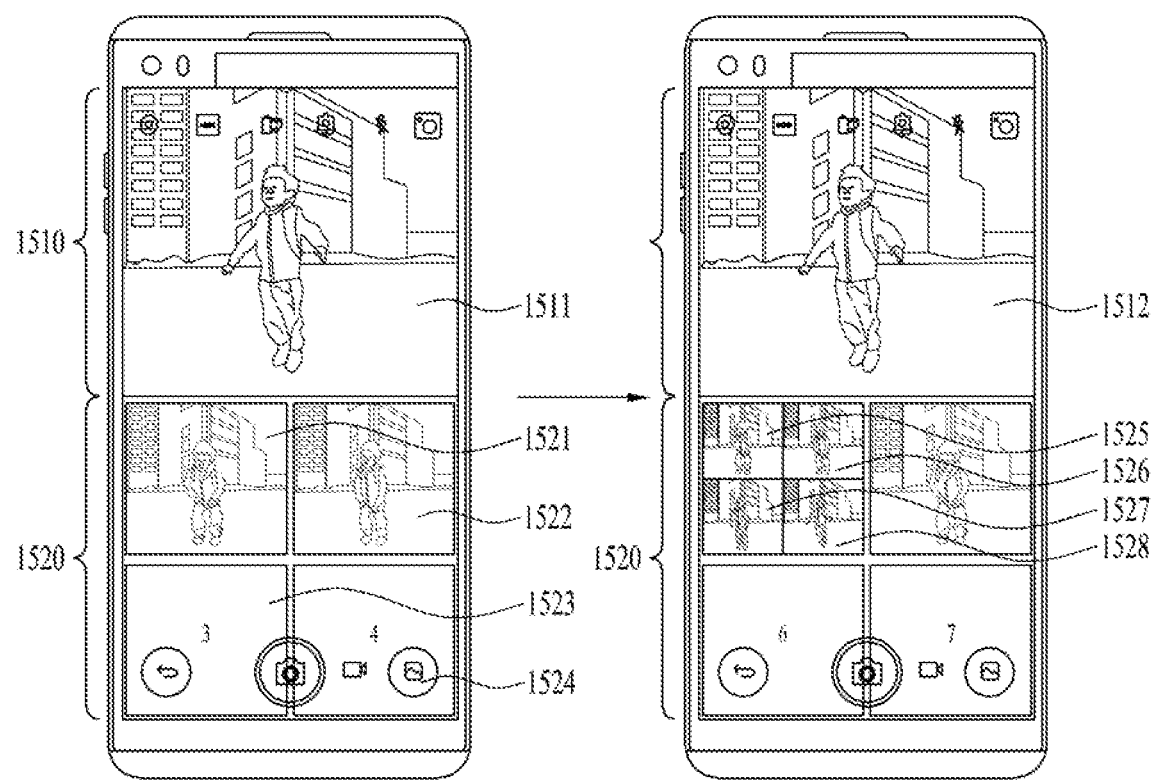
FIG. 15 is a diagram for describing an embodiment in which a cell is added to a grid region in the mobile terminal according to an embodiment of the present invention.

FIG. 15 is a diagram for describing an embodiment in which a cell is added to a grid region in the mobile terminal according to an embodiment of the present invention. Redundant description in FIGS. 4 to 14 and the embodiment of FIG. 15 will be omitted.

Referring to the first drawing of FIG. 15, the mobile terminal may separately display the preview image region 1510 and a grid region 1520 on the display while the camera application is executed therein. As described above, the grid region 1520 may include 4 cells 1521, 1522, 1523 and 15245 arranged in 2 rows and 2 columns.

In an embodiment of the present invention, the mobile terminal may display a previously captured image in the grid region 1520.

A case in which the user additionally captures an image when captured images have been displayed on the 4 cells 1521, 1522, 1523 and 1524 will be described below.

In an embodiment of the present invention, the mobile terminal may sense a first input signal (not shown) for capturing a preview image 1511 being displayed in the preview image region 1510 in a state in which previously captured images are displayed on all of the cells 1521, 1522, 1523 and 1524 included in the grid region 1520 including 4 cells.

Referring to the second drawing of FIG. 15, the mobile terminal may change arrangement of the grid region 1520 upon sensing the first input signal. More specifically, the mobile terminal may generate a new cell because the previously captured images are displayed on all of the cells 1521, 1522, 1523 and 1524 included in the grid region 1520.

In an embodiment of the present invention, the mobile terminal may modify the first cell 1521 into four new cells 1525, 1526, 1527 and 1528. That is, according to an embodiment of the present invention, when the user wants to capture a new image in a state in which the previously captured images are displayed on the four cells, the mobile terminal can modify the existing cells to generate a grid image including a larger number of images.

In addition, the mobile terminal may sense a second input signal (not shown) for capturing a preview image 1512 being displayed in the preview image region 1510 in a state in which the first cell 1521 has been modified into the four new cells 1525, 1526, 1527 and 1528 and previously captured images are displayed on the four new cells 1525, 1526, 1527 and 1528 and the existing cells 1522, 1523 and 1524.

In this case, the mobile terminal may modify the second cell 1522 into four new cells, which is not shown. That is, according to an embodiment of the present invention, the mobile terminal can divide an existing cell to generate new cells even when previously captured images are displayed on all cells of the grid region 1520 if the user wants to continuously capture preview images being displayed.

Figure 16:
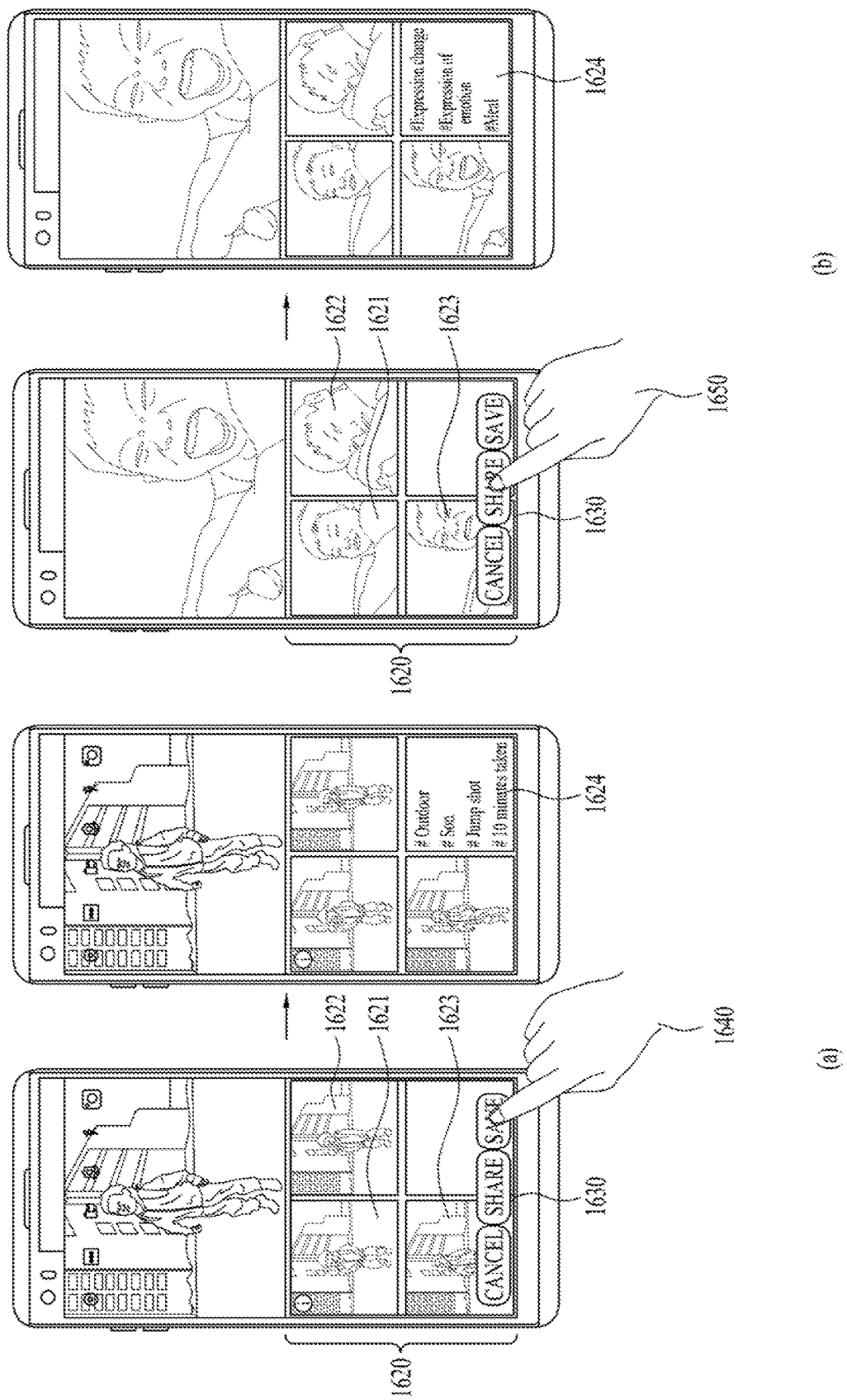
FIG. 16 is a diagram for describing an embodiment of displaying information on an empty cell included in a grid region in the mobile terminal according to an embodiment of the present invention.

FIG. 16 is a diagram for describing an embodiment of displaying information on an empty cell included in a grid region in the mobile terminal according to an embodiment of the present invention. Redundant description in embodiments shown in FIGS. 4 to 16 will be omitted below.

(a) and (b) of FIG. 16 illustrate an embodiment of displaying information on an empty cell when a grid region is saved or shared while the grid region is not completed.

Referring to the first drawing of FIG. 16, the mobile terminal may be in a state in which images are displayed on first, second and third cells 1621, 1622 and 1623 included in a grid region 1620. Here, the first cell 1621 may display a thumbnail corresponding to a video.

In an embodiment of the present invention, the mobile terminal may display icons for controlling a grid image 1630 even when the grid region 1620 includes an empty cell, distinguished from the above-described embodiments. In the embodiment shown in FIG. 16, a fourth cell 1624 may correspond to an empty cell. Here, the case in which the fourth cell 1624 corresponds to an empty cell is exemplary and all embodiments which will be described below can be applied to a case in which the grid region 1620 includes an empty cell.

In an embodiment of the present invention, the mobile terminal may sense a first input signal 1640 for selecting a save icon in a state in which the grid region 1620 includes an empty cell.

Referring to the second drawing of FIG. 16(*a*), the mobile terminal may extract information from at least one captured preview image upon sensing the first input signal 1640.

More specifically, the mobile terminal may extract common information from the images displayed on the first cell 1621, the second cell 1622 and the third cell 1623 upon sensing the first input signal 1640. For example, the mobile terminal can extract a place, an action of an object, a pose of the object, characteristics of the object, a photographing time, an emotional change recognized from the object, weather, features of the object and the like from the images.

In an embodiment of the present invention, the mobile terminal may display the common information on the empty cell on the basis of the extracted information.

More specifically, the mobile terminal may display, on the fourth cell 1624 corresponding to an empty cell, the common information extracted from the images displayed on the first, second and third cells 1621, 1622 and 1623.

For example, the mobile terminal can extract information indicating that "the photographing place is outdoor", "the captured object is a son", "the captured object is jumping" and "the photographing time is 10 minutes" as common information of the images displayed on the first, second and third cells 1621, 1622 and 1623. Accordingly, the mobile terminal can display "outdoor", "son", "jump shot" and "10 minutes taken" on the fourth cell 1624.

FIG. 16(*b*) illustrates a different example from the example shown in FIG. 16(*a*).

Referring to the first drawing of FIG. 16, the mobile terminal may be in a state in which images are displayed on the first, second and third cells 1621, 1622 and 1623 included in the grid region 1620.

In an embodiment of the present invention, the mobile terminal may sense a second input signal 1650 for selecting a share icon while the grid region 1620 includes an empty cell.

Referring to the second drawing of FIG. 16(*b*), the mobile terminal may display information from a captured preview image upon sensing a second input signal 1650.

More specifically, the mobile terminal may extract common information from images displayed on the first cell 1621, the second cell 1622 and the third cell 1623 upon sensing the second input signal 1650.

Referring to FIG. 16(*b*), the mobile terminal may extract information indicating that "the expression of an object is changing", "the object expresses an emotion" and "the object is eating" as common information of the images displayed on the first cell 1621, the second cell 1622 and the third cell 1623. Accordingly, the mobile terminal can display "expression change", "emotion expression" and "meal" on the fourth cell 1624.

Accordingly, the user can automatically complete the grid image 1630 and save or share the same using previously displayed images even when the grid region 1620 is not completed as an image.

Figure 17:
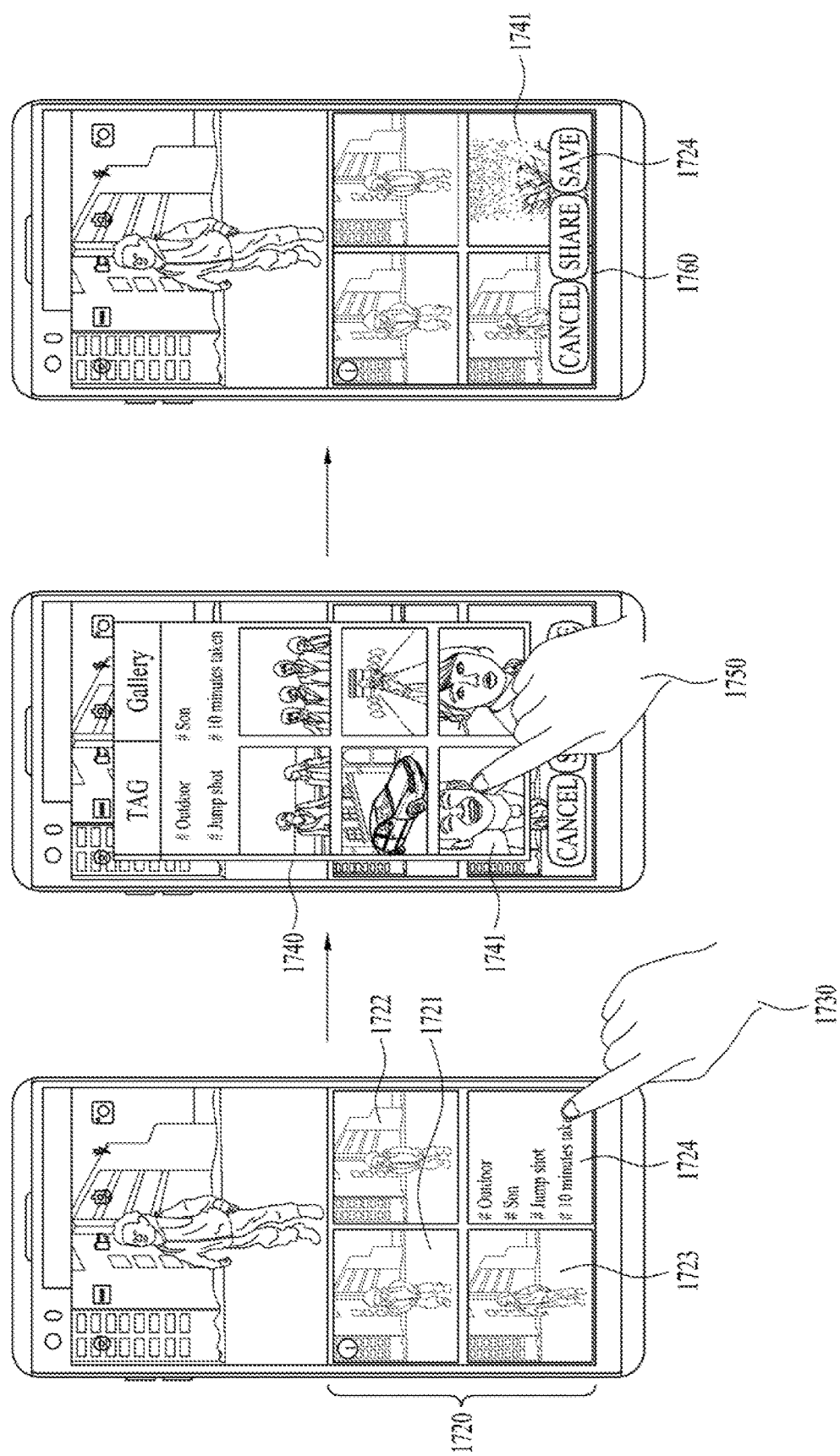
FIG. 17 is a diagram for describing another embodiment of displaying information on an empty cell included in a grid region in the mobile terminal according to an embodiment of the present invention.

FIG. 17 is a diagram for describing another embodiment of displaying information on an empty cell included in a grid region in the mobile terminal according to an embodiment of the present invention. Redundant description in FIGS. 4 to 16 and the embodiment of FIG. 17 will be omitted below.

The first drawing of FIG. 17 corresponds to the second drawing of FIGS. 16(*a*) and (*b*). That is, the mobile terminal may display captured images on first, second and third cells 1721, 1722 and 1723 included in a grid region 1720 and display common information extracted from the captured images on a fourth cell 1724.

In an embodiment of the present invention, the mobile terminal may sense a first input signal 1730 for selecting the common information displayed on the fourth cell 1724.

Referring to the second drawing of FIG. 17, the mobile terminal may display a recommended image list pop-up upon sensing a first input signal 1730. Here, the recommended image list pop-up may include a recommended image list 1740.

In an embodiment of the present invention, the mobile terminal may search for a recommended image on the basis of the extracted common information. Then, the mobile terminal may display the searched recommended image on the recommended image list 1740.

More specifically, the mobile terminal may search for a recommended image on the basis of common information, such as a time, a place or an event, extracted from the images displayed on the first to third cells 1721, 1722 and 1723 and display the searched recommended image on the recommended image list 1740.

For example, when the common information displayed on the fourth cell 1724 is "outdoors", "son", "jump shot" and "10 minutes taken", the mobile terminal can search the memory of the mobile terminal or an external server for an image on the basis of the common information. That is, the mobile terminal can search not only the gallery application of the mobile terminal but also an external server (e.g., cloud) for recommended images on the basis of the common information displayed on the fourth cell 1724.

In an embodiment of the present invention, the mobile terminal may sense a second input signal 1750 for selecting a first recommended image 1741.

Referring to the third drawing of FIG. 17, the mobile terminal may display the first recommended image 1741 on the fourth cell 1724 upon sensing the second input signal 1750. Accordingly, the mobile terminal can complete a new grid image 1760 including the first recommended image 1741.

Accordingly, the user can use an automatically recommended image on the basis of common information of captured preview images and thus can easily complete the grid image 1760.

Figure 18:
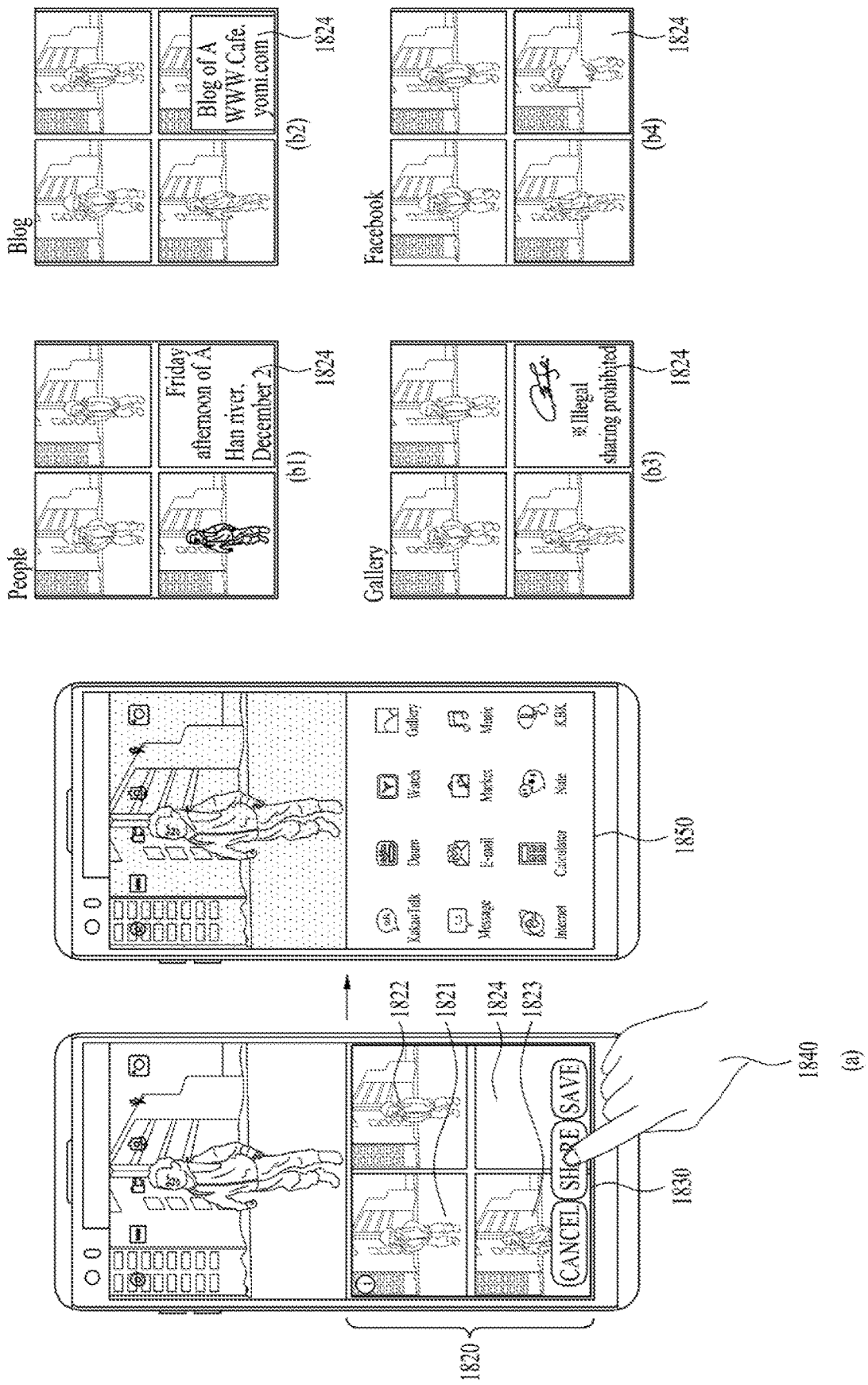
FIG. 18 is a diagram for describing another embodiment of displaying information on an empty cell included in a grid region in the mobile terminal according to an embodiment of the present invention.

FIG. 18 is a diagram for describing another embodiment of displaying information on an empty cell included in a grid region in the mobile terminal according to an embodiment of the present invention. Redundant description in FIGS. 4 to 17 and the embodiment of FIG. 18 will be omitted below.

The first drawing of FIG. 18(*a*) corresponds to the first drawing of FIG. 17(*a*) or (*b*). That is, the mobile terminal may correspond to a state in which images are displayed on first, second and third cells 1821, 1822 and 1823 included in a grid region 1820. Here, the first cell 1821 may display a thumbnail corresponding to a video.

In an embodiment of the present invention, the mobile terminal may sense a first input signal 1840 for selecting the share icon for sharing a grid image 1830 in a state in which the grid region 1820 includes an empty cell. Here, the mobile terminal may determine information to be displayed on an empty cell because the grid image 1830 should be shared in a state in which the grid region 1820 includes the empty cell.

Referring to the second drawing of FIG. 18(*a*), the mobile terminal may display a sharing target list 1850 including at least one sharing target upon sensing the first input signal 1840.

Referring to FIG. 18(*b*), the mobile terminal may determine information to be displayed on a fourth cell 1824 on the basis of a sharing target selected from the displayed sharing target list 1850. That is, (b1), (b2), (b3) and (b4) of FIG. 18 illustrate an embodiment in which different pieces of information are displayed on an empty cell according to selected sharing targets. In addition, (b1), (b2), (b3) and (b4) of FIG. 18 illustrate only the grid region 1820 in an embodiment of the present invention.

Referring to FIG. 18(*b*1), the mobile terminal may sense a second input signal (not shown) for selecting a first sharing target. The mobile terminal may determine information to be displayed on the fourth cell 1824 corresponding to an empty cell on the basis of the first sharing target.

For example, when the first sharing target is a person, the mobile terminal can extract a common subject from the images displayed on the first to third cells 1821, 1822 and 1823. For example, the mobile terminal can extract the name of an object, a nickname of the object, a photographing place and a photographing time included in the images displayed on the first to third cells 1821, 1822 and 1823.

In an embodiment of the present invention, the mobile terminal may display the extracted information on the fourth cell 1824. Referring to the above-described example, the mobile terminal may display "Friday afternoon of A, Han river, 2, December" on the fourth cell 1824.

Referring to FIG. 18(*b*2), the mobile terminal may sense a third input signal (not shown) for selecting a second sharing target. The mobile terminal may determine information to be displayed on the fourth cell 1824 on the basis of the second sharing target according to the third input signal.

For example, when the second sharing target is a blog, the mobile terminal can display a URL link of the preset blog on the fourth cell 1824. Alternatively, when the second sharing target is a blog, the mobile terminal can share original preview images displayed on the first cell 1821, the second cell 1822 and the third cell 1823 as well as the grid image 1830 with the blog.

Referring to FIG. 18(*b*3), the mobile terminal may sense a fourth input signal (not shown) for selecting a third sharing target. The mobile terminal may determine information to be displayed on the fourth cell 1824 on the basis of the third sharing target according to the fourth input signal.

For example, when the third sharing target is the gallery application, the mobile terminal can display a preset signature on the fourth cell 1824. Alternatively, when the third sharing target is the gallery application, the mobile terminal can display indication of copyright on the fourth cell 1824.

Referring to FIG. 18(*b*4), the mobile terminal may sense a fifth input signal (not shown) for selecting a fourth sharing target. The mobile terminal may determine information to be displayed on the fourth cell 1824 on the basis of the fourth sharing target according to the fifth input signal.

For example, when the fourth sharing target is an SNS application such as Facebook or Instagram, the mobile terminal can convert the images displayed on the first to third cells 1821, 1822 and 1823 into a video file and display the video file on the fourth cell 1824. For example, the mobile terminal may combine the images displayed on the first to third cells 1821, 1822 and 1823 to generate a moving image file and display the moving image file on the fourth cell 1824.

Accordingly, the user can display various types of information on an empty cell on the basis of the first to third cells 1821, 1822 and 1823 and sharing targets to complete the grid image 1830.

Figure 19:
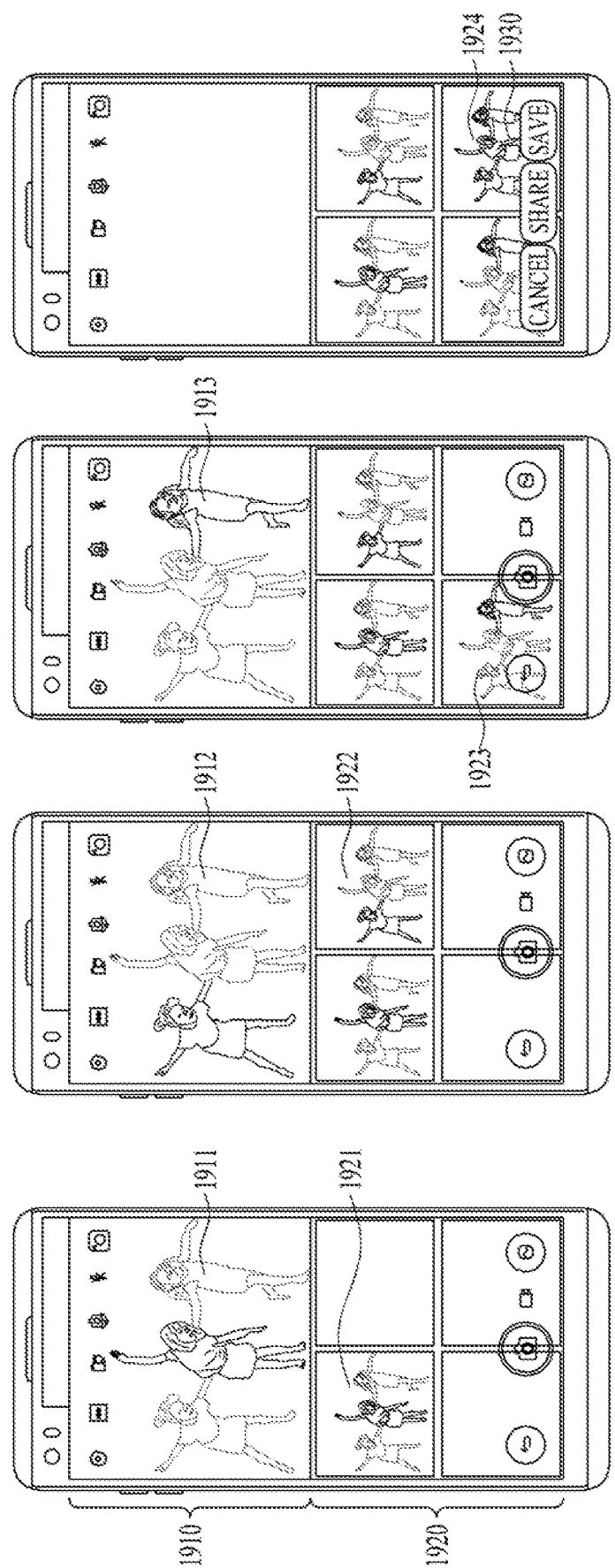
FIG. 19 is a diagram for describing another embodiment of displaying information on an empty cell included in a grid region in the mobile terminal according to an embodiment of the present invention.

FIG. 19 is a diagram for describing another embodiment of displaying information on an empty cell included in a grid region in the mobile terminal according to an embodiment of the present invention. Redundant description in FIGS. 4 to 18 and the embodiment of FIG. 19 will be omitted below.

Referring to the first drawing of FIG. 19, the mobile terminal may display a first preview image 1911 which is being photographed through the camera in a preview image region 1910. Here, the first preview image 1911 includes a plurality of objects but only the first object is focused upon.

In an embodiment of the present invention, the mobile terminal may sense a first input signal (not shown) for capturing the first preview image 1911. The mobile terminal may capture the first preview image 1911 and display the same on a first cell 1921 upon sensing the first input signal.

Referring to the second drawing of FIG. 19, the mobile terminal may display a second preview image 1912 which is currently being photographed through the camera in the preview image region 1910 while the first preview image 1911 is displayed on the first cell 1921. Here, the second preview image 1912 includes the same objects as the first preview image 1911 but only the second object is focused upon.

In an embodiment of the present invention, the mobile terminal may sense a second input signal (not shown) for capturing the second preview image 1912. The mobile terminal may capture the second preview image 1912 and display the same on a second cell 1922 upon sensing the second input signal.

Referring to the third drawing of FIG. 19, the mobile terminal may display a third preview image 1913 which is being currently photographed through the camera in the preview image region 1910 while the first preview image 1911 and the second preview image 1912 are displayed on the first cell 1921 and the second cell 1922. Here, the third preview image 1913 includes the same objects as the second preview image 1912 but only the third object is focused upon.

In an embodiment of the present invention, the mobile terminal may sense a third input signal (not shown) for capturing the third preview image 1913. The mobile terminal may capture the third preview image 1913 and display the same on a third cell 1923 upon sensing the third input signal.

Referring to the fourth drawing of FIG. 19, when the images displayed on the first, second and third cells 1921, 1922 and 1923 include different focused objects, the mobile terminal may display an image 1930 in which only focused objects are combined on the fourth cell 1924.

More specifically, the first cell 1921 may display the first preview image 1911 in which only the first object is focused, the second cell 1922 may display the second preview image 1912 in which only the second object is focused, and the third cell 1923 may display the third preview image 1913 in which only the third object is focused.

The mobile terminal may extract the first object, the second object and the third object from the cells and generate the new image 1930 in which all of the first object, the second object and the third object is focused.

In an embodiment of the present invention, the mobile terminal may display the generated image 1930 on the fourth cell 1924.

Here, when the grid region 1920 includes an empty cell as in the above-described embodiment, the mobile terminal may display the image 1930 on the fourth cell 1924 upon selection of the save or share icon.

In addition, when the images displayed on the first to third cells 1921, 1922 and 1923 include a plurality of objects and only one object is focused at each cell, the mobile terminal may automatically display the image 1930 on the fourth cell 1924, distinguished from the above-described embodiment.

Figure 20:
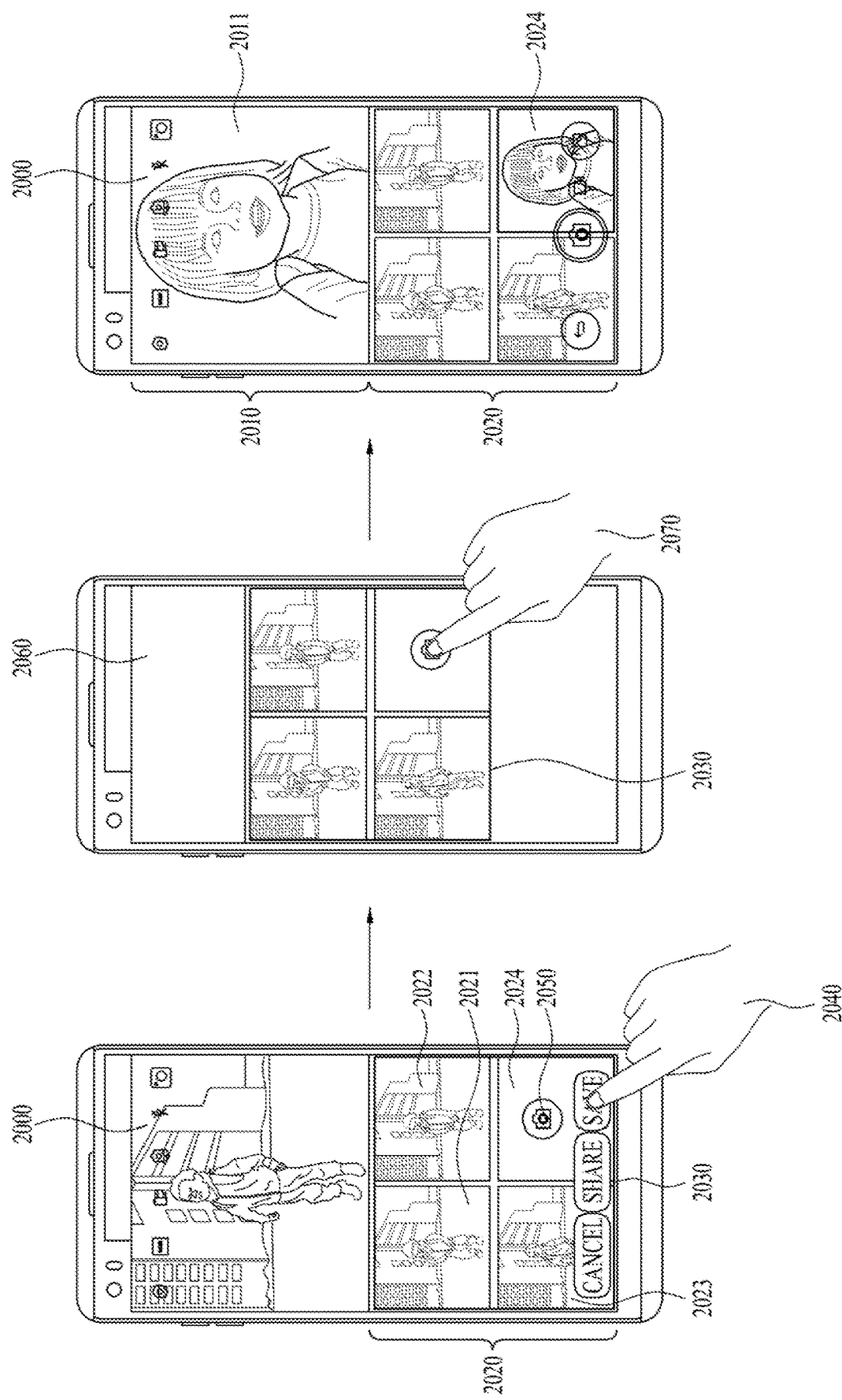
FIG. 20 is a diagram for describing another embodiment of displaying information on an empty cell included in a grid region in the mobile terminal according to an embodiment of the present invention.

FIG. 20 is a diagram for describing another embodiment of displaying information on an empty cell included in a grid region in the mobile terminal according to an embodiment of the present invention. Redundant description in FIGS. 4 to 19 and the embodiment of FIG. 20 will be omitted below.

The first drawing of FIG. 20 corresponds to the first drawing of FIG. 18. That is, the mobile terminal may be in a state in which images are displayed on first to third cells 2021, 2022 and 2023 included in a grid region 2020 through the camera application 2000.

In an embodiment of the present invention, the mobile terminal may sense a first input signal 2040 for selecting the save icon for saving a grid image 2030 in a state in which the grid region 2020 includes an empty cell.

In an embodiment of the present invention, the mobile terminal may maintain the fourth cell 2024 in a state in which images can be captured. More specifically, the mobile terminal may save the grid image 2030 with the fourth cell 2024 remaining as an empty cell upon sensing the first input signal 2040. Here, the mobile terminal may save the grid image in a state in which a camera-ready icon 2050 is displayed on the fourth cell 2024.

Referring to the second drawing of FIG. 20, the mobile terminal may end the camera application 2000 and execute the gallery application 2060. Here, the gallery application 2060 may correspond to an application for displaying saved images or videos.

In an embodiment of the present invention, the mobile terminal may display the saved grid image 2030 through the gallery application 2060. Here, the grid image 2030 may correspond to a state in which previously captured images are displayed on the first to third cells 2021, 2022 and 2023 and the camera-ready icon 2050 is displayed on the fourth cell 2024.

In an embodiment of the present invention, the mobile terminal may sense a second input signal 2070 for selecting the camera-ready icon 2050.

Referring to the third drawing of FIG. 20, the mobile terminal may execute the camera application 2000 upon sensing the second input signal 2070. Here, the camera application 2000 may correspond to a state in which the grid mode is executed.

More specifically, the mobile terminal may display the currently captured first preview image 2011 in the preview image region 2010, display the first to third cells 2021, 2022 and 2023 on which the previously captured images are displayed in the grid region 2020, and display the fourth cell 2024 corresponding to an empty cell on the camera application 2000 upon sensing the second input signal 2070.

In an embodiment of the present invention, the mobile terminal may sense a third input signal (not shown) for capturing the first preview image 2011. The mobile terminal may display the first preview image 2011 on the fourth cell 2024 upon sensing the third input signal.

Accordingly, the mobile terminal may save the grid image 2030 which is not completed and complete the grid image 2030 later.

Figure 21:
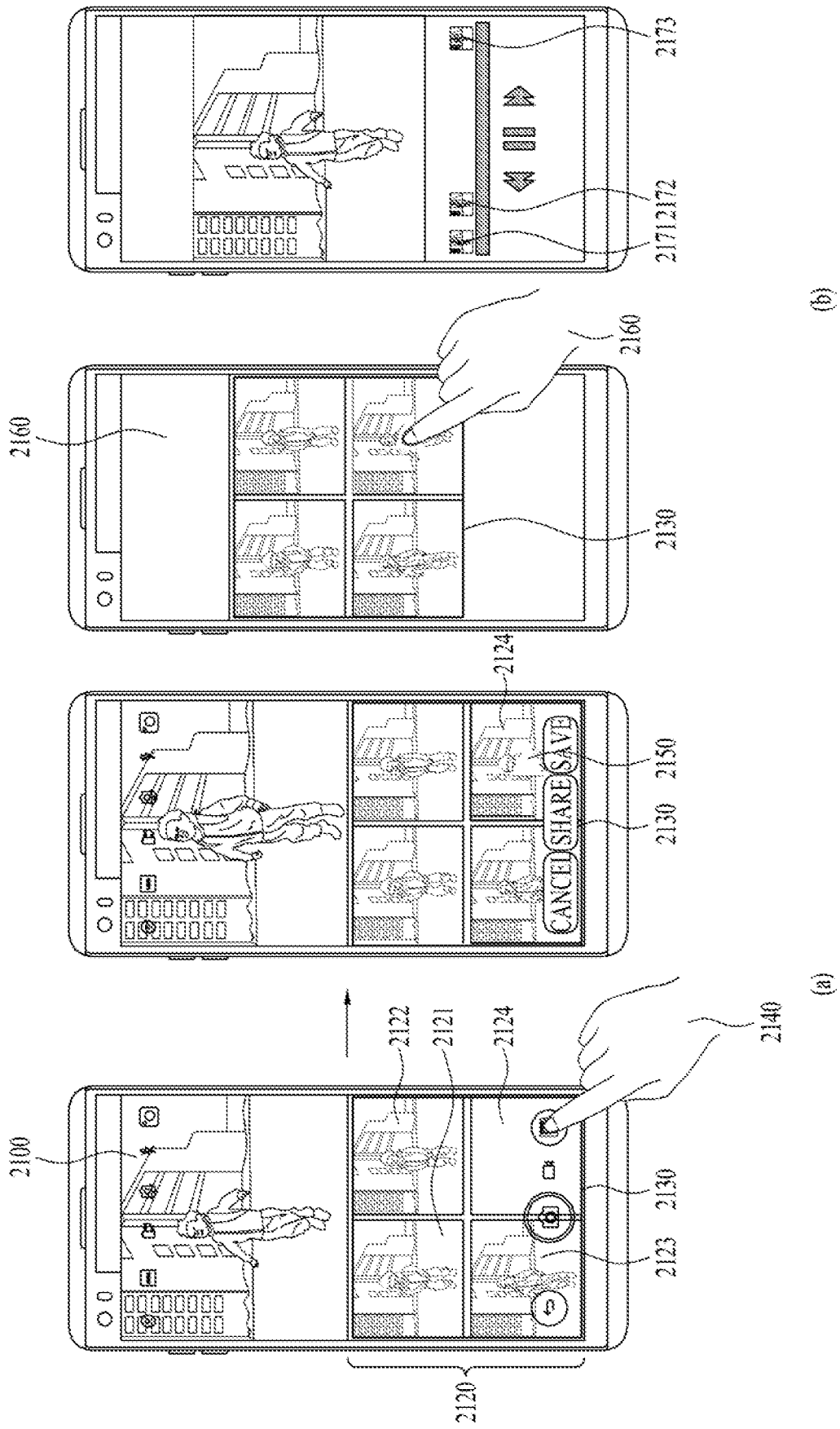
FIG. 21 is a diagram for describing another embodiment of displaying information on an empty cell included in a grid region in the mobile terminal according to an embodiment of the present invention.

FIG. 21 is a diagram for describing another embodiment of displaying information on an empty cell included in a grid region in the mobile terminal according to an embodiment of the present invention. Redundant description in FIGS. 4 to 20 and the embodiment of FIG. 21 will be omitted below.

FIG. 21(a) illustrates the camera application 2100 in which the grid mode is executed and FIG. 21(b) illustrates the gallery application 2160 displaying a grid image 2130.

Referring to the first drawing of FIG. 21(a), the mobile terminal may execute the grid mode in the camera application 2100. The mobile terminal may display preview images on first to third cells 2121, 2122 and 2123 included in a grid image region 2120. That is, a fourth cell 2124 may correspond to an empty cell.

In an embodiment of the present invention, the mobile terminal may sense a first input signal 2140 for selecting the save icon for saving a grid image 2130 in a state in which the grid region 2120 includes the empty cell.

Referring to the second drawing of FIG. 21(a), the mobile terminal may generate a video from preview images from the time at which the first preview image displayed on the first cell 2121 is captured to the time at which the third preview image displayed on the third cell 2123 is captured as a video upon sensing the first input signal 2140.

For example, when the first preview image is captured at 09:10, Jan. 21, 2017, the second preview image is captured at 09:12, Jan. 21, 2017 and the third preview image is captured at 09:16, Jan. 21, 2017, the mobile terminal can capture images from 09:10, Jan. 21, 2017 to 09:16, Jan. 21, 2017 as a video. In addition, the mobile terminal may display a thumbnail of a recorded video on the fourth cell 2124.

In an embodiment of the present invention, the mobile terminal may display a playback indicator 2150 for indicating that a video can be played on the fourth cell 2124.

In an embodiment of the present invention, the mobile terminal may display icons for controlling the newly completed grid image 2130. A case in which the grid image 2130 including a recorded video has been saved will be exemplified below.

Referring to the first drawing of FIG. 21(b), the mobile terminal may display the gallery application 2160 on the display. Here, the mobile terminal may display the grid image 2130 in the gallery application. The grid image 2130 may include previously captured images displayed on the first to third cells 2121, 2122 and 2123 and a thumbnail of a video from when the image is displayed on the first cell 2121 to when the image is displayed on the third cell 2123, which is displayed on the fourth cell 2124.

In an embodiment of the present invention, the mobile terminal may sense a second input signal 2160 for selecting the playback indicator 2150.

Referring to the second drawing of FIG. 21(b), the mobile terminal may play the video corresponding to the fourth cell 2124 on the full screen upon sensing the second input signal 2160.

In an embodiment of the present invention, the mobile terminal may display marking indicators 2171, 2172 and 2173 indicating the times of the captured preview images displayed on the first to third cells 2121, 2122 and 2123 during playback of the video corresponding to the fourth cell 2124.

Referring to the above-described examples, the mobile terminal may display a timeline bar along with the video when playing the video on the full screen. Here, the timeline bar may indicate a time from the start point to an end point of a video using a bar-shaped indicator.

In an embodiment of the present invention, the mobile terminal may display the first marking indicator 2171 at 09:10, Jan. 21, 2017 at which the first preview image is captured, display the second marking indicator 2072 at 09:12, Jan. 21, 2017 at which the second preview image is captured and display the third marking indicator 2173 at 09:16, Jan. 21, 2017 at which the third preview image is captured on the timeline bar.

Figure 22:
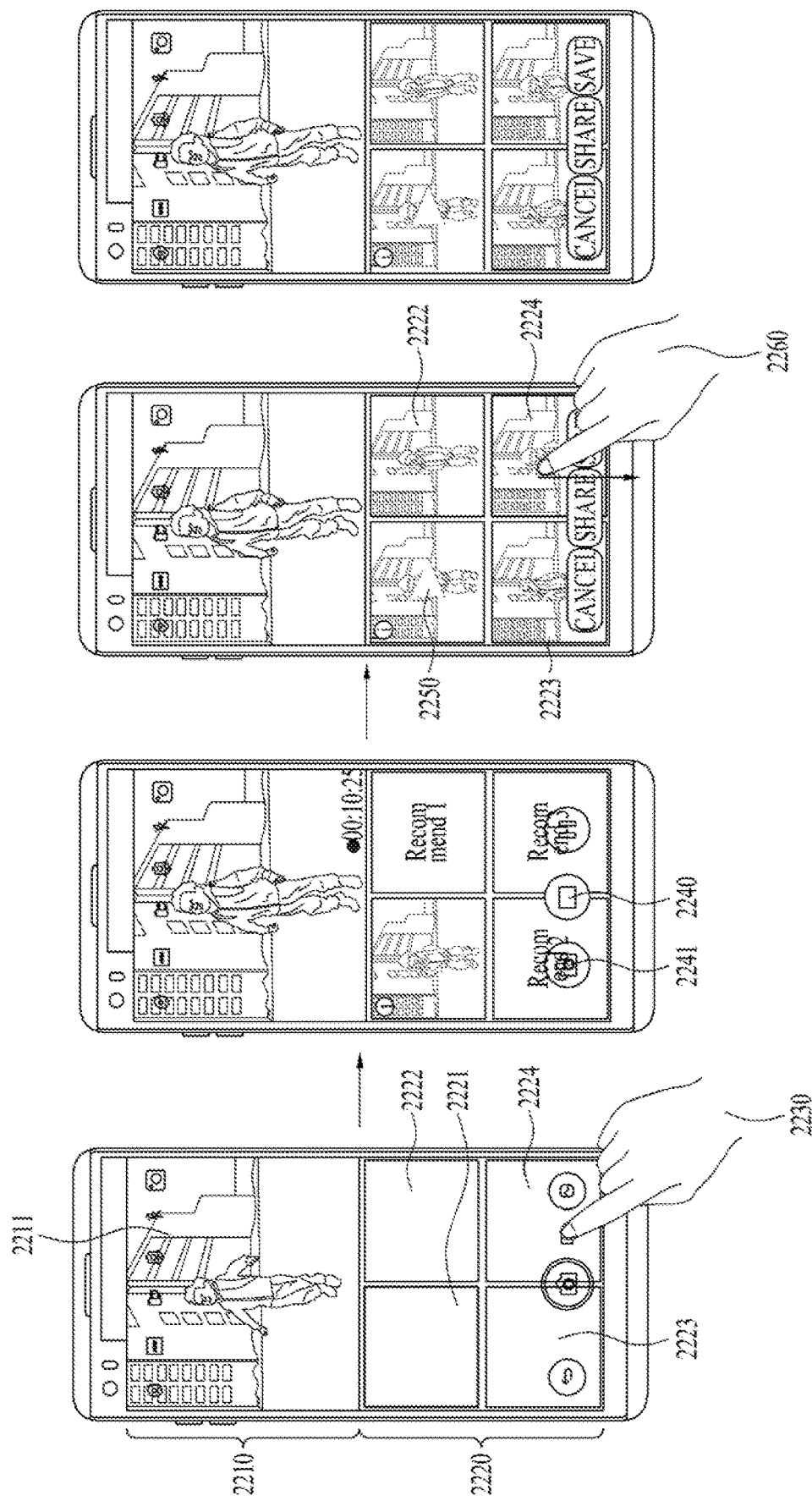
FIG. 22 is a diagram for describing another embodiment of displaying information on an empty cell included in a grid region in the mobile terminal according to an embodiment of the present invention.

FIG. 22 is a diagram for describing another embodiment of displaying information on an empty cell included in a grid region in the mobile terminal according to an embodiment of the present invention. Redundant description in FIGS. 4 to 20 and the embodiment of FIG. 22 will be omitted below.

Referring to the first drawing of FIG. 22, the mobile terminal may display a first preview image 2211 in a preview image region 2210 and display first to fourth cells 2221, 2222, 2223 and 2224 in a grid region 2220.

In an embodiment of the present invention, the mobile terminal may sense a first input signal 2230 for selecting an icon for recording the first preview image 2211 upon recognition of the first cell 2221. Here, the first input signal 2230 may correspond to a preset touch input signal, distinguished from the above-described embodiments. For example, the mobile terminal may sense a long press touch input signal as the first input signal.

In an embodiment of the present invention, the mobile terminal may display a preview image of a video which is being recorded through the preview image region 2210. Then, the mobile terminal may complete video recording according to a second input signal (not shown) for selecting an icon 2240 for ending recording.

Referring to the second drawing of FIG. 22, the mobile terminal may match the recorded video to the first cell 2221 upon sensing the second input signal. Here, the mobile terminal may display a thumbnail corresponding to the recorded video on the first cell 2221.

In an embodiment of the present invention, the mobile terminal may extract at least one frame of the recorded video upon sensing the second input signal.

In another embodiment of the present invention, the mobile terminal may capture an image during video recording according to a third input signal (not shown) for selecting a capture icon 2241. Here, the mobile terminal may sense the third input signal multiple times.

Referring to the third drawing of FIG. 22, the mobile terminal may display images on the second, third and fourth cells 2222, 2223 and 2224 on the basis of the recorded video. In addition, the mobile terminal may display a playback indicator 2250 indicating that the thumbnail displayed on the first cell 2221 is a video.

In an embodiment of the present invention, the mobile terminal may automatically determine a best shot of the recorded video on the basis of the extracted frame. Accordingly, the mobile terminal may display the automatically determined best shot on the second, third and fourth cells 2222, 2223 and 2224.

In another embodiment of the present invention, the mobile terminal may display images captured by the user on the second, third and fourth cells 2222, 2223 and 2224 during video recording. Here, the mobile terminal may display the images captured by the user on the second, third and fourth cells 2222, 2223 and 2224 in the order of capturing the images during video recording.

In an embodiment of the present invention, the mobile terminal may sense a fourth input signal 2260 for selecting the fourth cell 2224. Here, the fourth input signal 2260 may correspond to a touch input signal of touching the fourth cell 2224 and then dragging or swiping the same in a preset direction.

Referring to the fourth drawing of FIG. 22, the mobile terminal may change the image displayed on the fourth cell 2224 upon sensing the fourth input signal 2260.

More specifically, the mobile terminal may extract at least one frame from the recorded video through the second input signal and capture at least one image from the recorded video through the third input signal. The mobile terminal may display an extracted or captured image on the second, third and fourth cells 2222, 2223 and 2224 upon sensing the second input signal or the third input signal.

However, the user may want to change an automatically extracted captured image to complete a grid image. Accordingly, the mobile terminal may display a different image on the fourth cell 2224 upon sensing a fourth input signal 2260. Here, the different image may be an image corresponding to another frame from among frames extracted from the recorded video or an image different from the previously displayed image from among images captured by the user.

Figure 23:
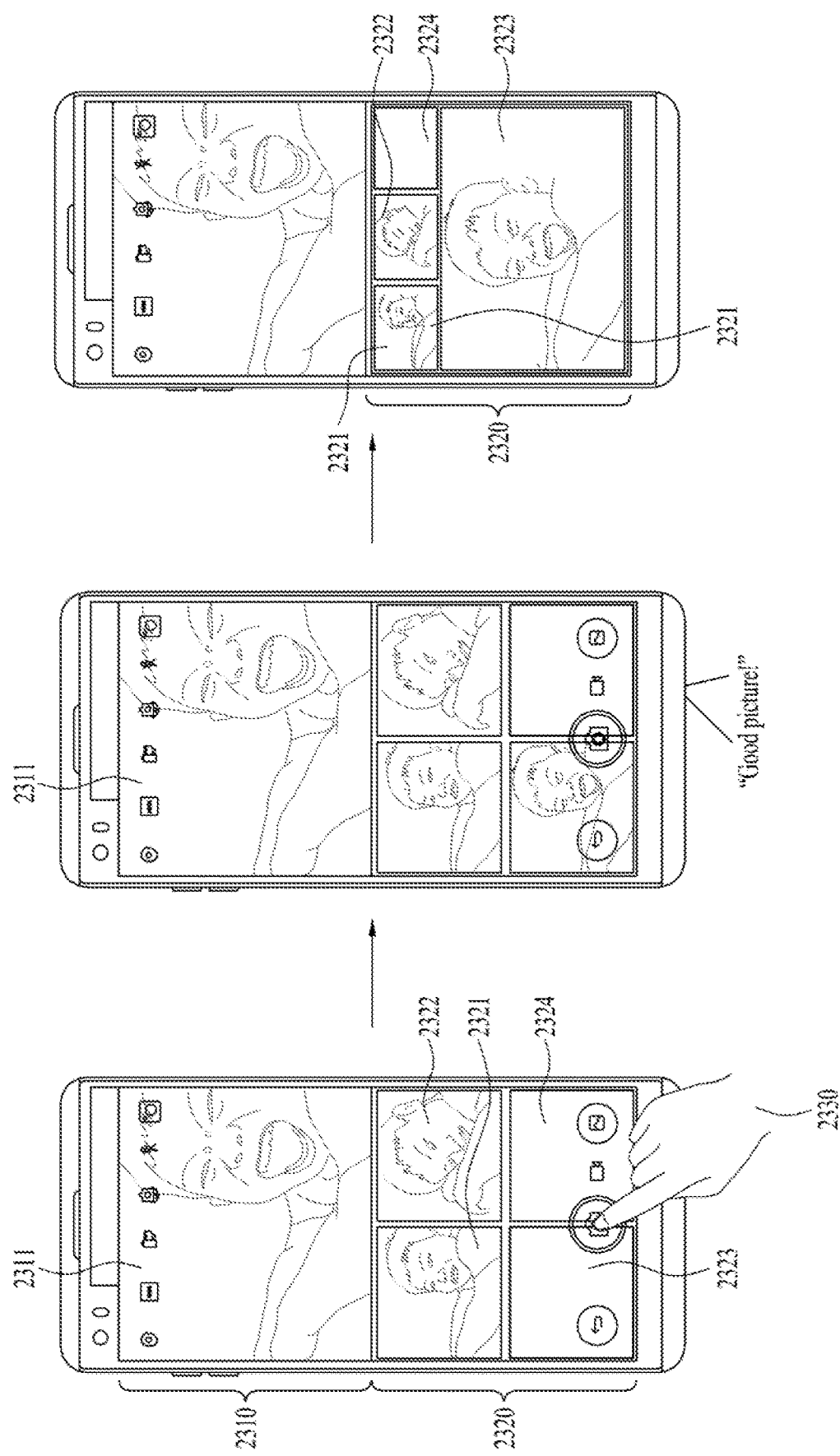
FIG. 23 is a diagram for describing an embodiment of changing a layout of a grid region on the basis of a preset event in the mobile terminal according to an embodiment of the present invention.

FIG. 23 is a diagram for describing an embodiment of changing a layout of a grid region on the basis of a preset event in the mobile terminal according to an embodiment of the present invention. Redundant description in FIGS. 4 to 22 and the embodiment of 23 will be omitted below.

Referring to the first drawing of FIG. 23, the mobile terminal may display a first preview image 2311 which is being photographed through the camera in a preview image region 2310. In addition, the mobile terminal may display previously captured images on first and second cells 2321 and 2322 of a grid region 2320. Here, the grid region 2320 may be characterized by including 4 cells 2321, 2322, 2323 and 2324 arranged in 2 columns and 2 rows.

The mobile terminal may sense a first input signal 2330 for selecting the capture icon for capturing the first preview image 2311 upon recognition of the third cell 2323.

Referring to the second drawing of FIG. 23, the mobile terminal may sense a preset detect when the first preview image 2311 is captured. Here, the preset event may be voice recognition.

More specifically, the mobile terminal may sense preset voice for a preset time from when the first preview image 2311 is displayed in the preview image region 2310 to when the first preview image 2311 is captured and displayed on the third cell 2323. For example, the mobile terminal can recognize a user's voice of "Good picture!" immediately after the first preview image 2311 is displayed on the third cell 2323.

Referring to the third drawing of FIG. 23, the mobile terminal may change the size of the third cell 2323 upon recognition of the voice.

More specifically, the mobile terminal may recognize preset voice when the first preview image 2311 displayed on the third cell 2323 is captured. Referring to the above-described example, the mobile terminal may increase the size of the third cell 2323 upon recognition of the voice of "Good picture!". Of course, the mobile terminal may decrease the size of the third cell 2323 upon recognition of a voice of "Not a very good picture". That is, the mobile terminal may change the size of the third cell 2323 on the basis of a recognized voice.

In an embodiment of the present invention, the mobile terminal may change the layout of the grid region 2320 such that the first row has 3 cells 2321, 2322 and 2324 and the second row has one cell 2323 when the size of the third cell 2323 increases. Here, the mobile terminal may arrange the three cells 2321, 2322 and 2324 of the first row in the same size.

Although not shown, the mobile terminal may determine a best shot among the images displayed on the first, second and third cells 2321, 2322 and 2323 after the first preview image 2311 is displayed on the third cell 2323. Here, when the first preview image 2311 displayed on the third cell 2323 is determined to be a best shot, the mobile terminal may increase the size of the third cell 2323.

Figure 24:
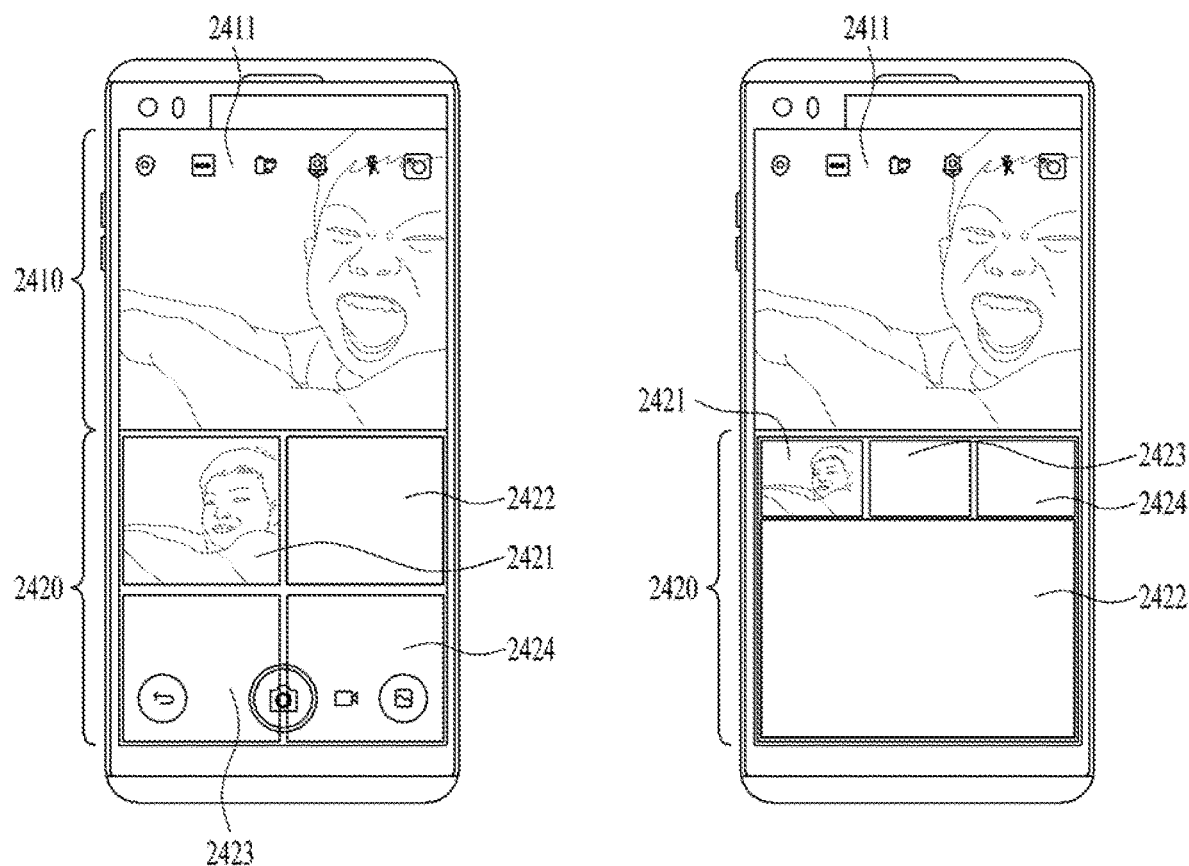
FIG. 24 is a diagram for describing another embodiment of changing a layout of a grid region on the basis of a preset event in the mobile terminal according to an embodiment of the present invention.

FIG. 24 is a diagram for describing another embodiment of changing a layout of a grid region on the basis of a preset event in the mobile terminal according to an embodiment of the present invention. Redundant description in FIGS. 4 to 23 and the embodiment of FIG. 24 will be omitted below.

Referring to the first drawing of FIG. 24, the mobile terminal may display a first preview image 2411 which is being photographed through the camera in a preview image region 2410. Here, the first preview image 2411 may be characterized by including a first object.

In addition, the mobile terminal may display a previously captured image on a first cell 2421 of a grid region 2420. Here, the grid region 2420 may be characterized by including 4 cells 2421, 2422, 2423 and 2424 arranged in 2 columns and 2 rows.

In an embodiment of the present invention, the mobile terminal may recognize the first object included in the first preview image 2411 upon recognition of the second cell 2422.

Referring to the second drawing of FIG. 24, the mobile terminal may recognize that the size of the recognized first object increases in a state in which the first object has been recognized. For example, the user may approach the first object in order to photograph the first object while the first preview image 2411 is displayed in the preview image region 2410. Accordingly, the mobile terminal can recognize that the size of the first object displayed in the preview image region 2410 increases.

In an embodiment of the present invention, the mobile terminal may increase the size of the second cell 2422 upon recognizing that the size of the first object included in the first preview image 2411 increases.

Although not shown, the mobile terminal can decrease the size of the second cell 2422 upon recognizing that the size of the first object included in the first preview image 2411 decreases.

In an embodiment of the present invention, the mobile terminal may change the layout of the grid region 2420 such that the first row has 3 cells 2421, 2423 and 2424 and the second row has one cell 2422 when the size of the second cell 2422 increases.

That is, the mobile terminal may change the sizes and positions of the cells 2421, 2423 and 2424 neighboring the second cell 2422 on the basis of the second cell 2422 changed in size.

Figure 25:
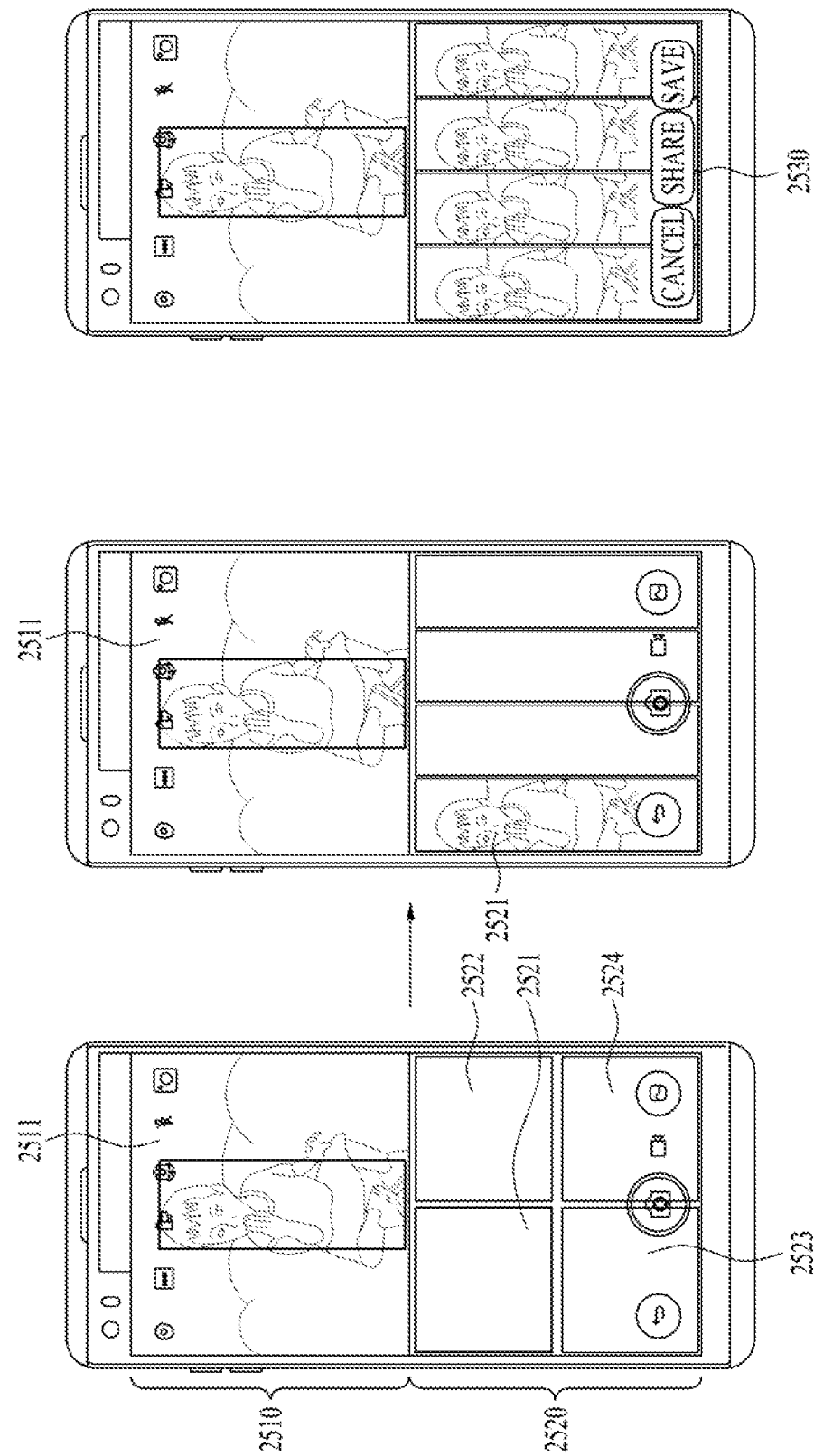
FIG. 25 is a diagram for describing another embodiment of changing a layout of a grid region on the basis of a preset event in the mobile terminal according to an embodiment of the present invention.

FIG. 25 is a diagram for describing another embodiment of changing a layout of a grid region on the basis of a preset event in the mobile terminal according to an embodiment of the present invention. Redundant description in FIGS. 4 to 24 and the embodiment of FIG. 25 will be omitted below.

Referring to the first drawing of FIG. 25, the mobile terminal may display a first preview image 2511 which is being photographed through the camera in a preview image region 2510. Here, the first preview image 2511 may be characterized by including a first object. In addition, the mobile terminal may display 4 cells 2521, 2522, 2523 and 2525 arranged in 2 columns and 2 rows in a grid region 2520.

In an embodiment of the present invention, the mobile terminal may recognize the first object included in the first preview image 2511 upon recognition of the first cell 2521. In particular, the mobile terminal may recognize the proportion of the first object included in the first preview image 2511.

Referring to the second drawing of FIG. 25, the mobile terminal may recognize that the first object is vertically long.

In an embodiment of the present invention, the mobile terminal may change the arrangement of the cells of the grid region 2520 upon recognition of the proportion of the first object. Referring to the above-described example, the mobile terminal may recognize that the first object is vertically long. Accordingly, the mobile terminal may change the layout of the grid region 2520 from an arrangement of 2 rows and 2 columns to an arrangement of 1 row and 4 columns.

That is, if the first object included in the first preview image 2511 is vertically long, the object can be photographed well when a cell is a vertically long rectangle rather than a square. Accordingly, the mobile terminal can change the arrangement of the cells included in the grid regions 2520.

In an embodiment of the present invention, the mobile terminal may sense a first input signal (not shown) for capturing the first preview image 2511. The mobile terminal may capture the first preview image 2511 and display the same on the first cell 2521 upon sensing the first input signal.

In the aforementioned manner, the mobile terminal may capture a preview image displayed in the preview image region 2510 and display the same on the second, third and fourth cells 2522, 2523 and 2524.

Referring to the third drawing of FIG. 25, the mobile terminal may display images on all of the first to fourth cells 2521, 2522, 2523 and 2524 of the grid region 2520. According to the above-described embodiment, the mobile terminal may display an icon for saving or sharing a completed grid image 2530.

Figure 26:
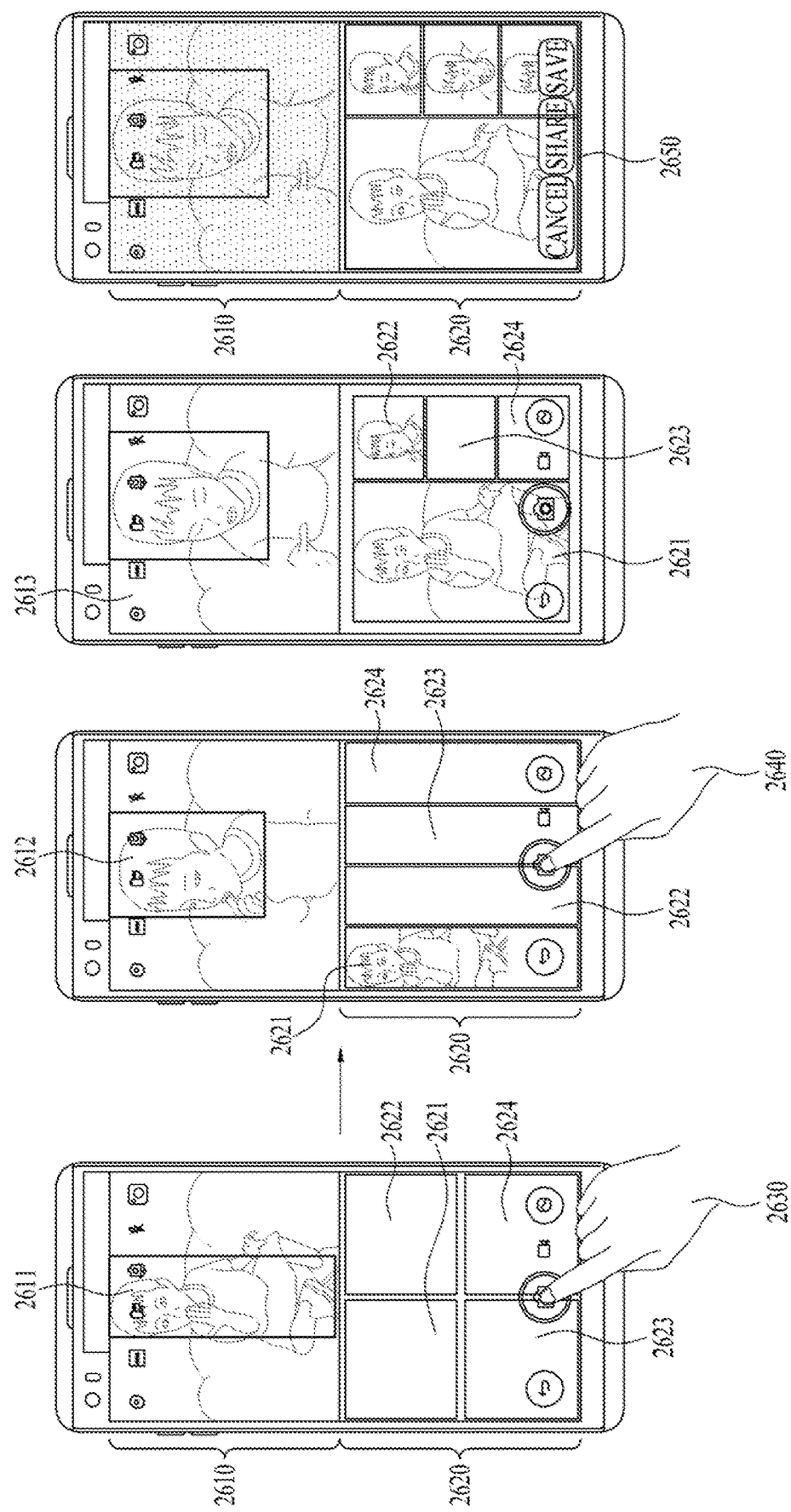
FIG. 26 is a diagram for describing another embodiment of changing a layout of a grid region on the basis of a preset event in the mobile terminal according to an embodiment of the present invention.

FIG. 26 is a diagram for describing another embodiment of changing a layout of a grid region on the basis of a preset event in the mobile terminal according to an embodiment of the present invention. Redundant description in FIGS. 4 to 25 and the embodiment of FIG. 26 will be omitted below.

Referring to the first drawing of FIG. 26, the mobile terminal may display a first preview image 2611 which is being photographed through the camera in a preview image region 2610. Here, the first preview image 2611 may be characterized by including a first object. In addition, the mobile terminal may display 4 cells 2621, 2622, 2623 and 2624 arranged in 2 columns and 2 rows in a grid region 2620.

In an embodiment of the present invention, the mobile terminal may sense a first input signal 2630 for selecting the capture icon for capturing the first preview image 2611.

The mobile terminal may recognize the proportion of the first object included in the first preview image 2611 upon sensing the first input signal 2630. Here, the first object may be vertically long.

Referring to the second drawing of FIG. 26, the mobile terminal may change the layout of the grid region 2620 upon recognizing that the first object is vertically long when the first input signal 2630 is sensed. For example, the mobile terminal can configure the grid region 2620 including 4 cells 2621, 2622, 2623 and 2624 arranged in one row and 4 columns.

In an embodiment of the present invention, the mobile terminal may display a second preview image 2612 which is being photographed through the camera in the preview image region 2610. Here, the second preview image 2612 may be characterized by including a second object.

In an embodiment of the present invention, the mobile terminal may sense a second input signal 2640 for selecting the capture icon for capturing the second preview image 2612. The mobile terminal may recognize the proportion of the second object included in the second preview image 2612 upon sensing the second input signal 2640. Here, the second object may have a square shape.

Referring to the third drawing of FIG. 26, the mobile terminal may change the layout of the grid region 2620 upon recognizing that the proportion of the second object corresponds to a square form when the second input signal 2640 is sensed.

For example, the first object of the first preview image 2611 displayed on the first cell 2621 is vertically long and thus the first cell 2621 can maintain a vertically long shape. On the other hand, the second object of the second preview image 2612 which will be displayed on the second cell 2622 has a square form and thus the mobile terminal needs to change the shape of the second cell 2622 to a square form.

Accordingly, the mobile terminal can change the shape of the second, third and fourth cells 2622, 2623 and 2624 to a square form while maintaining the first cell 2621 in a vertically long form.

In an embodiment of the present invention, the mobile terminal may display a third preview image 2613 on the third cell 2623 according to a third input signal (not shown) for capturing the third preview image 2613. Similarly, the mobile terminal may display a fourth preview image on the fourth cell 2624 according to a third input signal for capturing the fourth preview image, which is not shown.

Referring to the fourth drawing of FIG. 26, when images are displayed on all cells included in the grid region 2620, the mobile terminal may deactivate the preview image region 2610 and display icons for controlling a completed grid image 2650 in the grid region 2620.

That is, when preview images displayed in the preview image region 2610 include objects in various proportions, the mobile terminal can change the shapes of cells included in the grid region 2620 on the basis of different proportions.

FIG. 26 is a diagram for describing an embodiment of photographing images in various proportions in the mobile terminal according to an embodiment of the present invention. Redundant description in FIGS. 4 to 26 and the embodiment of FIG. 26 will be omitted below.

Referring to the first drawing of FIG. 27, the mobile terminal may execute a single shot mode in a state in which the camera application 2700 is executed on the display. Here, the single shot mode may correspond to a mode of capturing a preview image displayed in a preview image region 2710 in various proportions.

More specifically, the mobile terminal may divide the screen of the display into the preview image region 2710 and an image capture region 2720, display a first preview image 2711 which is being photographed through the camera in the preview image region 2710 and display a captured preview image in the image capture region 2720.

In an embodiment of the present invention, the mobile terminal may sense a first input signal 2740 for selecting the capture icon for capturing the first preview image 2711.

Referring to the second drawing of FIG. 27, the mobile terminal may capture the first preview image 2711 according to the first input signal 2740. Here, the mobile terminal may display the captured first preview image 2711 in the image capture region 2720.

More specifically, the mobile terminal may display the first preview image 2711 in the preview image region 2710 at an aspect ratio of 1:1. Furthermore, the mobile terminal may display the first preview image 2711 in the image capture region 2720 at an aspect ratio of 1:1 according to the first input signal 2730.

In an embodiment of the present invention, the mobile terminal may display the first preview image 2711 at an aspect ratio of 1:1 in the image capture region 2720 and, simultaneously, capture both the first preview image 2711 at an aspect ratio of 4:3 and the first preview image 2711 at an aspect ratio of 16:9 upon sensing the first input signal 2730.

In an embodiment of the present invention, the mobile terminal may recognize the type of the first preview image 2711 when capturing the first preview image 2711 according to the first input signal 2740.

More specifically, the mobile terminal may recognize the type of the first preview image 2711 in consideration of an object included in the first preview image 2711. For example, when the first preview image 2711 includes an object corresponding to a person, the mobile terminal can recognize the type of the first preview image 2711 as an image of a person. As another example, when the first preview image 2711 includes an object corresponding to a natural object, the mobile terminal can recognize the type of the first preview image 2711 as an image of nature.

In an embodiment of the present invention, the mobile terminal may recognize the type of the first preview image 2711 according to the first input signal 2730 and then capture the first preview image 2711 in various proportions on the basis of the recognized type.

Here, the mobile terminal may determine a proportion in which the first preview image 2711 will be captured on the basis of the proportion of pictures saved in the gallery application (not shown). In addition, the mobile terminal may determine a proportion in which the first preview image 2711 will be captured on the basis of a proportion frequently used by the user.

For example, when the type of the first preview image 2711 is an image of a person, the mobile terminal can capture both the first preview image 2711 at an aspect ratio of 1:1 and the first preview image 2711 at an aspect ratio of 4:3 when capturing the first preview image 2711 according to the first input signal 2730.

As another example, when the type of the first preview image 2711 is an image of nature, the mobile terminal can capture all of the first preview image 2711 at an aspect ratio of 1:1, the first preview image 2711 at an aspect ratio of 4:3 and the first preview image 2711 at an aspect ratio of 16:9 when capturing the first preview image 2711 according to the first input signal 2730.

Here, the mobile terminal may display only the first preview image 2711 at an aspect ratio of 1:1 in the image capture region 2720 even when all images are captured at different aspect ratios.

FIG. 27 is a diagram for describing another embodiment of photographing images in various proportions in the mobile terminal according to an embodiment of the present invention. Redundant description in FIGS. 4 to 27 and the embodiment of FIG. 28 will be omitted below.

Referring to FIG. 28(a), the mobile terminal may display a saved preview image 2811 on the gallery application 2800. Here, the preview image 2811 may have an aspect ratio of 18:9.

Here, the preview image 2811 may be an image having multiple proportions. That is, the saved preview image 2811 is displayed as one image on the gallery application 2800 but may be displayed in different proportions from the displayed image.

Here, the mobile terminal may display a proportion indicator 2820 indicating that the currently displayed preview image 2811 has multiple proportions on the preview image 2811. Here, the proportion indicator 2820 may be displayed in the form of a bar or numerals.

In an embodiment of the present invention, the mobile terminal may sense a first input signal 2830 for selecting the proportion indicator 2820.

Referring to FIG. 28(b), the mobile terminal may display proportion indicators 2821, 2822 and 2823 having different proportions upon sensing the first input signal 2830.

More specifically, the mobile terminal may display the first proportion indicator 2821 corresponding to an aspect ratio of 1:1, the second proportion indicator 2822 corresponding to an aspect ratio of 4:3 and the third proportion indicator 2823 corresponding to an aspect ratio of 18:9 upon sensing the first input signal 2830.

In an embodiment of the present invention, the mobile terminal may display the preview image 2811 at an aspect ratio of 1:1 upon sensing an input signal for selecting the first proportion indicator 2821. In addition, the mobile terminal may display the preview image 2811 at an aspect ratio of 4:3 upon sensing an input signal for selecting the second proportion indicator 2822. Similarly, the mobile terminal may display the preview image 2811 at an aspect ratio of 18:9 upon sensing an input signal for selecting the third proportion indicator 2823.

Referring back to FIG. 28(*a*), the mobile terminal may sense a second input signal 2840 for selecting the preview image 2811 when the preview image 2811 has multiple proportions. Here, the second input signal 2840 may correspond to an input signal for touching the preview image 2811 with preset pressure.

Figure 28:
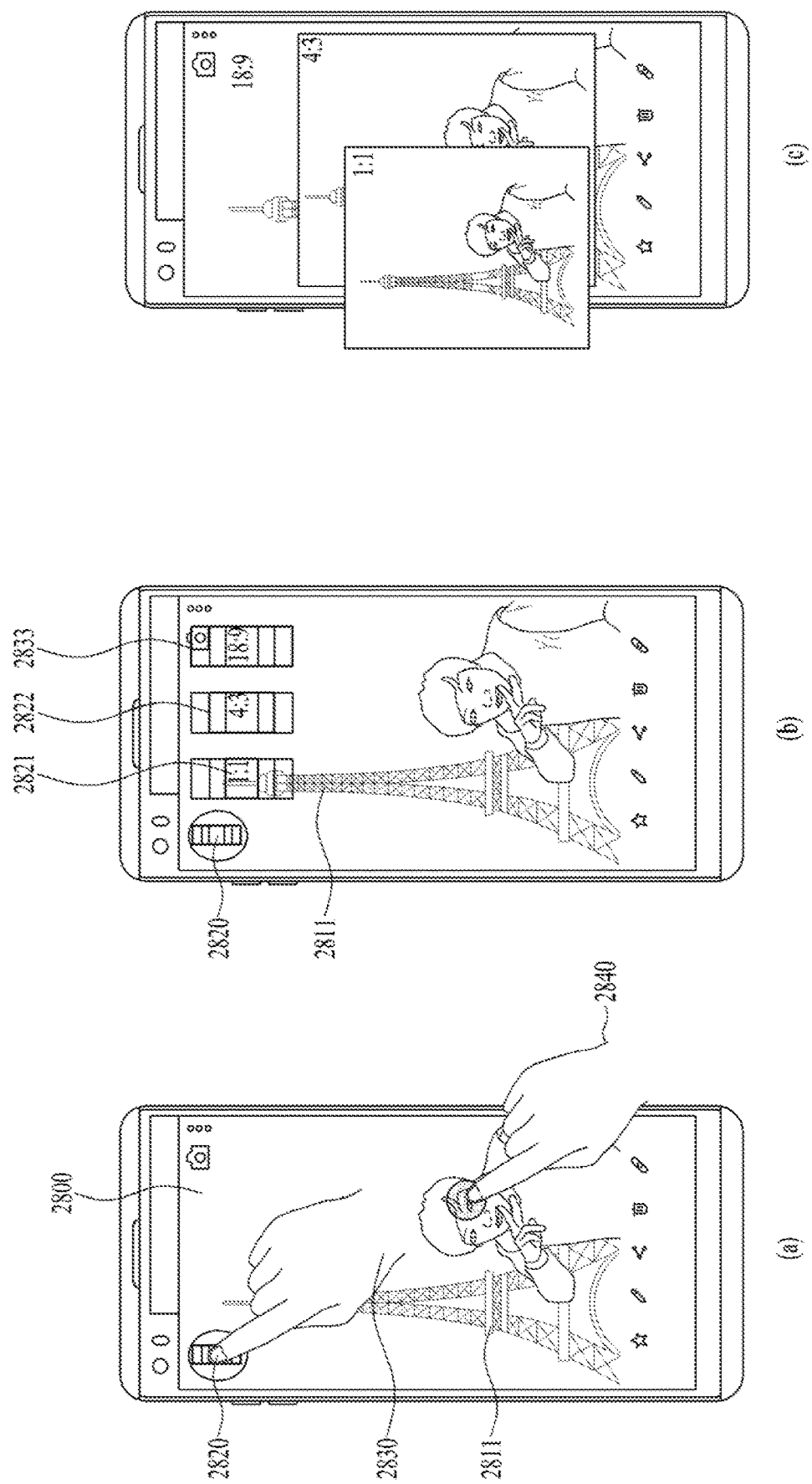
FIG. 28 is a diagram for describing another embodiment of capturing images in various proportions in the mobile terminal according to an embodiment of the present invention.

Referring to FIG. 28(*c*), the mobile terminal may display the preview image 2811 in a different proportion upon sensing the second input signal 2840.

More specifically, the mobile terminal may display the preview image 2811 at an aspect ratio of 4:3 when sensing the second input signal 2840 in a state in which the preview image 2811 has an aspect ratio of 18:9.

In addition, the mobile terminal may display the preview image 2811 at an aspect ratio of 1:1 when sensing the second input signal 2840 in a state in which the preview image 2811 has an aspect ratio of 4:3.

That is, the mobile terminal may sequentially display preview images 2811 in different proportions when the preview image 2811 displayed on the gallery application 2800 is selected using the second input signal 2840.

FIG. 28 is a diagram for describing an embodiment of sharing an image having various proportions in the mobile terminal according to an embodiment of the present invention. Redundant description in FIGS. 4 to 28 and the embodiment of FIG. 28 will be omitted below.

Figure 29:
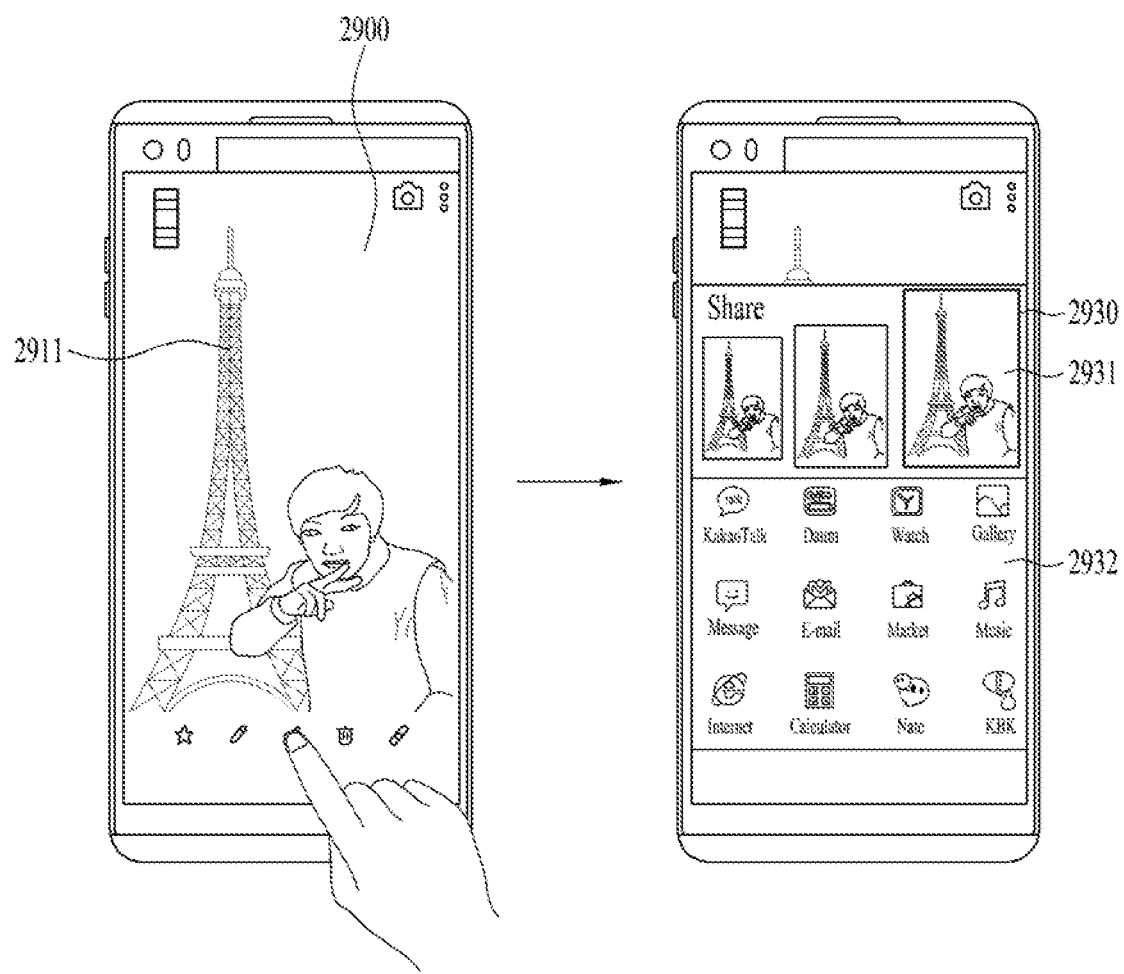
FIG. 29 is a diagram for describing an embodiment of sharing images in various proportions in the mobile terminal according to an embodiment of the present invention.

Referring to the first drawing of FIG. 29, the mobile terminal may display a preview image 2911 on the gallery application 2900. Here, the preview image may be an image having various proportions.

In an embodiment of the present invention, the mobile terminal may sense a first input signal 2920 for selecting the share icon for sharing the preview image 2911.

Referring to the second drawing of FIG. 29, the mobile terminal may display a sharing setting pop-up 2930 upon sensing the first input signal 2920. Here, the sharing setting pop-up 2930 may include an image proportion list 2931 and a sharing target list 2932.

More specifically, the mobile terminal may display the image proportion list 2931 from which a proportion in which an image will be shared is selected and the sharing target list 2932 including targets to be shared upon sensing the first input signal 2920. Here, the image proportion list 2931 may display various proportions of the preview image 2911.

The mobile terminal may share the preview image 2911 in a selected image proportion with a selected sharing target upon sensing an input signal for selecting the image proportion and an input signal for selecting the sharing target, which is not shown.

For example, the user may need to share the preview image at an aspect ratio of 1:1 instead of the preview image 2911 displayed at an aspect ratio of 18:9 in the gallery application 2900. In this case, the user can select a proportion of the preview image 2911 and a sharing target to share the preview image 2911 in a desired proportion.

In an embodiment of the present invention, the sharing target list 2932 may include a lock screen or home screen setting icon. More specifically, the mobile terminal may set a home screen in a selected image proportion upon sensing an input signal for selecting the image proportion and an input signal for selecting the home screen setting icon as a sharing target.

Figure 30:
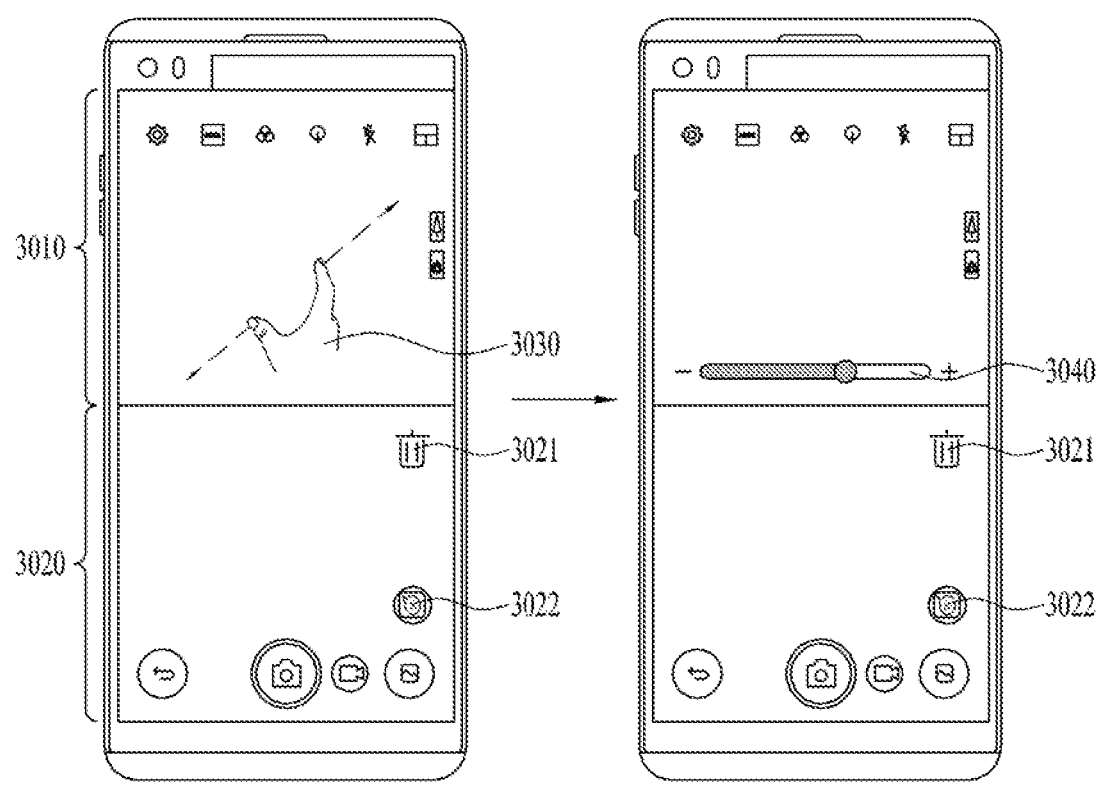
FIG. 30 is a diagram for describing an embodiment of executing a snapshot mode to change the size of a preview image in the mobile terminal according to an embodiment of the present invention.

FIG. 30 is a diagram for describing an embodiment of executing a snapshot mode to change the size of a preview image in the mobile terminal according to an embodiment of the present invention. Redundant description in FIGS. 4 to 29 and the embodiment of FIG. 30 will be omitted below.

Referring to FIG. 30, the mobile terminal may execute the snapshot mode in the camera application. Here, the mobile terminal may execute the snapshot mode according to an input signal for selecting the mode change icon as in a case of executing the grid mode.

Here, the snapshot mode may correspond to a mode of displaying a preview image region 3010 and a capture region 3020. More specifically, the mobile terminal may divide the screen of the display into the preview image region 3010 and the capture region 3020, display a preview image 3011 which is currently being photographed through the camera in the preview image region 3010 and display a previously captured preview image in the capture region 3020 in a state in which the snapshot mode is executed.

Referring to the first drawing of FIG. 30, the mobile terminal may sense an input signal 3030 for controlling the preview image 3011 displayed in the preview image region 3010. Here, the input signal 3030 may correspond to a touch input signal of touching the preview image 3011 and then pinching in or pinching out the touched preview image 3011.

Referring to the second drawing of FIG. 30, the mobile terminal may change at least one of the size and position of the preview image 3011 displayed in the preview image region 3010 upon sensing the input signal 3030. For example, if the mobile terminal senses a pinch-out touch input signal as the input signal 3030, the mobile terminal can increase the size of the preview image 3011. If the mobile terminal senses a pinch-in touch input signal as the input signal 3030, the mobile terminal can decrease the size of the preview image 3011.

In addition, the mobile terminal may display a zoom bar 3040 on the preview image region 3010 upon sensing the input signal 3030. Here, the zoom bar 3040 may correspond to an indicator which indicates the magnification of the preview image 3011. More specifically, when the size of the preview image 3011 changes according to the input signal 3030, an indicator indicating a changed size may be displayed as the zoom bar 3040.

Distinguished from the above-described embodiment, the mobile terminal may display a delete icon 3021 and a quick share icon 3022 in the capture region 3020 in the snapshot mode. Here, the delete icon 3021 is an icon for deleting a previously captured image displayed in the capture region 3020 and will be described in detail below with reference to FIG. 39. In addition, the quick share icon 3022 is an icon for quickly sharing a previously captured image displayed in the capture region 3020 and will be described in detail below with reference to FIG. 39.

Figure 31:
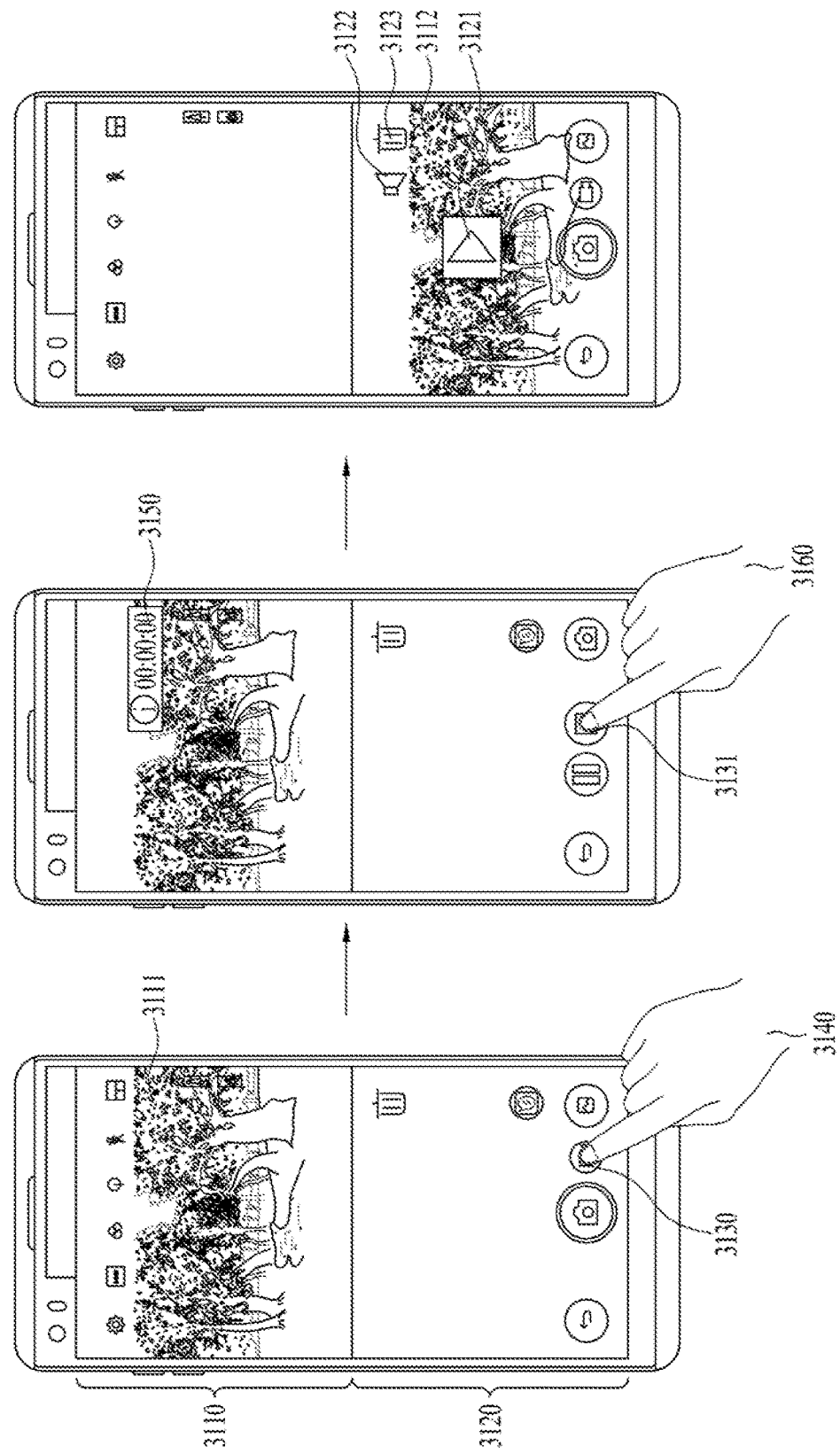
FIG. 31 is a diagram for describing an embodiment of executing the snapshot mode to record a video in the mobile terminal according to an embodiment of the present invention.

FIG. 31 is a diagram for describing an embodiment of executing the snapshot mode to record a video in the mobile terminal according to an embodiment of the present invention. Redundant description in FIGS. 4 to 30 and the embodiment of FIG. 31 will be omitted below.

Referring to the first drawing of FIG. 31, the mobile terminal may sense a first input signal 3140 for selecting a record icon 3130 while a first preview image 3111 is displayed in a preview image region 3110. Here, the first input signal 3140 may correspond to an input signal for recording the first preview image 3111.

Referring to the second drawing of FIG. 31, the mobile terminal may record the first preview image 3111 upon sensing the first input signal 3140. Here, a recording time of the first preview image 3111 may not be limited, distinguished from the above-described embodiment.

In an embodiment of the present invention, the mobile terminal may display a recording time 3150 on the preview image region 3110 while the first preview image 3111 is recorded. Further, the mobile terminal may suspend display of the camera application setting icon or the like displayed in the preview image region 3110 during recording of the first preview image 3111.

In an embodiment of the present invention, the mobile terminal may change an icon displayed in the capture region 3120 during recording of the first preview image 3111. More specifically, the mobile terminal may display the back icon, the capture icon, the record icon and the gallery thumbnail icon in the capture region 3120. In this case, the mobile terminal may suspend display of the aforementioned icons in the capture region 3120 and display the back icon, a pause icon, a recording stop icon and the capture icon when the first preview image 3111 is recorded according to the first input signal 3140.

In addition, the mobile terminal may sense a second input signal 3160 for selecting the recording stop icon 3131 during recording of the first preview image 3111. That is, the mobile terminal may record the first preview image 3111 for a period from when the first input signal 3140 is sensed to when the second input signal 3160 for selecting the recording stop icon 3131 is sensed.

Referring to the third drawing of FIG. 31, the mobile terminal may end recording of the first preview image 3111 and display a thumbnail 3112 of the recorded video in the capture region 3120 upon sensing the second input signal 3160.

In an embodiment of the present invention, the mobile terminal may display a playback icon 3121, a sound icon 3122 and a delete icon 3123 on the thumbnail 3112 displayed in the capture region 3120. Here, the playback icon 3121 may correspond to an icon for playing the video corresponding to the thumbnail 3112. In addition, the sound icon 3122 may correspond to an icon for muting or unmuting the video.

Furthermore, the mobile terminal may display a second preview image 3112 in the preview image region 3110 after recording of the first preview image 3111 is ended.

Figure 32:
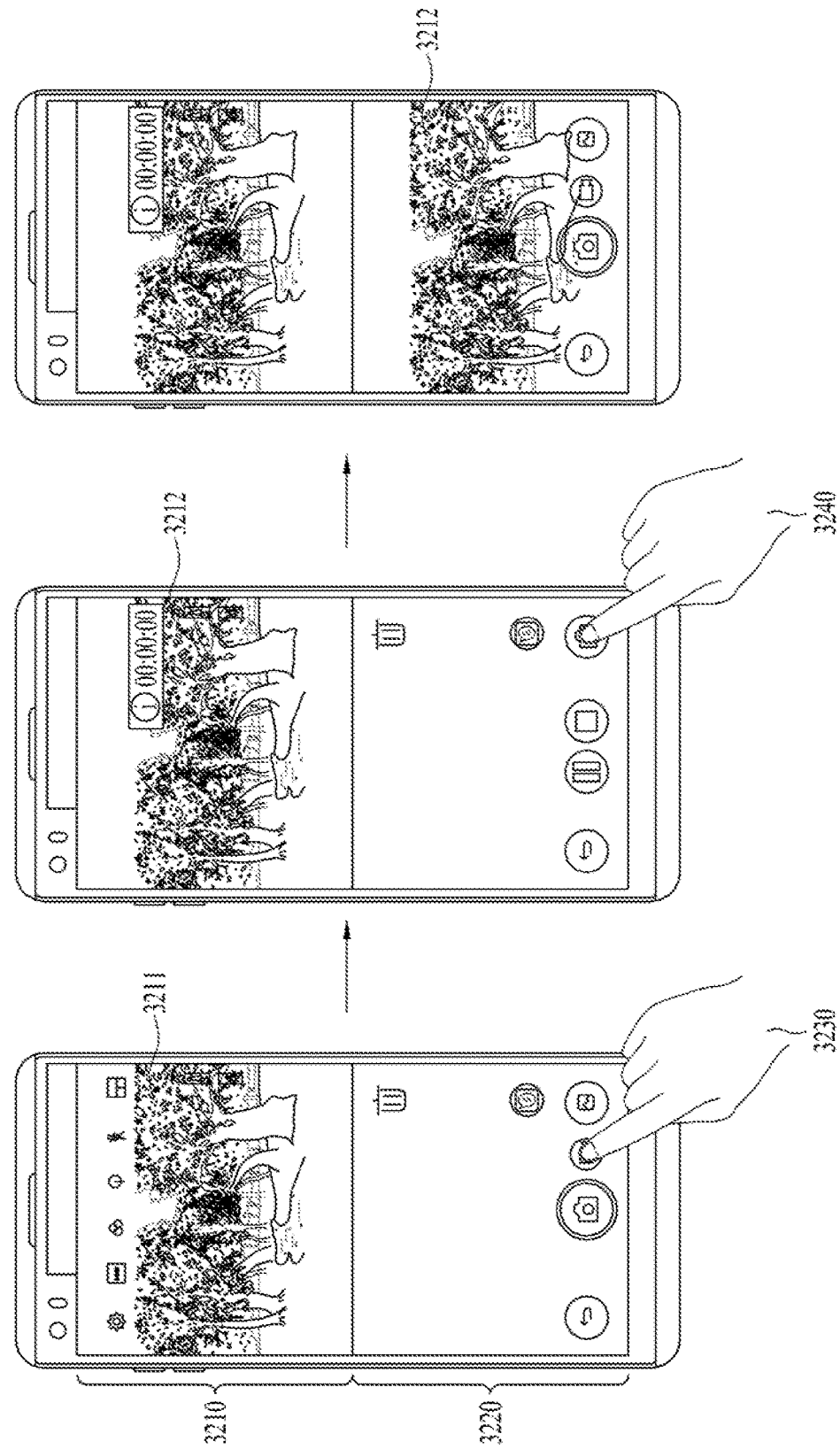
FIG. 32 is a diagram for describing another embodiment of executing the snapshot mode to record a video in the mobile terminal according to an embodiment of the present invention.

FIG. 32 is a diagram for describing another embodiment of executing the snapshot mode to record a video in the mobile terminal according to an embodiment of the present invention. Redundant description in FIGS. 4 to 31 and the embodiment of FIG. 32 will be omitted below.

The first and second drawings of FIG. 32 correspond to the first and second drawings of FIG. 31. That is, the mobile terminal may display a first preview image 3211 in a preview image region 3210 and sense a first input signal 3230 for recording the first preview image 3211. That is, the mobile terminal may record the first preview image 3211 displayed in the preview image region 3210 upon sensing the first input signal 3230.

Here, the mobile terminal may sense a second input signal 3240 for selecting the capture icon, distinguished from the embodiment of FIG. 31.

Referring to the third drawing of FIG. 32, the mobile terminal may capture a second preview image 3212 which is being recorded and displayed in the preview image region 3210 at the time of sensing the second input signal 3240.

In an embodiment of the present invention, the mobile terminal may immediately display the second preview image 3212 captured upon sensing the second input signal 3240 in the capture region 3220. In addition, the mobile terminal may capture the second preview image 3212 while continuously recording the first preview image 3211 upon sensing the first input signal 3230.

Figure 33:
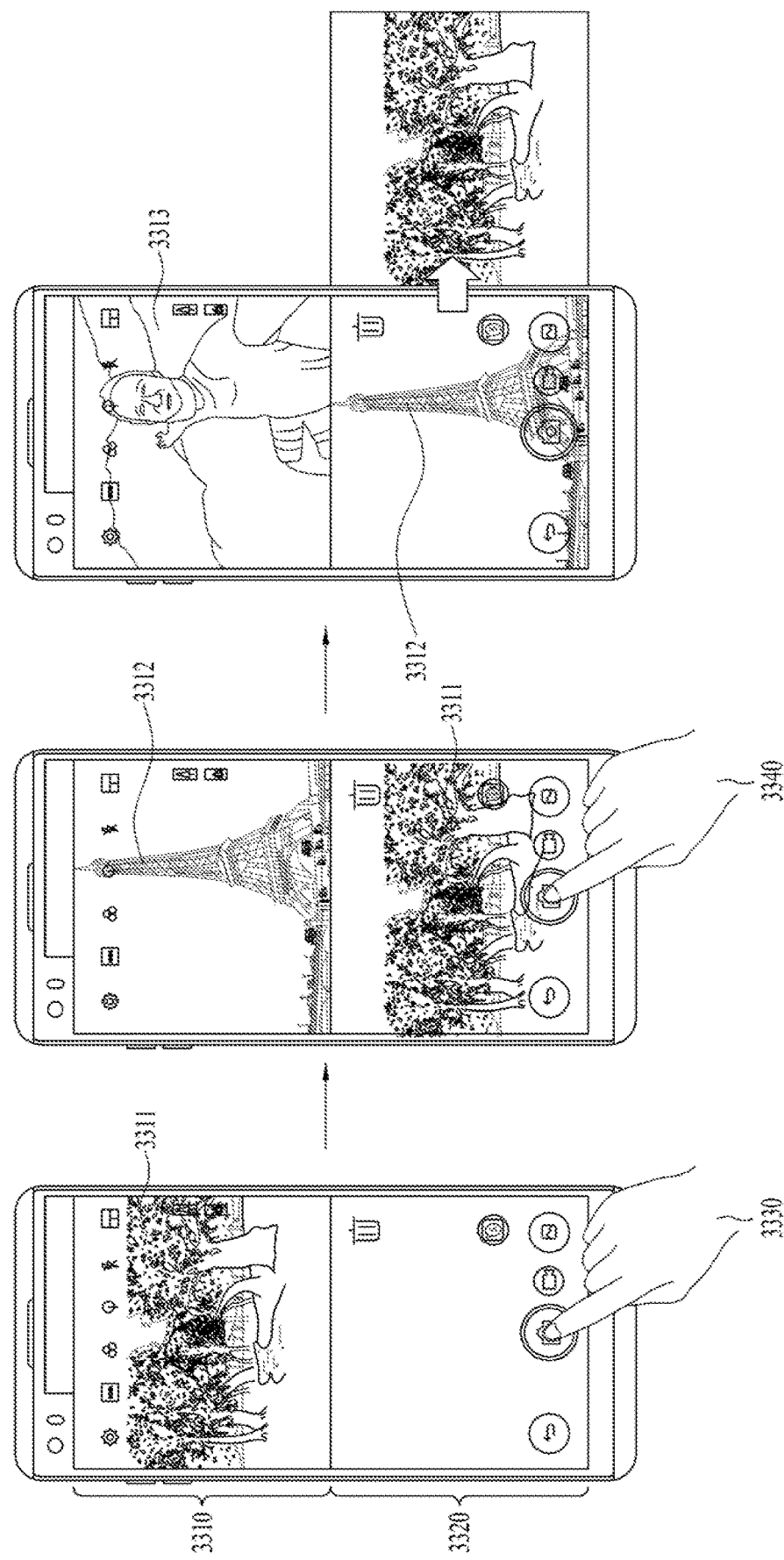
FIG. 33 is a diagram for describing another embodiment of executing the snapshot mode to continuously capture images in the mobile terminal according to an embodiment of the present invention.

FIG. 33 is a diagram for describing an embodiment of executing the snapshot mode to continuously capture images in the mobile terminal according to an embodiment of the present invention. Redundant description in FIGS. 4 to 32 and the embodiment of FIG. 33 will be omitted below.

Referring to the first drawing of FIG. 33, the mobile terminal may execute the snapshot mode to separately display a preview image region 3310 and a capture region 3320. In addition, the mobile terminal may display a first preview image 3311 which is being photographed through the camera in the preview image region 3310.

In an embodiment of the present invention, the mobile terminal may sense a first input signal 3330 for capturing the first preview image 3311. For example, the user can touch the capture icon while the first preview image 3311 is displayed in the preview image region 3310.

Referring to the second drawing of FIG. 33, the mobile terminal may capture the first preview image 3311 and display the same in the capture region 3320 upon sensing the first input signal 3330. Here, the mobile terminal may apply an animation effect wherein the first preview image 3311 is displayed while being magnified when displaying the first preview image 3311 in the capture region 3320.

In addition, the mobile terminal may display a second preview image 3312 which is being photographed through the camera in the preview image region 3310. In an embodiment of the present invention, the mobile terminal may sense a second input signal 3340 for capturing the second preview image 3312. For example, the user can touch the capture icon while the second preview image 3312 is displayed in the preview image region 3310 and the first preview image 3311 is displayed in the capture region 3320.

Referring to the third drawing of FIG. 33, the mobile terminal may capture the second preview image 3312 and display the same in the capture region 3320 upon sensing a second input signal 3340. More specifically, the mobile terminal may push away the first preview image 3311 displayed in the capture region to the right and display the second preview image 3312 in the capture region 3320 upon sensing the second input signal 3340. That is, the mobile terminal may apply an animation effect wherein the first preview image is pushed away to the right and the second preview image 3312 is displayed when displaying the second preview image 3312 in the capture region 3320.

Figure 34:
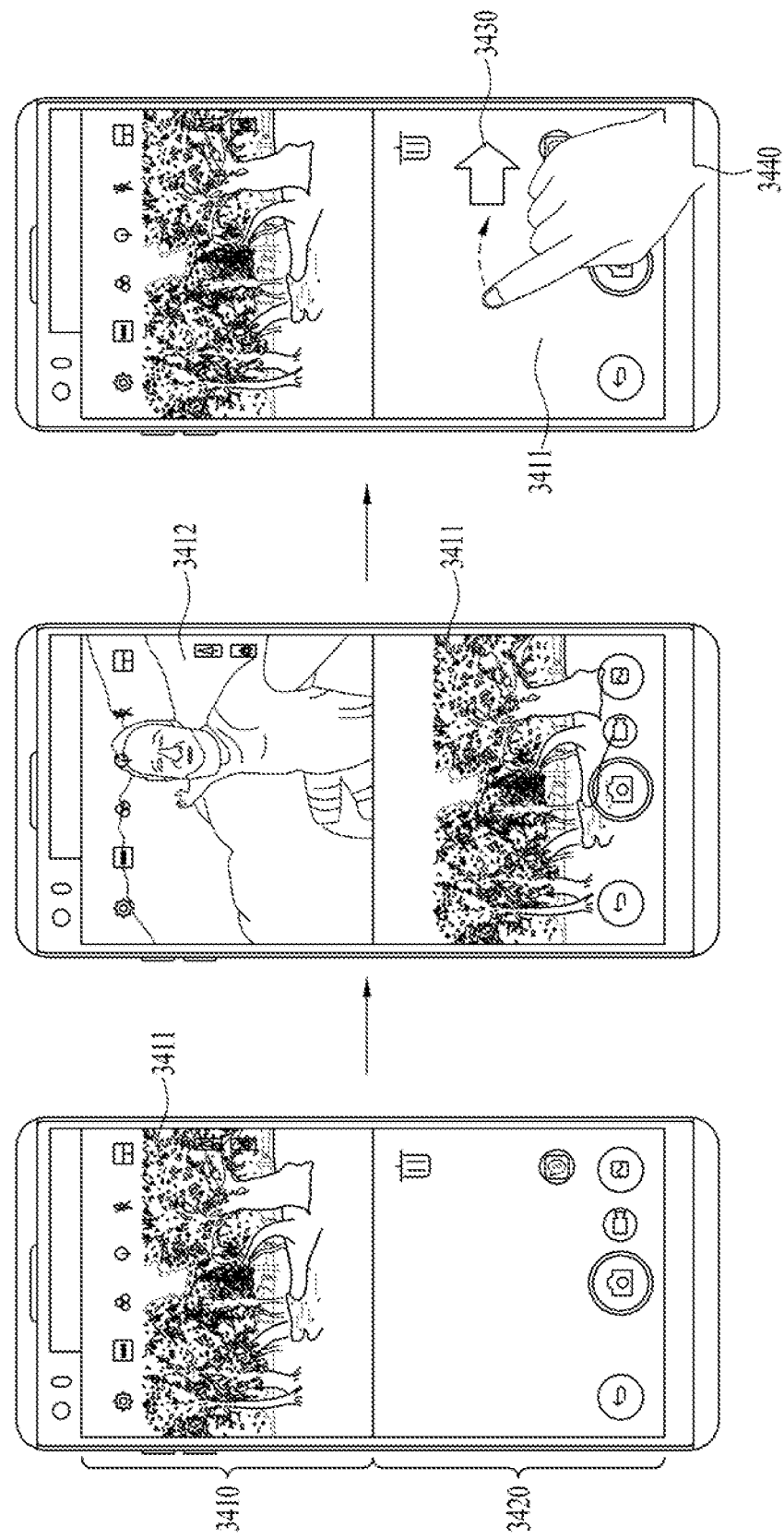
FIG. 34 is a diagram for describing another embodiment of executing the snapshot mode to capture an image in the mobile terminal according to an embodiment of the present invention.

FIG. 34 is a diagram for describing another embodiment of executing the snapshot mode to capture an image in the mobile terminal according to an embodiment of the present invention. Redundant description in FIGS. 4 to 33 and the embodiment of FIG. 34 will be omitted below.

The first and second drawings of FIG. 34 correspond to the first and second drawings of FIG. 33. That is, the mobile terminal may display a first preview image 3411 which is being photographed through the camera in a preview image region 3410. In addition, the mobile terminal may capture the first preview image 3411 according to an input signal (not shown) for capturing the first preview image 3411 and display the captured first preview image 3411 in a capture region 3420.

In an embodiment of the present invention, the mobile terminal may change a photographing mode upon displaying a second preview image 3412 which is being photographed through the camera in the preview image region 3410 and displaying the previously captured first preview image 3411 in the capture region 3420.

More specifically, the mobile terminal may capture an image or record a video in various photographing modes through the camera application. Here, the mobile terminal may change a photographing mode using the mode change icon displayed through the camera application. Accordingly, the mobile terminal may change a photographing mode in a state in which the first preview image 3411 is displayed in the capture region 3420 through the snapshot mode.

Referring to the third drawing of FIG. 34, the mobile terminal may delete the first preview image 3411 displayed in the capture region 3420 and display an empty screen 3413 when the snapshot mode is executed again after the photographing mode of the camera application is changed.

In addition, when the snapshot mode is executed again after the photographing mode of the camera application is changed, if the first preview image 3411 previously captured and previously displayed in the capture region 3420 is present, the mobile terminal may indicate presence of the previously captured first preview image 3411 by displaying an arrow indicator 3430.

More specifically, the mobile terminal may sense an input signal 3440 for selecting the empty screen 3413 on the basis of the arrow indicator 3430. Here, when the arrow indicator 3430 indicates the right direction, the input signal 3440 may correspond to an input signal of touching the empty screen and then swiping to the right. Although not shown, the mobile terminal may display the previously captured first preview image 3411 in the capture region 3420 according to the input signal 3440.

Figure 35:
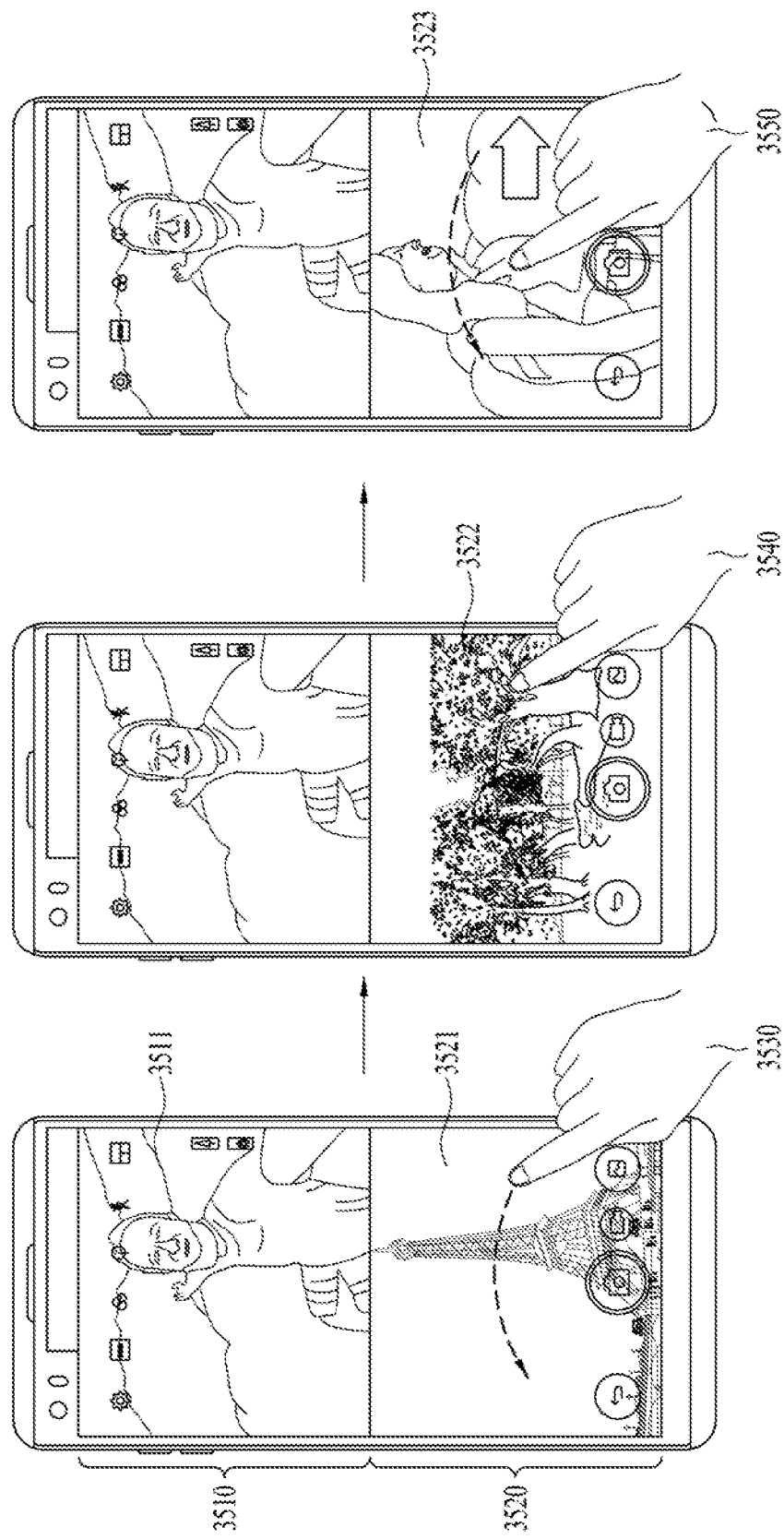
FIG. 35 is a diagram for describing an embodiment of checking an image captured by executing the snap shot mode in the mobile terminal according to an embodiment of the present invention.

FIG. 35 is a diagram for describing an embodiment of executing the snapshot mode to check a captured image in the mobile terminal according to an embodiment of the present invention. Redundant description in FIGS. 4 to 34 and the embodiment of FIG. 35 will be omitted below.

Referring to the first drawing of FIG. 35, the mobile terminal may execute the snapshot mode to display a preview image 3511 in a preview image region 3510 and display a first capture image 3521 in a capture region 3520. Here, the first capture image 3521 may be a most recently captured image.

Here, it is assumed that the mobile terminal executes the snapshot mode to capture multiple images. When there are multiple captured images, the mobile terminal may stack the multiple captured images in a preset direction on the capture region 3520.

In an embodiment of the present invention, the mobile terminal may sense a first input signal 3530 for selecting the first capture image 3521. Here, the first input signal 3530 may correspond to a touch input signal of touching the first capture image 3521 and then swiping in a preset direction. For example, when the multiple captured images are stacked to the right on the capture region 3520, the first input signal 3530 may correspond to a touch input signal of touching the first capture image 3521 and then swiping to the left from the right.

Referring to the second drawing of FIG. 35, the mobile terminal may display a second capture image 3522 in the capture region 3520 upon sensing the first input signal 3530. Here, the second capture image 3522 may be an image captured prior to the first capture image 3521.

In an embodiment of the present invention, the mobile terminal may sense a second input signal 3540 for selecting the second capture image 3522. Here, the second input signal 3540 may be the same input signal as the first input signal 3530.

Referring to the third drawing of FIG. 35, the mobile terminal may display a third capture image 3523 in the capture region 3520 upon sensing the second input signal 3540. Here, the third capture image 3523 may be an image captured prior to the second capture image 3522.

In an embodiment of the present invention, the mobile terminal may sense a third input signal 3550 for flicking the third capture image 3523 as in the above-described embodiment. However, if the third capture image 3523 is the last image of the images stacked in the capture region 3520, the mobile terminal may merely move the third capture image 3523 on the basis of the direction of the third input signal 3550 and may not display other capture images in the capture region 3520. For example, the mobile terminal can apply a banding effect to the third capture image 3523 on the basis of the direction of the third input signal 3550.

Figure 36:
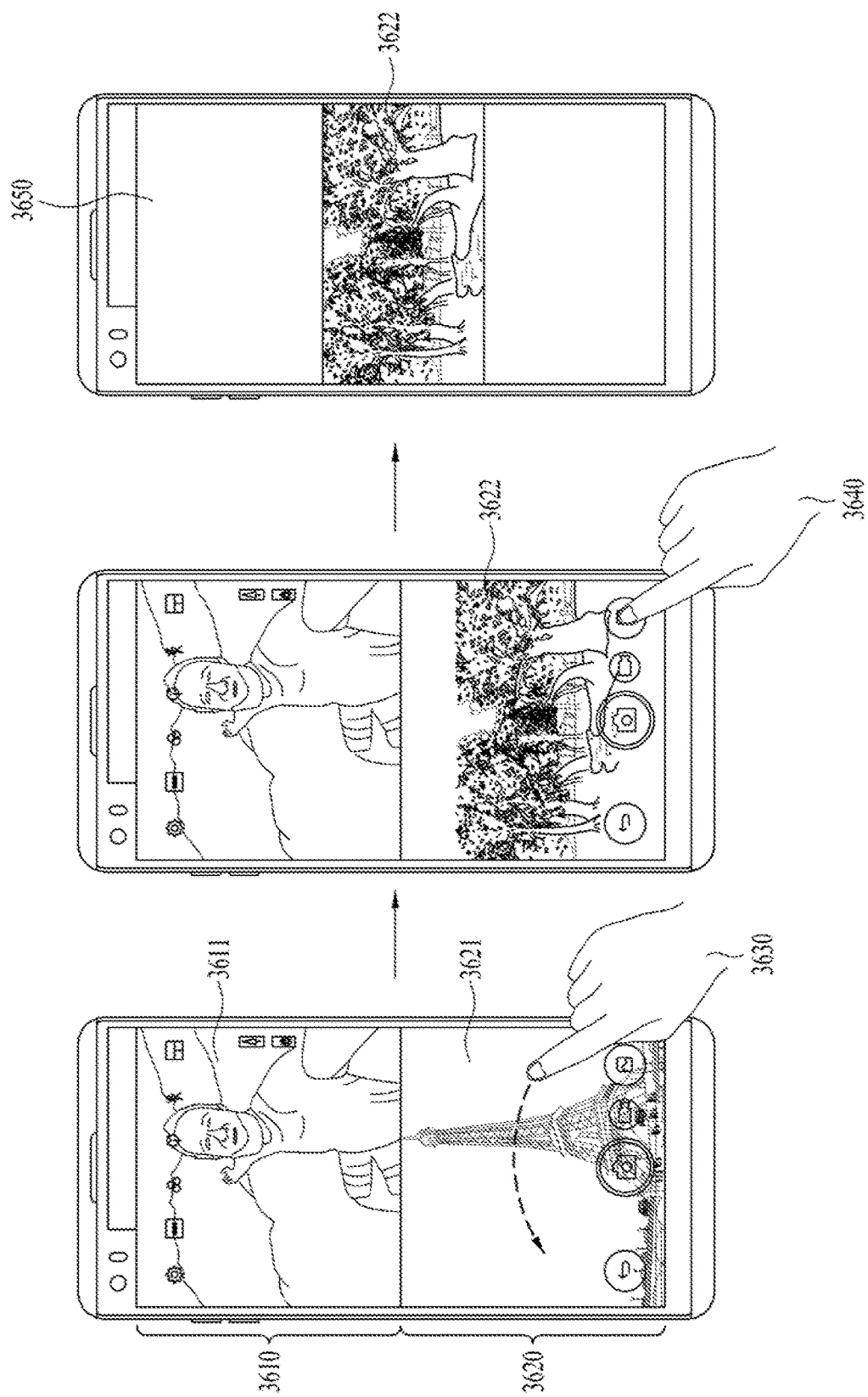
FIG. 36 is a diagram for describing another embodiment of checking an image captured by executing the snapshot mode in the mobile terminal according to an embodiment of the present invention.

FIG. 36 is a diagram for describing another embodiment of executing the snapshot mode to check a captured image in the mobile terminal according to an embodiment of the present invention. Redundant description in FIGS. 4 to 35 and the embodiment of FIG. 36 will be omitted below.

The first and second drawings of FIG. 36 correspond to the first and second drawings of FIG. 35. That is, the mobile terminal may execute the snapshot mode to display a preview image 3611 in a preview image region 3610 and display a previously captured first capture image 3621 in a capture region 3620. The mobile terminal may display a second capture image 3622 in the capture region 3620 upon sensing a first input signal 3630 for selecting the first capture image 3621.

In an embodiment of the present invention, the mobile terminal may sense a second input signal 3622 for selecting the gallery thumbnail icon while the second capture image 3622 is displayed in the capture region 3620. For example, the user can touch the gallery thumbnail icon in order to closely view the second capture image 3622 while the second capture image 3622 is displayed in the capture region 3620.

Referring to the third drawing of FIG. 36, the mobile terminal may execute the gallery application 3650 upon sensing a second input signal 3640. The mobile terminal may display the second capture image 3622 through the gallery application 3650. Here, the mobile terminal may display the second capture image 3622 along with a larger amount of detailed information through the gallery application, distinguished from a case in which the second capture image 3622 is displayed through the camera application.

Figure 37:
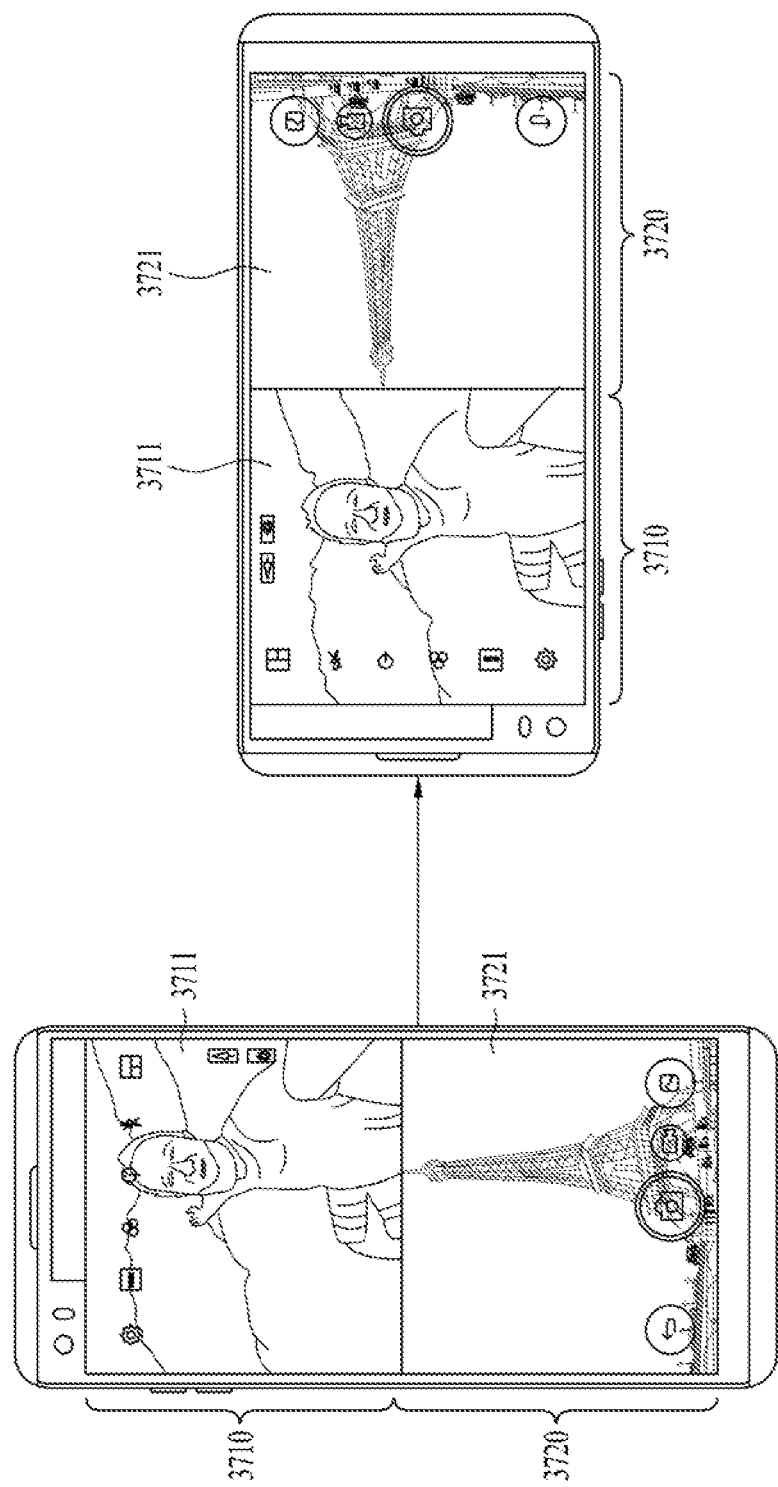
FIG. 37 is a diagram for describing an embodiment of executing the snapshot mode to change the orientation of the mobile terminal according to an embodiment of the present invention.

FIG. 37 is a diagram for describing an embodiment of executing the snapshot mode to change the orientation of the mobile terminal according to an embodiment of the present invention. Redundant description in FIGS. 4 to 36 and the embodiment of FIG. 37 will be omitted below.

Referring to the first drawing of FIG. 37, the mobile terminal may display a preview image 3711 in a preview image region 3710 and display a capture image 3721 in a capture region 3720. Here, the direction of an object included in the capture image 3721 may correspond to a vertical direction.

Referring to the second drawing of FIG. 37, the mobile terminal may control the capture image 3721 displayed in the capture region 3720 not to automatically rotate upon detection of rotation of the mobile terminal.

More specifically, the capture image 3721 displayed in the capture region 3720 may be a previously captured image and the preview image 3711 displayed in the preview image region 3710 may be an image which is being photographed through the camera. In this case, when the user wants to capture an image in a different direction from the direction of the capture image 3721 displayed in the capture region 3720, the user can rotate the mobile terminal and capture the image. Accordingly, the preview image 611 displayed in the preview image region 3710 automatically rotates as the mobile terminal rotates but the capture image 3721 displayed in the capture region 3720 may not automatically rotate. Referring to the above-described example, when the mobile terminal is in the portrait mode and the direction of the object included in the capture image 3721 corresponds to the vertical direction, the mobile terminal may set the object included in the capture image 3721 in the horizontal direction when the mobile terminal switched from the portrait mode to the landscape mode.

Figure 38:
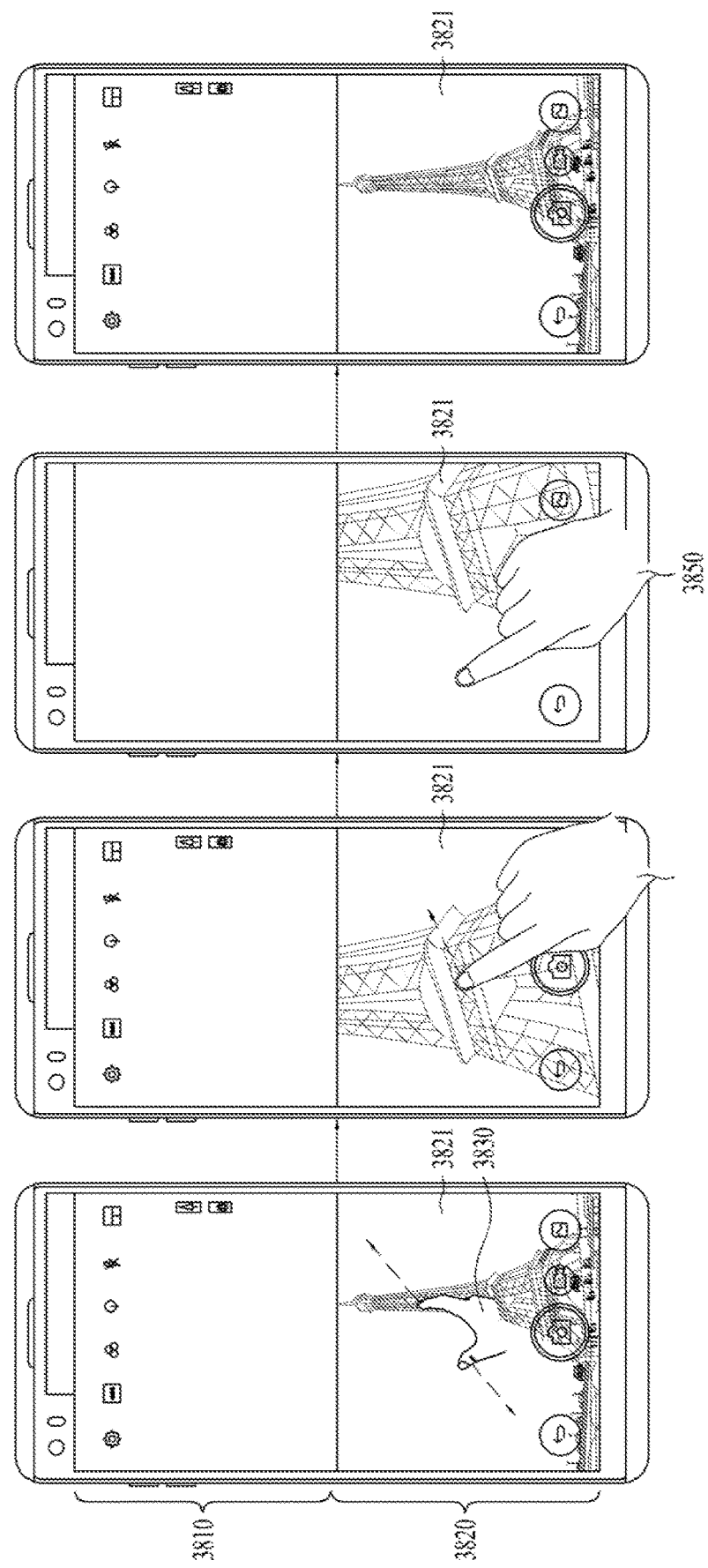
FIG. 38 is a diagram for describing an embodiment of executing the snapshot mode to change the size and position of a captured image in the mobile terminal according to an embodiment of the present invention.

FIG. 38 is a diagram for describing an embodiment of executing the snapshot mode to change the size and position of a captured preview image in the mobile terminal according to an embodiment of the present invention. Redundant description in FIGS. 4 to 36 and the embodiment of FIG. 38 will be omitted below.

Referring to the first drawing of FIG. 38, the mobile terminal may display a preview image in a preview image region 3810 and display a previously captured image 3821 in a capture region 3820.

In an embodiment of the present invention, the mobile terminal may sense a first input signal 3830 for selecting the previously captured image 3821. Here, the first input signal 3830 may correspond to a zoom-in touch input signal.

Referring to the second drawing of FIG. 38, the mobile terminal may increase the size of the previously captured image 3821 upon sensing the first input signal 3830. When the first input signal 3830 corresponds to a zoom-out touch input signal, the mobile terminal may decrease the size of the previously captured image 3821.

In an embodiment of the present invention, the mobile terminal may sense a second input signal 3840 for selecting the previously captured image 3821. Here, the second input signal 3840 may correspond to a touch-and-drag input signal.

The mobile terminal may move the previously captured image 3821 on the basis of the drag direction of the second input signal 3840 upon sensing the second input signal 3840.

Referring to the third drawing of FIG. 38, the mobile terminal may sense a third input signal 3850 for selecting the previously captured image 3821. Here, the third input signal 3850 may correspond to a touch input signal of double tapping the previously captured image 3821.

Referring to the fourth drawing of FIG. 38, the mobile terminal may magnify and display the previously captured image 3821 upon sensing a third input signal 3850. In another embodiment of the present invention, the mobile terminal may reduce and display the previously captured image 3821 upon sensing the third input signal 3850. That is, the mobile terminal may differently apply a function corresponding to an input signal according to setting.

That is, the mobile terminal may change at least one of the size and position of the previously captured image 3821 on the basis of various input signals for selecting the previously captured image 3821 displayed in the capture region 3820 while a preview image is displayed in the preview image region 3810.

Figure 39:
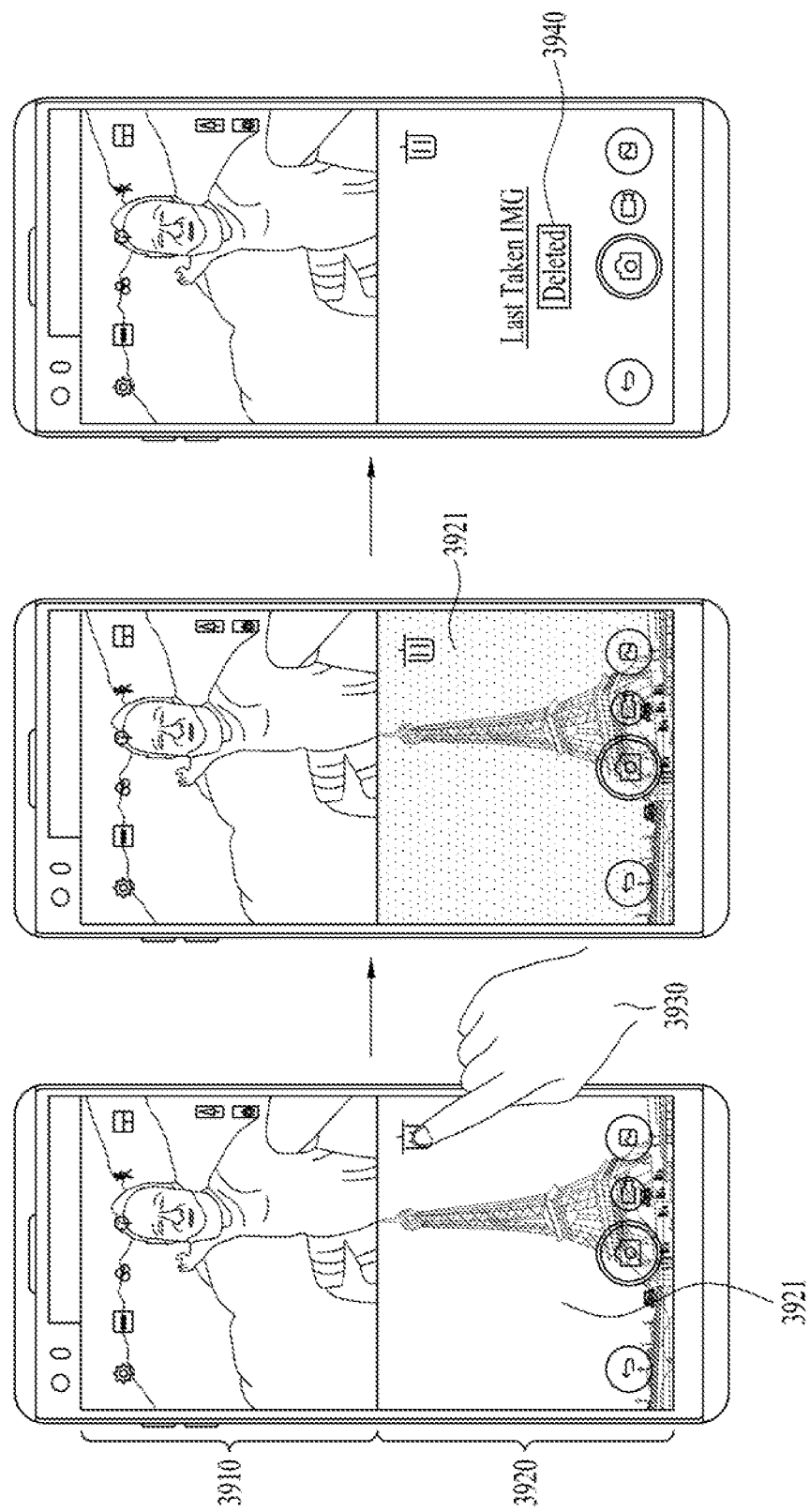
FIG. 39 is a diagram for describing an embodiment of executing the snapshot mode to delete a captured image in the mobile terminal according to an embodiment of the present invention.

FIG. 39 is a diagram for describing an embodiment of executing the snapshot mode to delete a previously captured preview image in the mobile terminal according to an embodiment of the present invention. Redundant description in FIGS. 4 to 38 and the embodiment of FIG. 39 will be omitted below.

Referring to the first drawing of FIG. 39, the mobile terminal may display a preview image in a preview image region 3910 and display a capture image 3921 in a capture region 3920. In an embodiment of the present invention, the mobile terminal may display the delete icon on the capture image 3921. Here, the delete icon may correspond to an icon for deleting a previously captured image.

In an embodiment of the present invention, the mobile terminal may sense an input signal 3930 for selecting the delete icon.

Referring to the second drawing of FIG. 39, the mobile terminal may delete the capture image 3921 displayed in the capture region upon sensing the input signal 3930. Here, the mobile terminal may apply a fade-out effect when deleting the capture image 3921. More specifically, the mobile terminal may express the capture image 3921 as if it gradually becomes blurred when deleting the capture image 3921 according to the input signal 3930.

Referring to the third drawing of FIG. 39, the mobile terminal may display a delete pop-up 3940 after the capture image 3921 is deleted. Here, the delete pop-up 3940 can indicate that the most recently captured image has been deleted.

Figure 40:
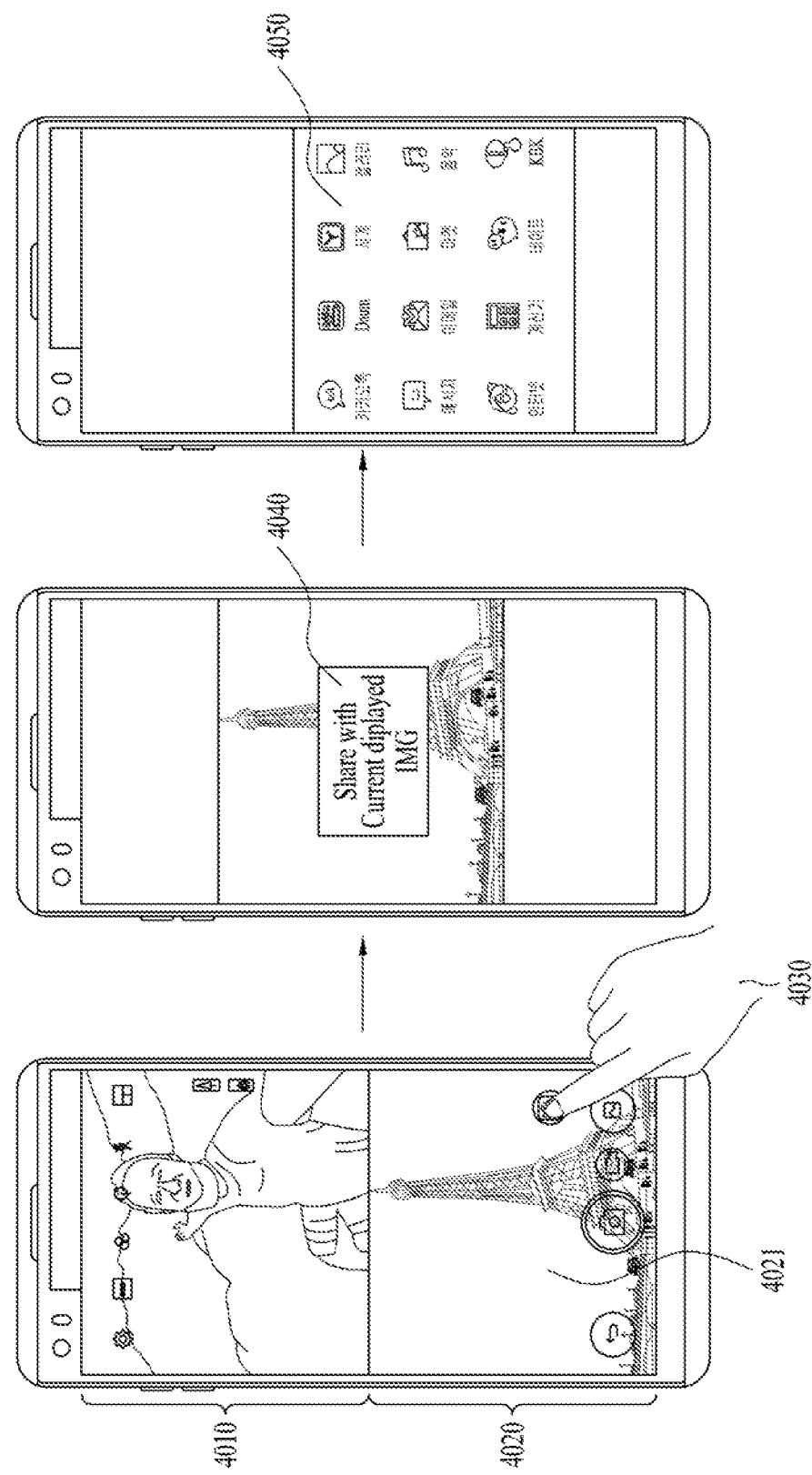
FIG. 40 is a diagram for describing an embodiment of executing the snapshot mode to share a captured image in the mobile terminal according to an embodiment of the present invention.

FIG. 40 is a diagram for describing an embodiment of executing the snapshot mode to share a previously captured preview image in the mobile terminal according to an embodiment of the present invention. Redundant description in FIGS. 4 to 39 and the embodiment of FIG. 40 will be omitted below.

Referring to the first drawing of FIG. 40, the mobile terminal may display a preview image in a preview image region 4010 and display a capture image 4021 in a capture region 4020. In an embodiment of the present invention, the mobile terminal may display the quick share icon on the capture image 4021. Here, the quick share icon may correspond to an icon for quickly sharing the capture image 4021.

In an embodiment of the present invention, the mobile terminal may sense an input signal 4030 for selecting the quick share icon.

Referring to the second drawing of FIG. 40, the mobile terminal may share the capture image 4021 displayed in the capture region 4020 upon sensing the input signal 4030. More specifically, the mobile terminal may display a pop-up 4040 for sharing the capture image 4021. Here, the pop-up 4040 may indicate that the currently displayed capture image 4021 is shared.

Referring to the third drawing of FIG. 40, the mobile terminal may display a sharing target list 4050 for sharing the capture image 4021. In addition, the mobile terminal may share the capture image 4021 with a sharing target selected from the sharing target list 4050 according to an input signal for selecting a sharing target included in the sharing target list 4050, which is not shown. Here, the mobile terminal may share the capture image 4021 with an external device or an external server through the wireless communication unit.

Figure 41:
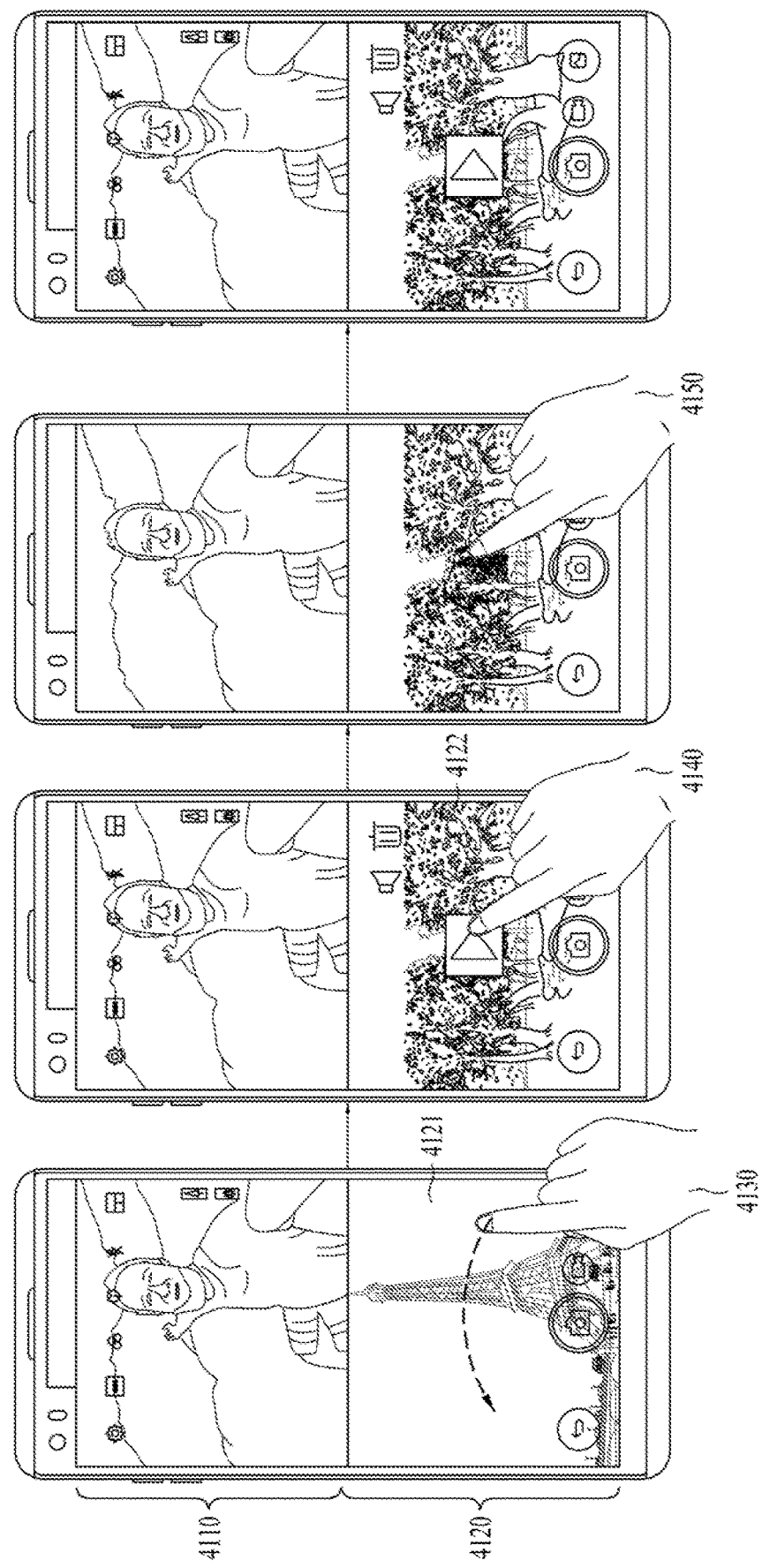
FIG. 41 is a diagram for describing an embodiment of executing the snapshot mode to play a recorded video in the mobile terminal according to an embodiment of the present invention.

FIG. 41 is a diagram for describing an embodiment of executing the snapshot mode to play a recorded video in the mobile terminal according to an embodiment of the present invention. Redundant description in FIGS. 4 to 40 and the embodiment of FIG. 41 will be omitted below.

Referring to the first drawing of FIG. 41, the mobile terminal may display a preview image in a preview image region 4110 and display a capture image 4121 in a capture region 4120. In an embodiment of the present invention, the mobile terminal may sense a first input signal 4130 for flicking the capture image 4121. This has been described above with reference to FIG. 35.

Referring to the second drawing of FIG. 41, the mobile terminal may display an image captured prior to the capture image 4121 upon sensing the first input signal 4130. Here, the mobile terminal may display a video instead of an image. That is, the mobile terminal may display a thumbnail 4122 corresponding to a recorded video in the capture region 4120 upon sensing the first input signal 4130.

In addition, the mobile terminal may display the playback icon, the sound icon and the delete icon on the thumbnail 4122 simultaneously with displaying the thumbnail 4122 upon sensing the first input signal 4130 since the thumbnail 4122 corresponds to the video. In an embodiment of the present invention, the mobile terminal may sense a second input signal 4140 for selecting the playback icon displayed on the thumbnail 4122.

Referring to the third drawing of FIG. 41, the mobile terminal may play the video corresponding to the thumbnail 4122 upon sensing the second input signal 4140. In addition, the mobile terminal may suspend display of the playback icon, the sound icon and the delete icon displayed on the thumbnail 4122 when the video corresponding to the thumbnail 4122 is played. In an embodiment of the present invention, the mobile terminal may sense a third input signal 4150 for selecting a point of the video being played.

Referring to the fourth drawing of FIG. 41, the mobile terminal may suspend playback of the video upon sensing the third input signal 4150. In an embodiment of the present invention, the mobile terminal may display the thumbnail 4122 corresponding to the video as illustrated in the second drawing of FIG. 41, upon suspending playback of the video. In addition, the mobile terminal may display the playback icon, the sound icon and the delete icon on the thumbnail 4122 as the thumbnail 4122 is displayed.

The mobile terminal may suspend playback of the video and display the thumbnail 4122 when a video playback time expires even though the third input signal 4150 is not sensed.

Meanwhile, although not shown, the displayed thumbnail in the fourth drawing of FIG. 41 may differ from the thumbnail in the second drawing of FIG. 41 since a different thumbnail may represent the video because the video has been suspended after being played.

Furthermore, the mobile terminal may capture the preview image displayed in the preview image 4110 using a hard key (e.g., a volume key) included in the mobile terminal even if the capture image 4121 or the thumbnail 4122 corresponding to the video is displayed or played in the capture region 4120 because the preview image is displayed in the preview image region 4110, which is not shown.

Figure 42:
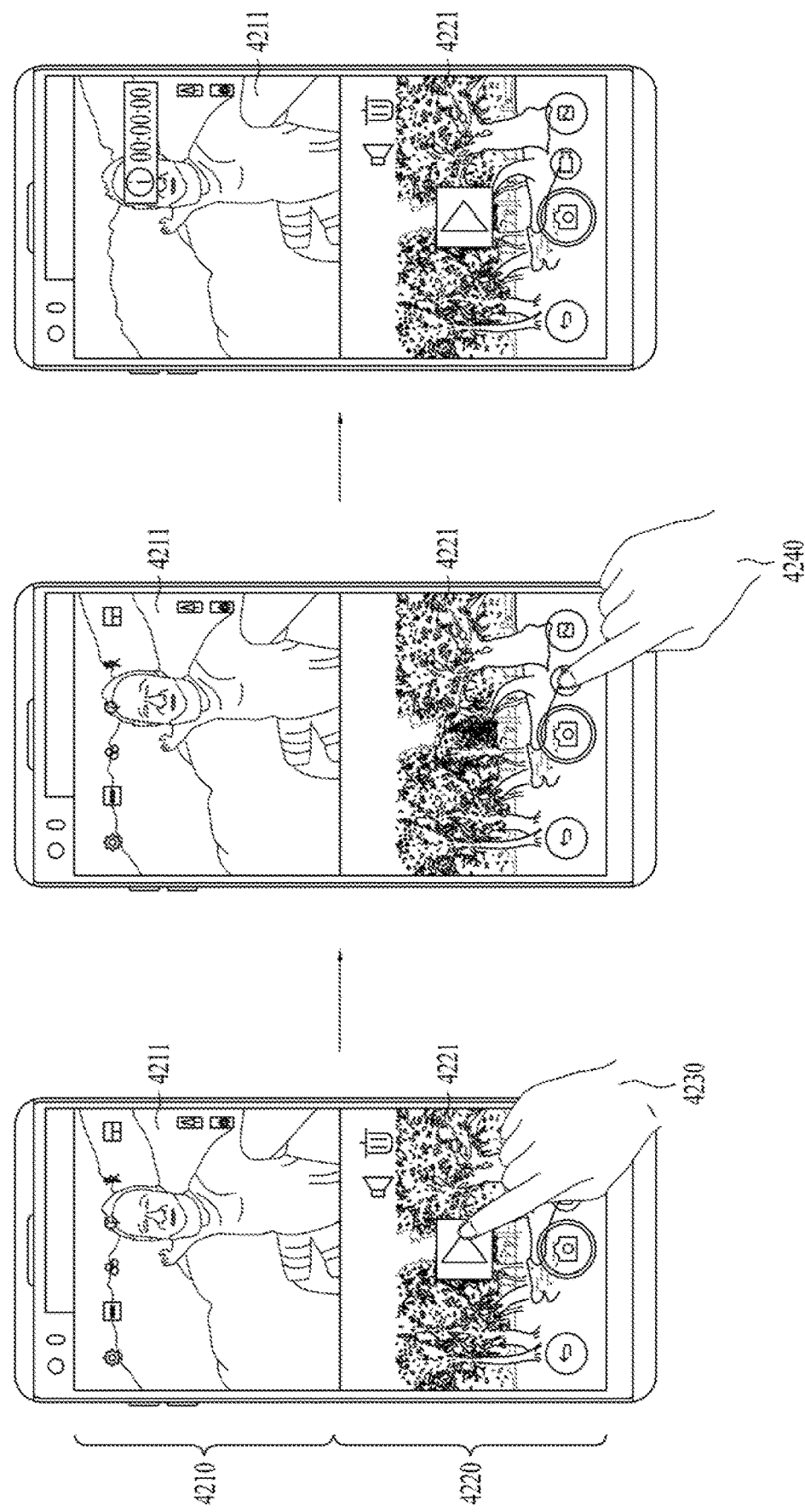
FIG. 42 is a diagram for describing another embodiment of executing the snapshot mode to record a video in the mobile terminal according to an embodiment of the present invention.

FIG. 42 is a diagram for describing another embodiment of executing the snapshot mode to record a video in the mobile terminal according to an embodiment of the present invention. Redundant description in FIGS. 4 to 41 and the embodiment of FIG. 42 will be omitted below.

Referring to the first drawing of FIG. 42, the mobile terminal may display a preview image 4211 in a preview image region 4210 and display a thumbnail 4221 corresponding to a video in a capture region 4220. In an embodiment of the present invention, the mobile terminal may sense a first input signal 4230 for selecting an icon for playing the thumbnail 4221.

Referring to the second drawing of FIG. 42, the mobile terminal may play the video corresponding to the thumbnail 4221 upon sensing the first input signal 4230. Here, the mobile terminal may display icons for controlling the preview image 4211 displayed in the preview image region 4210 when the video corresponding to the thumbnail 4221 is played, distinguished from the above-described embodiment. More specifically, the mobile terminal may display the back icon, the capture icon, the record icon and the gallery thumbnail icon when the video corresponding to the thumbnail 4221 is played. In an embodiment of the present invention, the mobile terminal may sense a second input signal 4240 for selecting the record icon while the video corresponding to the thumbnail 4221 is played.

Referring to the third drawing of FIG. 42, the mobile terminal may record the preview image 4211 displayed in the preview image region 4210 upon sensing the second input signal 4240. Further, the mobile terminal may suspend playback of the video displayed in the capture region 4220 and display the thumbnail 4221 corresponding to the video upon sensing the second input signal 4240.

Although embodiments have been separately described using drawings for convenience of description, embodiments described with reference to drawings may be combined to implement a new embodiment.

Figure 43:
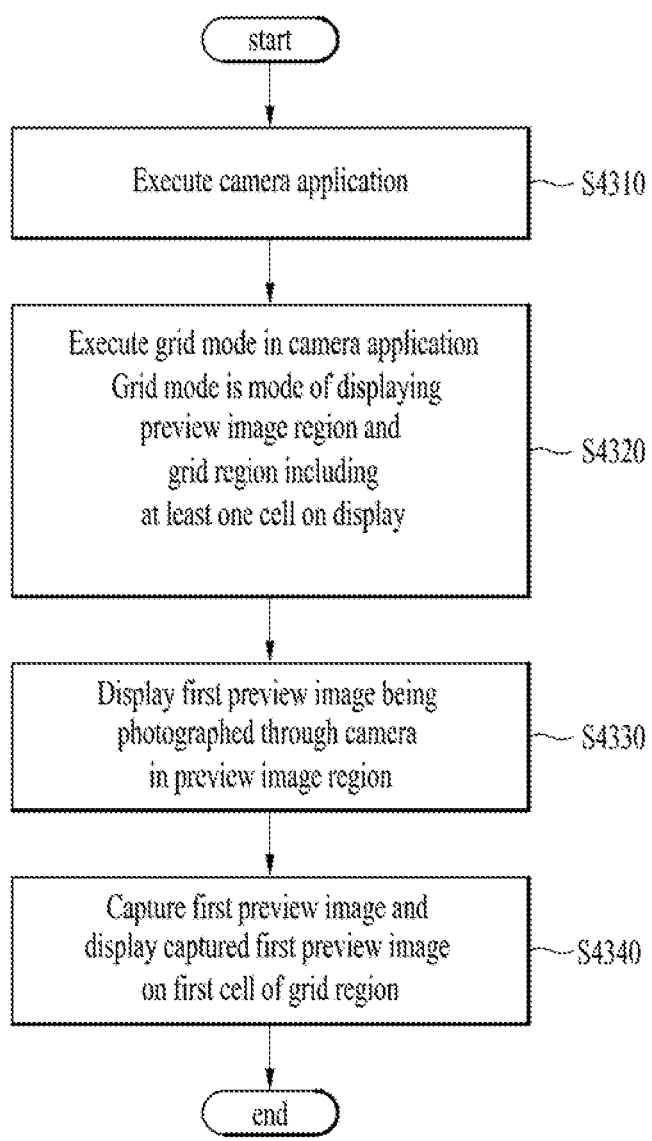
FIG. 43 is a flowchart illustrating an embodiment of executing the grid mode to capture a preview image in the mobile terminal according to an embodiment of the present invention.

FIG. 43 is a flowchart illustrating an embodiment of executing the grid mode to capture a preview image in the mobile terminal according to an embodiment of the present invention. Each step of FIG. 43 described below may be controlled by the controller shown in FIG. 1*a*.

In step S4310, the mobile terminal may execute the camera application on the display. Here, the camera application may correspond to not only a default camera application installed in the mobile terminal but also various applications including a photographing function.

In step S4320, the mobile terminal may execute the grid mode in the camera application. Here, the grid mode may correspond to a mode of displaying a preview image region and a grid region including at least one cell on the display. The grid region may include cells arranged in m rows and m columns (in being a natural number). In addition, the mobile terminal may change the layout of the grid region on the basis of a preset event.

In step S4330, the mobile terminal may display a first preview image which is being photographed through the camera in the preview image.

In step S4340, the mobile terminal may capture the first preview image and display the captured first preview image on a first cell of the grid region. In general, the first cell may correspond to a cell located at the upper left of the grid region, but the mobile terminal may set the order of cells. In addition, the mobile terminal may record the first preview image and display the same on the first cell of the grid region. Here, the mobile terminal may display a thumbnail of the recorded video on the first cell.

Meanwhile, the embodiments described above with reference to FIGS. 5 to 42 may be implemented as a method of controlling the mobile terminal as illustrated in FIG. 43.

The present invention can be implemented with computer-readable code in a computer-readable medium in which programs are stored. The computer-readable medium may include all kinds of recording devices capable of storing data readable by a computer system. Examples of the computer-readable medium may include a hard disk drive (HDD), a solid state drive (SSD), a silicon disk drive (SDD), a ROM, a RAM, a CD-ROM, a magnetic tape, a floppy disk, an optical data storage device, and the like and also include carrier-wave type implementation such as a transmission via the Internet. Furthermore, the computer may include the controller 180 of the mobile terminal. Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A mobile terminal comprising:
a sensing unit;
a camera;
a display; and
a controller configured to:
execute a camera application,
execute a grid mode in the camera application, the grid mode being a mode of displaying, on the display, a preview image region and a grid region including a plurality of cells,
display a first preview image being received through the camera in the preview image region, and
capture an image based on the first preview image and display the captured image on a first cell of the plurality of cells in the grid region, wherein the captured image on the first cell in the grid region is displayed together with the first preview image in the preview image region and an empty cell of the plurality of cells in the grid region.

2. The mobile terminal according to claim 1, wherein the controller is configured to change the size of the first cell on the basis of a preset event if the preset event is generated when the first preview image is captured and change a layout of the first cell and remaining neighboring cells based on a size change of the first cell.

3. The mobile terminal according to claim 2, wherein the preset event includes preset voice recognition or recognition of a preset object.

4. The mobile terminal according to claim 3, wherein, when the preset event is an event of recognizing an object included in the first preview image, the controller is configured to change the size of the first cell based on at least one of the size, proportion and type of the recognized object.

5. The mobile terminal according to claim 1, wherein, when the controller detects rotation of the mobile terminal while the first preview image is displayed in the preview image region, the controller is configured to control the grid region not to automatically rotate.

6. The mobile terminal according to claim 1, wherein the controller is configured to identify the first cell upon sensing a first input signal for selecting the first cell, capture a second preview image being photographed through the camera upon recognizing the first cell, and switch the first preview image displayed on the first cell to the second preview image.

7. The mobile terminal according to claim 1, wherein the controller is configured to sense an input signal for controlling the first preview image upon identifying the first cell and change at least one of the size and position of the first preview image according to the second input signal.

8. The mobile terminal according to claim 1, wherein, when images are displayed on all cells included in the grid region, the controller is configured to display an icon for saving or sharing a grid image and deactivate the preview image region.

9. The mobile terminal according to claim 8, wherein the controller is configured to suspend display of the icon and activate the preview image region upon sensing an input signal for selecting the first cell when the icon is displayed.

10. The mobile terminal according to claim 8, wherein the controller is configured to store the grid image and an image displayed on a second cell upon sensing an input signal for selecting the second cell from among the cells included in the grid region.

11. The mobile terminal according to claim 1, wherein, when the controller captures a second preview image being photographed through the camera while images are displayed on all cells included in the grid region, the controller is configured to determine an image quality of a preview image included in the grid region and change a preview image having a lowest image quality to the second preview image.

12. The mobile terminal according to claim 1, wherein the grid region includes cells arranged in m rows and m columns, m being a natural number, and
wherein the controller is configured to modify the grid region such that the grid region includes n rows and n columns, n being a natural number different from m, upon sensing an input signal of touching the grid region in a preset manner.

13. The mobile terminal according to claim 1, wherein the controller is configured to extract information from at least one previously captured preview image when the grid region includes an empty cell and display common information on the empty cell based on the extracted information.

14. The mobile terminal according to claim 13, wherein the controller is configured to display a recommended image list based on the common information upon sensing an input signal for selecting the common information and display a first recommended image on the empty cell upon sensing an input signal for selecting the first recommended image.

15. The mobile terminal according to claim 13, wherein the controller is configured to display a sharing target list including at least one sharing target upon sensing an input signal for sharing the grid image when the grid region includes an empty cell and determine the common information based on the sharing target.

16. The mobile terminal according to claim 13, wherein, when the extracted information is focused objects, the controller is configured to display an image in which only the focused objects are combined on the empty cell.

17. The mobile terminal according to claim 1, wherein, when a grid image is saved while the grid region includes an empty cell, the controller is configured to maintain the empty cell of the grid image in a state in which the empty cell is able to be photographed, capture a second preview image being photographed through the camera upon sensing an input signal for re-photographing the empty cell, and display the second preview image on the empty cell.

18. The mobile terminal according to claim 1, wherein the controller is configured to record a video from a first time to a second time based on the first preview image and display a thumbnail the recorded video on a third cell of the plurality of cells in the grid region, wherein the thumbnail of the recorded video on the third cell in the grid region is displayed together with the first preview image in the preview image region and the empty cell in the grid region.

19. The mobile terminal according to claim 18, wherein the controller is configured to extract at least one frame of the video and display the thumbnail of the video on the third cell based on the extracted frame.

20. The mobile terminal of claim 18, wherein the controller is further configured to:
save the captured image on the first cell and the thumbnail of the recorded video on the second cell as a single grid image.

21. A method of controlling a mobile terminal, comprising:
- executing a camera application;
- executing a grid mode in the camera application, the grid mode being a mode of displaying a preview image region and a grid region including a plurality of cells on a display;
- displaying a preview image being received through a camera in the preview image region; and
- capturing an image based on the preview image and displaying the captured image on a first cell of the plurality of cells in the grid region, wherein the captured image on the first cell in the grid region is displayed together with the preview image in the preview image region and an empty cell of the plurality of cells in the grid region.

* * * * *